United States Patent
Oriordan

(10) Patent No.: US 11,790,127 B1
(45) Date of Patent: Oct. 17, 2023

(54) FULL CORRELATION AGING ANALYSIS OVER COMBINED PROCESS VOLTAGE TEMPERATURE VARIATION

(71) Applicant: Synopsys, Inc., Mountain View, CA (US)

(72) Inventor: Donald John Oriordan, Sunnyvale, CA (US)

(73) Assignee: Synopsys, Inc., Mountain View, CA (US)

( * ) Notice: Subject to any disclaimer, the term of this patent is extended or adjusted under 35 U.S.C. 154(b) by 203 days.

(21) Appl. No.: 16/872,075

(22) Filed: May 11, 2020

Related U.S. Application Data

(60) Provisional application No. 62/846,651, filed on May 11, 2019.

(51) Int. Cl.
  *G06F 30/20* (2020.01)
  *G06F 30/39* (2020.01)
  *G06F 119/08* (2020.01)
  *G06F 119/02* (2020.01)
  *G06F 119/04* (2020.01)

(52) U.S. Cl.
  CPC .............. *G06F 30/20* (2020.01); *G06F 30/39* (2020.01); *G06F 2119/02* (2020.01); *G06F 2119/04* (2020.01); *G06F 2119/08* (2020.01)

(58) Field of Classification Search
  CPC ...... G06F 30/20; G06F 30/39; G06F 2119/04; G06F 2119/08; G06F 2119/02
  USPC .......................................................... 703/14
  See application file for complete search history.

(56) References Cited

U.S. PATENT DOCUMENTS

| | | | | |
|---|---|---|---|---|
| 9,645,715 | B1* | 5/2017 | Jain | ................... G06F 30/30 |
| 10,896,274 | B1* | 1/2021 | Morency | ............. G06F 30/3308 |
| 2012/0123745 | A1* | 5/2012 | Sheu | .................... G06F 30/367 |
| | | | | 703/2 |
| 2016/0079949 | A1* | 3/2016 | Joish | ........................ H03F 1/56 |
| | | | | 330/69 |

OTHER PUBLICATIONS

Layman, Chris Why Does My Parametric Sweep Slow Down, Oct. 20, 2012 COMSOL Discussion Forum (Year: 2012).*
Cook_2018 (What are constants & Controls of a Science Project Experiment? Apr. 20, 2018). (Year: 2018).*
Tudor_2010 (MOSRA: An Efficient and Versatile MOS Aging Modeling and Reliability Analysis Solution for 45nm and Below, IEEE 2010) (Year: 2010).*

(Continued)

*Primary Examiner* — Brian S Cook
(74) *Attorney, Agent, or Firm* — Lowenstein Sandler LLP

(57) ABSTRACT

A method, a system, and non-transitory computer readable medium for aging analysis are provided. The method includes performing stress simulations for a plurality of process, voltage, temperature (PVT) conditions for a circuit, the circuit including one or more devices, extrapolating device level stresses obtained from the stress simulations into device level parameter degradations to a desired circuit age; and performing degradation simulations for the circuit for the same PVT conditions based on the device level parameter degradations. Each degradation simulation for a PVT condition of the plurality of PVT conditions is performed using the device level parameter degradations associated with the same PVT condition.

20 Claims, 55 Drawing Sheets

(56) References Cited

OTHER PUBLICATIONS

Spiceman_2019 (LTspice-Temperature Analysis (.temp), LTSpice Simulation, May 10, 2019) (Year: 2019).*
Intel_2008 (local work area directory structure, 2008). (Year: 2008).*
Jason_2008 (HDL Design Process and Folder Structure, 2008). (Year: 2008).*
Hspice_2008 (HSPICE User Guide: Simulation and Analysis, 2008) (Year: 2008).*
Twuienga_1995 (SPICE, A guide to Circuit Simulation & Analysis, 1995) (Year: 1995).*
HSPICE_Ref_Manual_2008 (HSPICE Reference Manual: Commands and Control Options B—Sep. 2008). (Year: 2008).*

* cited by examiner

600

- Foreach Corner Ci
  - Foreach Sweel Level Lj
    - Foreach Sweep Value Sk in Lj
      - Foreach MC Group Mg
        - Foreach MC iteration lm
          - Simulate pre-stress tran, computing stresses and/or degradations
          - Write degradation file Ci, Lj, Sk, Mg, Lm
          - Store path to degradation file Ci, Lj, Sk, Mg, Lm

- Foreach Corner Ci
  - Foreach Sweel Level Lj
    - Foreach Sweep Value Sk in Lj
      - Foreach MC Group Mg
        - Foreach MC iteration Im
          - retrieve path to degradation file Ci, Lj, Sk, Mg, Im
          - Update device models using stress/degradation coefficient file at path P
          - Run tran + non-tran post-stress simulations

| | | | | |
|---|---|---|---|---|
| Status: Simulation Completed | | HSPICE | | ☐ History |
| Variable | ▼ | Value | | |
| temp | | 25 | | |
| vdd | | 2.2 | | |
| Click to add | | | | |

| Analysis | Type | En | | Value |
|---|---|---|---|---|
| corners | | ☐ | Total: 2, enabled: 2 | |
| ▲ sweep vdd | sweep | ☐ | POI: | |
| ▲ Monte Carlo | Monte Carlo | ☐ | Iterations: 10 Start Iteration: 1 | |
| MOSRA | | ☐ | Post-Stress: 3 Year(s) | |
| ▲ tran | tran | ☑ | Start Time: 0 Time Step: 0.1p Stop Time: 15n | |

| Outputs | Specifications | Scatter | Histogram | Q-Q | Parametric Reduction |

| Output | ▼ | Expression | Value | Analyses | | | | | | 📷 |
|---|---|---|---|---|---|---|---|---|---|---|
| | | v(/I0/net17) | | tran | ☑ | | ☐ | ☐ | ☐ | ☐ |
| | | average(v(/I0/net15)) | | tran | ☑ | | ☐ | ☐ | ☐ | ☐ |
| | | v(/I2/net15) | | tran | ☑ | ✖ | ☐ | ☐ | ☐ | ☐ |
| | | ymax(v(/I2/net15)) | 2.24141 | tran | ☑ | | ☐ | ☐ | ☐ | ☐ |
| | | v(/I2/net17) | ✖ | tran | ☑ | | ☐ | ☑ | ☐ | ☐ |
| | | ymax(fvst(v(/I2/net17),0.3,10n,percent=0)) | 7.72319G | tran | ☑ | | ☐ | ☐ | ☐ | ☐ |
| | | fvst(v(/I2/net17),0.3,10n,percent=0) | | tran | | | | | | |
| | | average(fvst(v(/I2/net17),0.3,10n,percent=0)) | | tran | ☑ | | ☐ | ☐ | ☐ | ☐ |
| Click to add | | | | | | | | | | |

1102

1700

| Measurements | | | |
|---|---|---|---|
| corner | Corner Model File mosraMode... | Corner Model File simpleMod... | Corner Variable temp | ymax(fvst(v(/I2/net17),0_3,10n,percent=0)) tran |
| | | | | None |
| corner.1 | | | 25.0000 | 7.72319G —1702 |
| corner.2 | | | 150.000 | 5.66736G —1704 |

| Measurements | | | | |
|---|---|---|---|---|
| corner | Corner Model File mosraMode... | Corner Model File simpleMod... | Corner Variable temp | ymax(fvst(v(/I2/net17),0_3,10n,percent=0)) tran |
| | | | | None |
| corner.1 | | | 25.0000 | 7.56678G —1902 |
| corner.2 | | | 150.000 | 5.62637G —1904 |

| Analysis | Type | En | Value |
|---|---|---|---|
| corners | | ☐ | Total: 2, enabled: 2 |
| ▸ sweep vdd | sweep | ☑ | POI: |
| rangeType | | | POI |
| poi | | | 2 2.2 |
| stepType | | | Linear |
| linearPoints | | | |
| ▸ Monte Carlo | Monte Carlo | ☐ | Iterations: 10 Start Iteration: 1 |
| MOSRA | | ☑ | Pre-Stress: 3 Year(s) |
| ▸ tran | tran | ☑ | Start Time: 0 Time Step:0.1p Stop Time:15n |

| Measurements | |
|---|---|
| vdd | ymax(fvst(v(/I2/net17),0_3,10n,percent=0)) tran |
| Sweep | None |
| 2.00000 | 6.79087G |
| 2.20000 | 7.72319G |

| vdd | ymax(fvst(v(/l2/net17),0_3,10n,percent=0)) tran |
|---|---|
| Sweep | None |
| 2.00000 | 6.62991G |
| 2.20000 | 7.56678G |

| Analysis | Type | En | Value |
|---|---|---|---|
| corners | | ☑ | Total: 2, enabled: 2 |
| ▼ sweep vdd | sweep | ☑ | POI: |
| rangeType | | | POI |
| poi | | | 2 2.2 |
| stepType | | | Linear |
| linearPoints | | | |
| ▲ Monte Carlo | Monte Carlo | ☐ | Iterations: 10 Start Iteration: 1 |
| MOSRA | | ☑ | Pre-Stress: 3 Year(s) |
| ▲ tran | tran | ☑ | Start Time: 0 Time Step: 0.1p Stop Time: 15n |

| Measurements | Folded Table | Corner Summary |
| --- | --- | --- |

| corner | vdd | Corner Variable temp | Corner Model File mosraMode... | Corner Model File simpleMod... | ymax(fvst(v(/I2/net17),0_3,10n,percent=0)) tran |
|---|---|---|---|---|---|
| | Sweep | | | | None |
| corner.1 | 2.00000 | 25.0000 | | | 6.79087G |
| | 2.20000 | | | | 7.72319G |
| corner.2 | 2.00000 | 150.000 | | | 4.96222G |
| | 2.20000 | | | | 5.66736G |

FIG. 30

| Measurements | Folded Table | Corner Summary | | | |
|---|---|---|---|---|---|
| corner | vdd | Corner Variable temp | Corner Model File mosraMode... | Corner Model File simpleMod... | ymax(fvst(v(/I2/net17),0_3,10n,percent=0)) tran |
| | Sweep | | | | None |
| corner.1 | 2.00000 | 25.0000 | | | 6.62991G |
| | 2.20000 | | | | 7.56678G |
| corner.2 | 2.00000 | 150.000 | | | 4.92044G |
| | 2.20000 | | | | 5.62637G |

| Analysis | Type | En | Value |
|---|---|---|---|
| corners | | ☐ | Total: 2, enabled: 2 |
| ▼ sweep vdd | sweep | ☐ | POI: |
| rangeType | | | POI |
| poi | | | 2 2.2 |
| stepType | | | Linear |
| linearPoints | | | |
| ▲ Monte Carlo | Monte Carlo | ☑ | Iterations: 100 Start Iteration: 1 |
| MOSRA | | ☑ | Pre-Stress: 3 Year(s) |
| ▶ tran | tran | ☑ | Start Time: 0 Time Step:0.1p Stop Time:15n |

FIG. 36

| Summary | Testbench Yields | | | | | | |
|---|---|---|---|---|---|---|---|
| Testbench | Measurements | Specification | Violations | Min | Max | Mean | StdDev |
| MOSRA_CORNERS_NEW | ymax(fv... | None | 0 | 7.61578G | 7.82585G | 7.72199G | 0.03813... |

FIG. 38

| Summary | Testbench Yields | | | | | | |
|---|---|---|---|---|---|---|---|
| | Testbench | Measurements | Specification | Violations | Min | Max | Mean | StdDev |
| | MOSRA_CORNERS_NEW | ymax(fv... | None | 0 | 7.44231G | 7.66363G | 7.56425G | 0.039835G |

| Analysis | Type | En | Value |
|---|---|---|---|
| corners | | ☑ | Total: 2, enabled: 2 |
| ▼ sweep vdd | sweep | ☑ | POI: |
| rangeType | | | POI |
| poi | | | 2 2.2 |
| stepType | | | Linear |
| linearPoints | | | |
| ▲ Monte Carlo | Monte Carlo | ☑ | Iterations: 100 Start Iteration: 1 |
| MOSRA | | ☑ | Pre-Stress: 3 Year(s) |
| ▲ tran | tran | ☑ | Start Time: 0 Time Step:0.1p Stop Time:15n |

| Combinations | Mean Freq | Standard Deviation |
|---|---|---|
| 2.0 volts, 25 degrees | 6.79 GHz | 40.4 MHz |
| 2.2 volts, 25 degrees | 7.72 GHz | 38.1 MHz |
| 2.0 volts, 150 degrees | 4.96 GHz | 30.6 MHz |
| 2.2 volts, 150 degrees | 5.67 GHz | 27.8 MHz |

| Combinations | Mean Freq | Standard Deviation |
|---|---|---|
| 2.0 volts, 25 degrees | 6.63 GHz | 38.1 MHz |
| 2.2 volts, 25 degrees | 7.56 GHz | 39.8 MHz |
| 2.0 volts, 150 degrees | 4.92 GHz | 30.6 MHz |
| 2.2 volts, 150 degrees | 5.63 GHz | 30.2 MHz |

Results

Results Source: ⦿ Results History ○ File

Showing results for: corner=corner.1:temp=25:vdd=2.20000:MONTE_CARLO=10

[ Choose Parameters... ]

Circuit Age: [ 3.000 yrs ]

Highlight where: [ delvth0 ] exceeds: [ 6.2 ] mV

| ID | Instance | Type | Model | BiasDirection | delvth0 | delk2 | de |
|----|----------|------|-------|---------------|---------|-------|----|
| 1 | /I2/M6 | NMOS | n1 | bi-direction | 17.5381m | 0 | 0 |
| 2 | /I2/M4 | NMOS | n1 | bi-direction | 17.5030m | 0 | 0 |
| 3 | /I2/M0 | NMOS | n1 | bi-direction | 17.6186m | 0 | 0 |
| 4 | /I2/M7 | PMOS | p1 | bi-direction | 17.4329m | 0 | 0 |
| 5 | /I2/M5 | PMOS | p1 | bi-direction | 17.4651m | 0 | 0 |
| 6 | /I2/M1 | PMOS | p1 | bi-direction | 17.2833m | 0 | 0 |
| 7 | /I1/M6 | NMOS | n1 | bi-direction | 17.6013m | 0 | 0 |
| 8 | /I1/M4 | NMOS | n1 | bi-direction | 17.4746m | 0 | 0 |

[ Help ] [ Defaults ] [ Close ]

FIG. 54

FULL CORRELATION AGING ANALYSIS OVER COMBINED PROCESS VOLTAGE TEMPERATURE VARIATION

CROSS-REFERENCE TO RELATED APPLICATIONS

The present application claims the benefit under 35 U.S.C. § 119(e) of U.S. Provisional Patent Application No. 62/846,651 filed on May 11, 2019, which is incorporated herein by reference in its entirety for all purposes.

TECHNICAL FIELD

The present disclosure relates to aging analysis for semiconductor devices, for example, to a method and system to perform aging analysis over combined process, voltage, temperature (PVT) variations.

BACKGROUND

In the field of semiconductors, Metal Oxide Semiconductor (MOS) device aging caused by Hot-Carrier Injection (HCI) and Negative/Positive Bias-Temperature Instability (N/PBTI) is increasingly more responsible for Integrated Circuit (IC) reliability failure for advanced process technology nodes. Self-heating effects also accelerate aging. Accurate aging modeling and fast yet trustworthy reliability signoff has thus become mandatory in process development and circuit design. Circuit simulators such as HSPICE™ from Synopsys have implemented such self-heating/aging models in commercial solutions and made them available via simulator analyses such as Metal Oxide Semiconductor Reliability Analysis (MOSRA).

Inputs to such Simulation Program with Integrated Circuit Emphasis (SPICE) simulators generally include a textual netlist containing both the structural connectivity of the design, and a set of parameters representing a single sample in the PVT space at which the design is to be simulated. Additional inputs include the stimulus to apply, the analyses to be performed, foundry-dependent model cards representing the unaged or fresh device parameters, and any necessary options to control convergence of the simulator. To perform the reliability/aging analysis, additional inputs are included such as aging model libraries and parameters which govern their operation, and the age(s) at which the circuit is to be simulated (e.g., 10 years).

These aging flows are generally two-stage flows, with a first stage "Fresh" simulation analysis observing the stresses on semiconductor devices in the circuit during a short transient simulation and extrapolating the effects of these stresses on the devices to compute SPICE model degradations at the given circuit age, which are then accounted for in a second "Aging and EOL (End of Life)" simulation, also known as a 'Degraded' simulation. During the second stage simulation, it is possible to change the circuit stimulus and the list of analyses to be performed. The second stage simulations predict how the degradations in the individual aged devices affect overall circuit performance by producing circuit waveforms and other outputs in response to the stimulus. However, these data flows have been limited to a nominal condition analysis only (i.e., a single sampling of the Process/Voltage/Temperature variation space).

SUMMARY

In one aspect, a method for aging analysis is provided. The method includes performing stress simulations for a plurality of process, voltage, temperature (PVT) conditions for a circuit. The circuit includes one or more devices. The method also includes extrapolating device level stresses obtained from the stress simulations into device level parameter degradations at a desired circuit age, and performing degradation simulations for the circuit for the same PVT conditions based on the device level parameter degradations. Each degradation simulation for a PVT condition of the plurality of PVT conditions is performed using the device level parameter degradations associated with the same PVT condition.

In one aspect, a system includes a memory and a processor. The processor is configured to perform stress simulations for a plurality of process, voltage, temperature (PVT) conditions for a circuit, the circuit including one or more devices, extrapolate device level stresses obtained from the stress simulations into device level parameter degradations to a desired circuit age, and perform degradation simulations of the circuit for the same PVT conditions based on the device level parameter degradations. Each degradation simulation for a PVT condition of the plurality of PVT conditions is performed using the device level parameter degradations associated with the same PVT condition.

Further features of the present disclosure, as well as the structure and operation of various embodiments, are described in detail below with reference to the accompanying drawings. It is noted that the present disclosure is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 6 illustrates an algorithm for the first stage simulations in accordance with some aspects of the present disclosure.

FIG. 8 illustrates an algorithm for the second stage simulations in accordance with some aspects of the present disclosure.

FIG. 10 illustrates a setup for a nominal analysis for a fresh ring oscillator circuit.

FIG. 11 illustrates nominal condition simulation result (maximum oscillation frequency) for fresh devices.

FIG. 17 illustrates a corner condition simulation result (maximum oscillation frequency) for fresh devices in accordance with some aspects of the present disclosure.

FIG. 19 illustrates a corner condition simulation result (maximum oscillation frequency) for 3-year aged devices in accordance with some aspects of the present disclosure.

FIG. 24 illustrates setup for swept rail voltage analysis in accordance with some aspects of the present disclosure.

FIG. 25 illustrates the effects of rail voltage on fresh device oscillation frequency in accordance with some aspects of the present disclosure.

FIG. 27 illustrates the effects of aging on oscillation frequency at different rail voltages in accordance with some aspects of the present disclosure.

FIG. 29 illustrates a setup for combined voltage sweep and temperature corners in accordance with some aspects of the present disclosure.

FIG. 30 illustrates oscillation frequencies for fresh devices over voltage and temperature variations in accordance with some aspects of the present disclosure.

FIG. 33 illustrates effects of aging on oscillation frequencies over voltage and temperature variations in accordance with some aspects of the present disclosure.

FIG. 36 illustrates the setup for Monte Carlo simulation to investigate process variations in accordance with some aspects of the present disclosure.

FIG. 38 illustrates statistics for circuit oscillation frequency over process variation for fresh devices in accordance with some aspects of the present disclosure.

FIG. 42 illustrates statistics for circuit oscillation frequency over process variation for 3-year aged devices in accordance with some aspects of the present disclosure.

FIG. 44 illustrates the setup for fresh device simulations over all PVT variations in accordance with some aspects of the present disclosure.

FIG. 46 illustrates a table of statistics over PVT for fresh devices in accordance with some aspects of the present disclosure.

FIG. 50 illustrates a table of statistics over PVT for aged devices in accordance with some aspects of the present disclosure.

FIG. 54 illustrates the threshold voltage increases for a particular PVT sample in accordance with some aspects of the present disclosure.

DETAILED DESCRIPTION

Aspects of the present disclosure relate to full correlation aging analysis over combined process voltage temperature (PVT) variation.

Aging analyses have been limited to a nominal condition analysis. The method and system described herein incorporate other environmental factors affecting device stresses in the aging analysis. Fresh simulation and degraded simulations are performed over identical PVT conditions. Further, the methods and systems described herein provide a method for debugging device level parameter degradations for each of the PVT condition.

Figure 1:
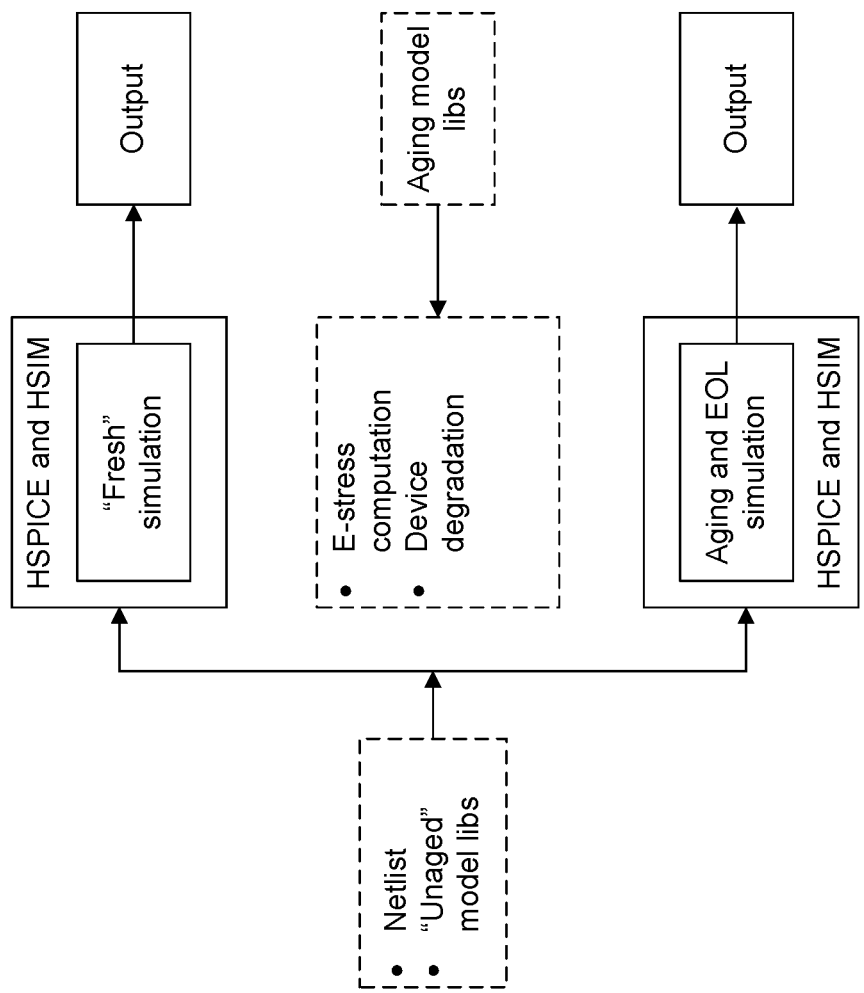
FIG. 1 illustrates a two stage aging flow process.

FIG. 1 illustrates a two stage aging flow process. Circuit design environments (e.g., Custom-Compiler SAE from Synopsys) have introduced user interfaces that allow circuit designers to setup reliability/aging models and analyses (e.g., Metal Oxide Semiconductor Reliability Analysis (MOSRA)), allowing circuit designers to predict the effects of circuit aging on their IC designs from within the circuit design environment. However, these data flows have been limited to a nominal condition analysis only (i.e., a single sampling of the PVT variation space). It is common in the analog design community to run SPICE simulations from within another piece of software known as an analog circuit design environment.

Figure 2:
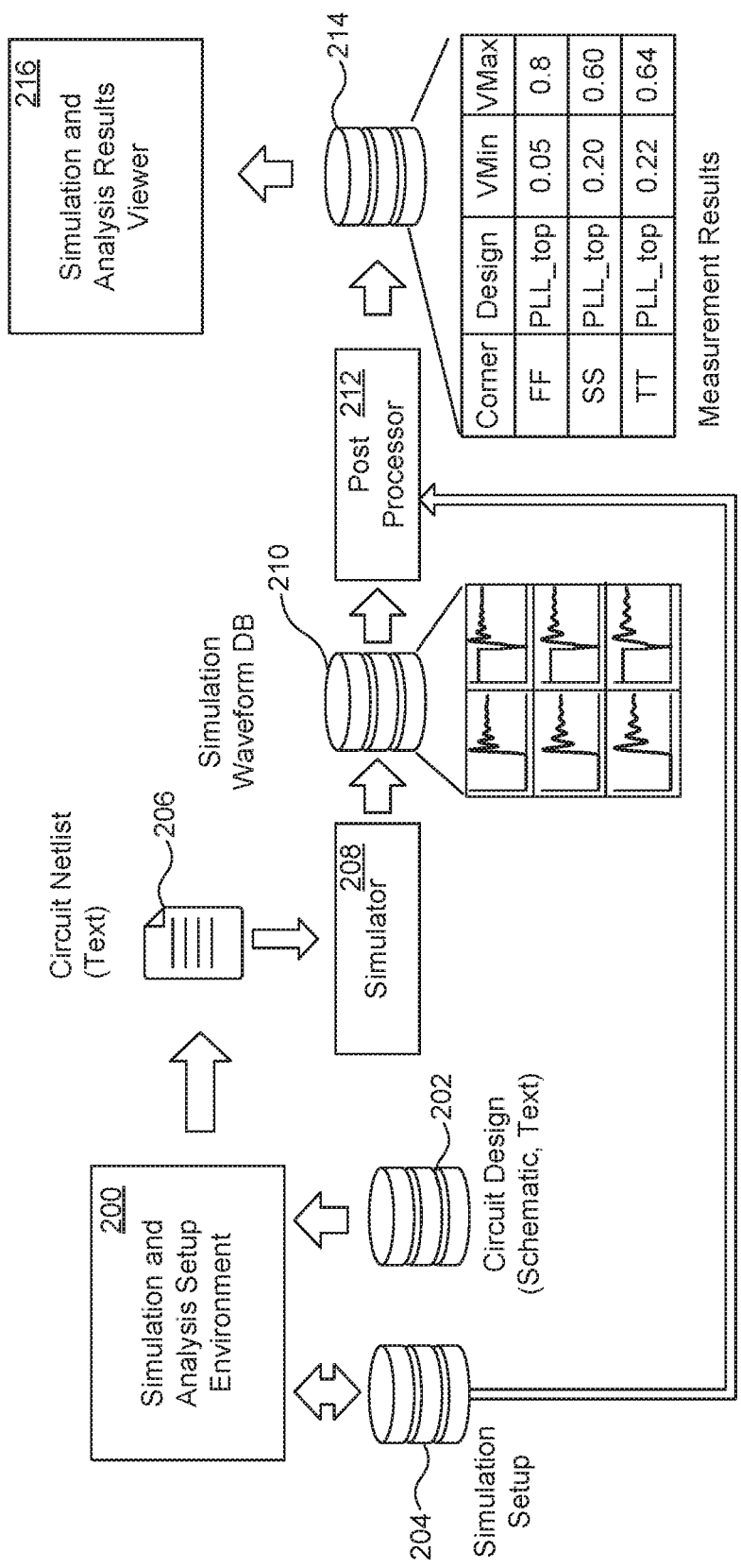
FIG. 2 illustrates a circuit design environment and data flow in the environment.

FIG. 2 illustrates a circuit design environment 200 and data flow in the environment. The circuit design environment 200 accepts a circuit design 202 which is typically in the form of a schematic and provides a graphical user interface by which the user can set up the conditions under which the schematic is to be simulated. The user also provides the stimulus, model cards, simulation options and conditions in this environment (stimulation setup 204). The environment translates the schematic design to a textual form and produces the netlist file 206 which is input to a simulator 208. After invoking the simulator 208, the environment 200 then typically post-processes (using post processor 212) the waveforms 210 produced by the simulator 208, reducing waveforms 210 down to scalar values which represent the circuit performances. The scalar results 214 are then presented in a results viewer 216, optionally listing the various outputs and the conditions under which they were produced.

Figure 3:
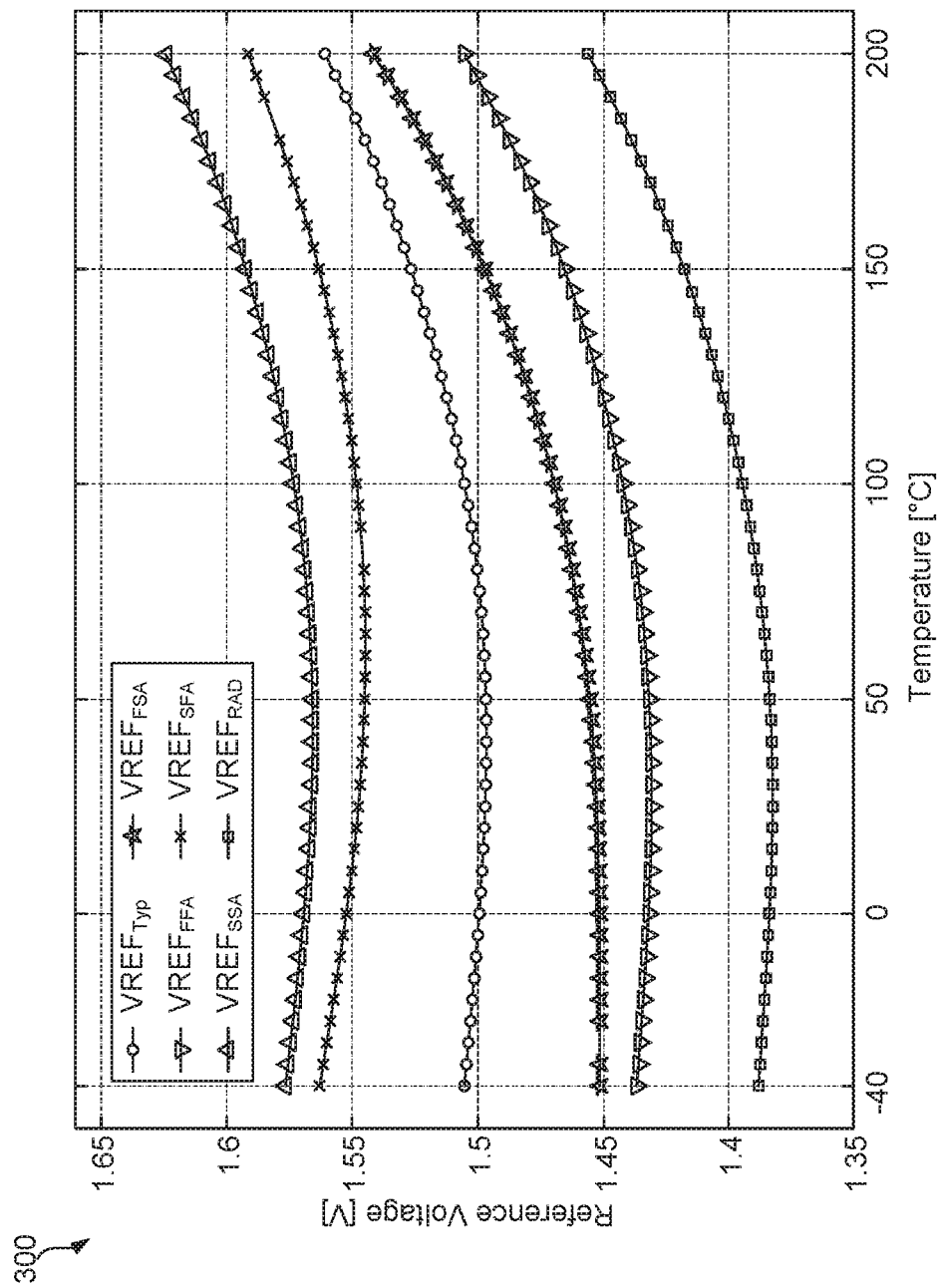
FIG. 3 illustrates reference voltage variations over process corners and operating temperature.

FIG. 3 illustrates reference circuit voltage variations 300 over process corners and operating temperature. The influence of other critical PVT and environmental-space inputs such as manufacturing process variations, operating conditions like temperature and voltage variations, different load and other environmental 'corner' conditions has been difficult or impossible to consider while performing an aging analysis using such environments. Since manufacturing process variations, varying load conditions, and operating conditions such as temperature, power supply voltage, and the like, all differently affect the voltages, currents and therefore the stresses that build up on semiconductor devices during the lifetime of the circuit, they need to be accounted for during reliability analysis.

Hence, to overcome the limitations of performing a single 'nominal condition' reliability analysis as has traditionally been the case with existing circuit design environments, designers need a way to incorporate these other environmental factors affecting device stresses, effectively and efficiently running many more reliability simulations over more conditions, and debugging circuit behavior over these conditions in the presence of aging.

Further, when these extra variation sources are introduced, it is critical that the second stage simulations are performed under the exact same PVT/environmental conditions as the first stage simulations in order to achieve a 1:1 correspondence. This correspondence allows for the effects of manufacturing and environmental conditions to be accounted for in the device stress calculations for the first stage simulation, and their corresponding impacts/device parameter degradations accounted for in the second stage (aged device) simulations.

Additionally, when the second stage simulations performed under these varied manufacturing and environmental conditions identify cases where the aged circuit can no longer meet the design specifications, designers are able to debug their designs from a reliability/aging perspective in the presence of these same PVT conditions using the systems and methods described herein. Designers are able to 'dig deep' into the simulations for a particular set of conditions, both before and after aging calculations are applied, to investigate the reliability-related degradations on the parameters of specific individual semiconductor devices and to investigate the resulting impacts on overall circuit waveforms and behavior.

The full effects of process, voltage and temperature (and other) variations is considered during reliability analysis described herein. The circuit design environment described herein facilitates the investigation of aging in the presence of such variation effects. The design environment described herein can support the debug process for corner cases when circuit performances are no longer found to meet their specifications when both the stresses leading to aging effects and the PVT variations which influence them are combined.

To understand why a circuit-level performance is failing to meet its specification for a given circuit age under any given set of PVT conditions, a designer is able to inspect the device level parameter degradations for each of the devices in the circuit at those same conditions.

In one embodiment, the method and system described herein provide a two-stage simulation capability by generating a separate simulation directory for each swept parameter, corner, or Monte Carlo analysis representing a sample of the PVT space or a PVT condition.

Figure 4:
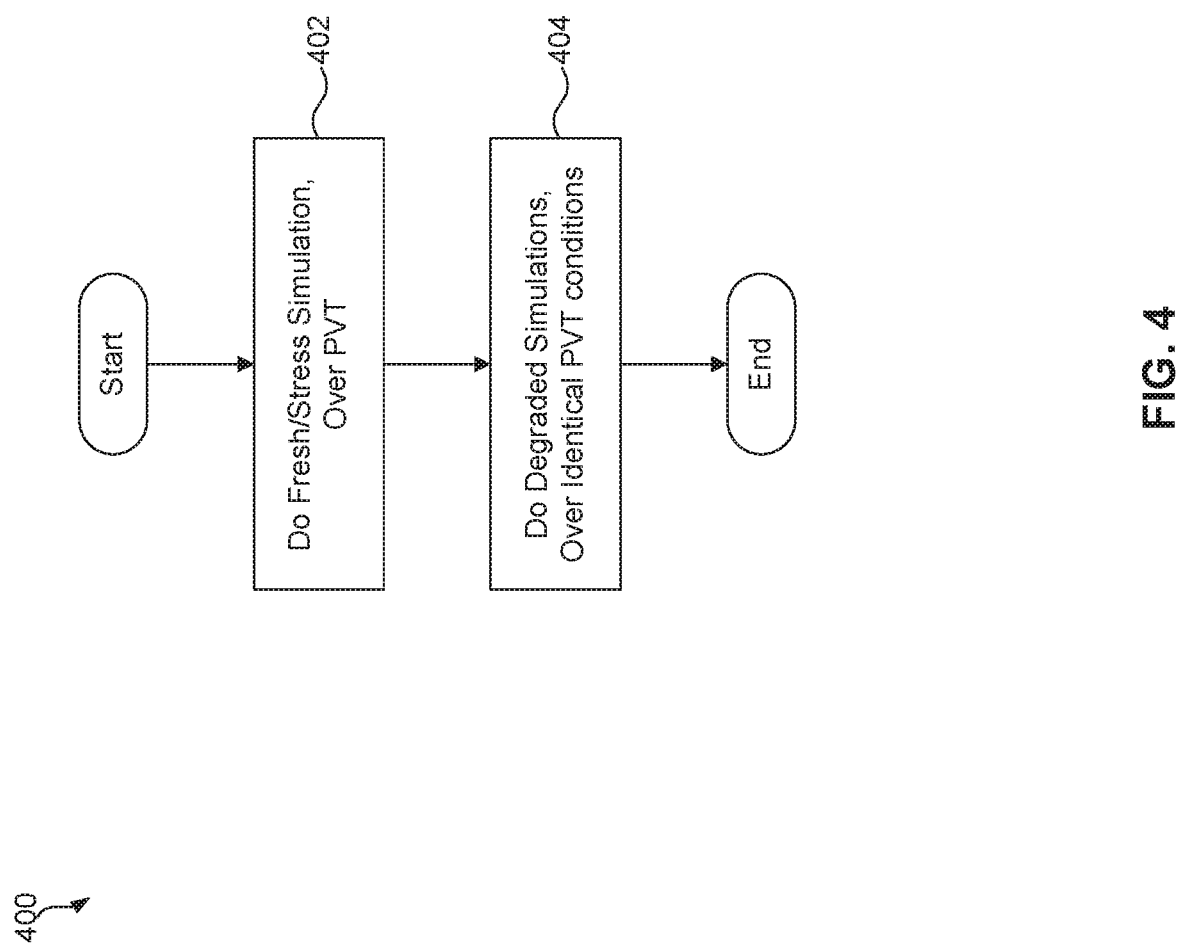
FIG. 4 illustrates a flowchart for reliability simulations over process, voltage, temperature (PVT) in accordance with some aspects of the present disclosure.

FIG. 4 illustrates a flowchart for reliability simulations for a circuit over PVT in accordance with some aspects of the present disclosure. Process 400 may start at step 402 and run stress simulations over each PVT condition of the plurality of PVT conditions (i.e., first phase simulations). During the fresh/stress simulations, the stresses on each of the devices of the circuit (under the sampled PVT condition) are accumulated by the simulator. Then, the degraded simulations are run over the same PVT conditions at step 404 (i.e., second phase simulations). Each degraded simulation for a PVT condition is performed using data from the stress simulation for the same PVT condition performed at step 402. For example, the device level stresses may be extrapolated into device level parameter degradations for each PVT condition of the plurality of PVT conditions. Then, degradation simulations are performed based on the extrapolated device level parameter degradations for each respective PVT condition.

In one embodiment, the simulator (e.g., simulator 208 of FIG. 2) is instructed by the design environment to store the device-level stresses to a separate output file in the separate simulation directory, for use in a subsequent degraded/aging simulation. A record is kept by the environment which associates each unique stress output file to the corresponding PVT sample conditions. The stress file is therefore produced and recorded for each unique combination of swept parameters, corner analysis or Monte Carlo analysis that corresponds to a sampling of the PVT space. Circuit waveforms are also produced by the simulator, and the post-processing step of the design environment then reduces these waveforms to scalar measurement values which characterize the overall circuit behavior at the sample PVT condition. These measurements correspond to 'freshly manufactured' devices, before any aging has had a chance to occur.

In one embodiment, the Monte Carlo (MC) sample space is divided into several groups to improve performance, especially for larger circuits. Each group of simulations is assigned to a single simulation process (e.g., UNIX process). This provides the advantage that the startup time, license acquisition cost, and structural netlist parsing cost of the simulator itself is amortized over all the samples in the group. The groups may then be run in parallel by a simulation process scheduler. The number of groups may be selected by a user or by the design environment based on the number of license (simulator) available, circuit size, and the like, as would be understood by one of ordinary skill in the art.

In one embodiment, the number of MC groups is set equal to the number of MC iterations when the circuit is large and the circuit simulation time itself dominates the overall time for the simulation process. Thus, each simulation process handles just one single Monte Carlo sample point.

In one embodiment, the number of groups is set equal to one when the circuit is very small and the analyses are very short and the circuit simulation time itself is a negligible portion the overall time for the simulation process. Then, a single simulation process handles all the Monte Carlo sample points, typically simulating these in sequential manner. The Monte Carlo grouping mechanism is illustrated by the inner loops of the flowchart of FIG. 5.

The PVT space may be multi-dimensional in terms of swept parameters. For example, a user may sweep power supply voltage in addition to sweeping a reference voltage in addition to sweeping a load capacitance. Swept parameters can be implemented as nested sweeps or multi-level sweeps within a circuit design environment. The nested sweeps are handled via multiple sweep levels as illustrated in the flowchart of FIG. 5, with each of these dimensions or swept variables being considered a "sweep level."

Figure 5:
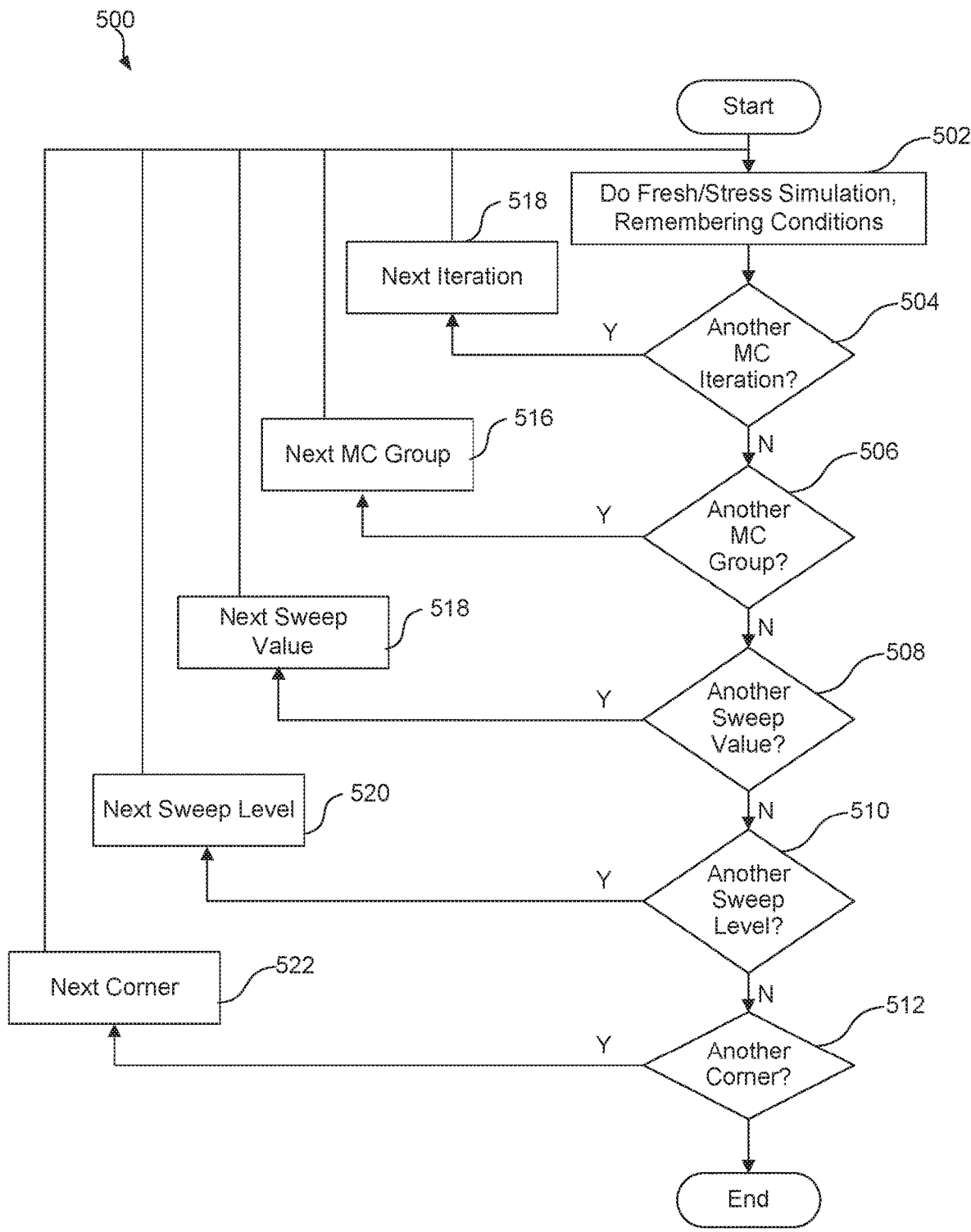
FIG. 5 illustrates a flowchart for first stage simulations over PVT in accordance with some aspects of the present disclosure.

FIG. 5 illustrates a flowchart for first stage simulations over PVT in accordance with some aspects of the present disclosure. At step 502, a fresh/stress simulation is performed for each PVT condition of the plurality of PVT conditions. The stresses and/or degradations data are stored and a path to the stored degradation/stresses is also stored. At step 504, a determination is made to whether another MC iteration is to be performed. The determination may include comparing a number of MC iterations to a MC counter. If it is determined that another MC iteration is to be performed, the process proceeds to step 514. If it is determined that there is no other MC iteration, then the process proceeds to step 506. At step 514, the MC counter is updated. Then, the process goes to step 502.

At step 506, a determination is made to whether another MC group exists. If it is determined that another MC group exists, the process proceeds to step 516. If it is determined that there is no other MC group, then the process proceeds to step 508. At step 516, a MC group counter is updated. Then, the process goes to step 502.

At step 508, a determination is made to whether a simulation for another sweep value is to be performed. If it is determined that another simulation for another sweep value is to be performed, the process proceeds to step 518. If it is determined that there is no other sweep value, then the process proceeds to step 510. At step 518, the sweep value is updated. Then, the process goes to step 502.

At step 510, a determination is made to whether simulation for another sweep level are to be performed. If it is determined that simulations for another sweep level are to be performed, the process proceeds to step 520. If it is determined that there is no other sweep level, then the process proceeds to step 512. At step 520, a sweep level is updated. Then, the process goes to step 502.

At step 512, a determination is made to whether simulations for another corner are to be performed. If it is determined that simulations for another corner are to be performed, the process proceeds to step 522. If it is determined that there is no other simulation for another corner, then the process end.

FIG. 6 illustrates an algorithm for the first stage simulations in accordance with some aspects of the present disclosure. Nested sweeps are implied by the sweep levels Lj. Process 500 of FIG. 5 and algorithm 600 of FIG. 6 may be modified. For example, the sweep level loop may be on the outside, with the corner loop on the inside.

As discussed previously herein, an association between a PVT condition and stress/degradation data is stored. Several alternate mechanisms may exist by which the PVT sample conditions and their associations with the stress/degradation output files (produced by the simulator during the fresh/ stress simulations) are tracked.

In one embodiment, a database may be employed in which the PVT sample conditions are stored to a table, with a row for each PVT sample. Each row is assigned a unique index. The file system paths to the output files containing the device stresses may be written to a second table within the database, also assigned a unique index. In an embodiment, the same index may be used for corresponding rows across the two database tables. In an embodiment, each database table may be augmented with an additional column which contains a 'link' (foreign key reference) to the corresponding record in the other table. The database may be a SQLite database or the like as would be understood by one of ordinary skill in the art. This provides the advantage of fast retrieval of the data from the database.

In one embodiment, a directory naming scheme may be employed to store the outputs of the simulation for each PVT sample of the PVT samples (e.g., outputs from process 500 of FIG. 5). The unique PVT condition may be encoded into the directory name. In other words, the directory name may be indicative of the PVT condition. For example, for a PVT sample where a parameter 'Vdd' is set to the value 1.0, where a parameter 'Vref' is set to a value 0.6, and where a simulation temperature is set to 25 degrees, the directory path representing the fresh simulations may be named as:

~/simulation/<circuitname>/
    Vdd=1.0_Vref=0.6_Temp=25.0/fresh where the portion in between the '<circuitname>' and '/fresh' encodes the PVT sample conditions delimited by a double underscore (_) By storing the device stress files/degradation files under such appropriately named directories, the device stress files/degradation files may be retrieved during the second stage simulations (e.g., step 404 of FIG. 4) by following the same directory naming convention/encoding. This provides the advantage of a convenient, low cost storage of the data.

In one embodiment, data from stresses simulations are stored in a text file. For example, the data may be encoded and stored in a file (e.g., using a parser). The data from the stresses simulations may be retrieved and decoded during the degraded simulations.

Figure 7:
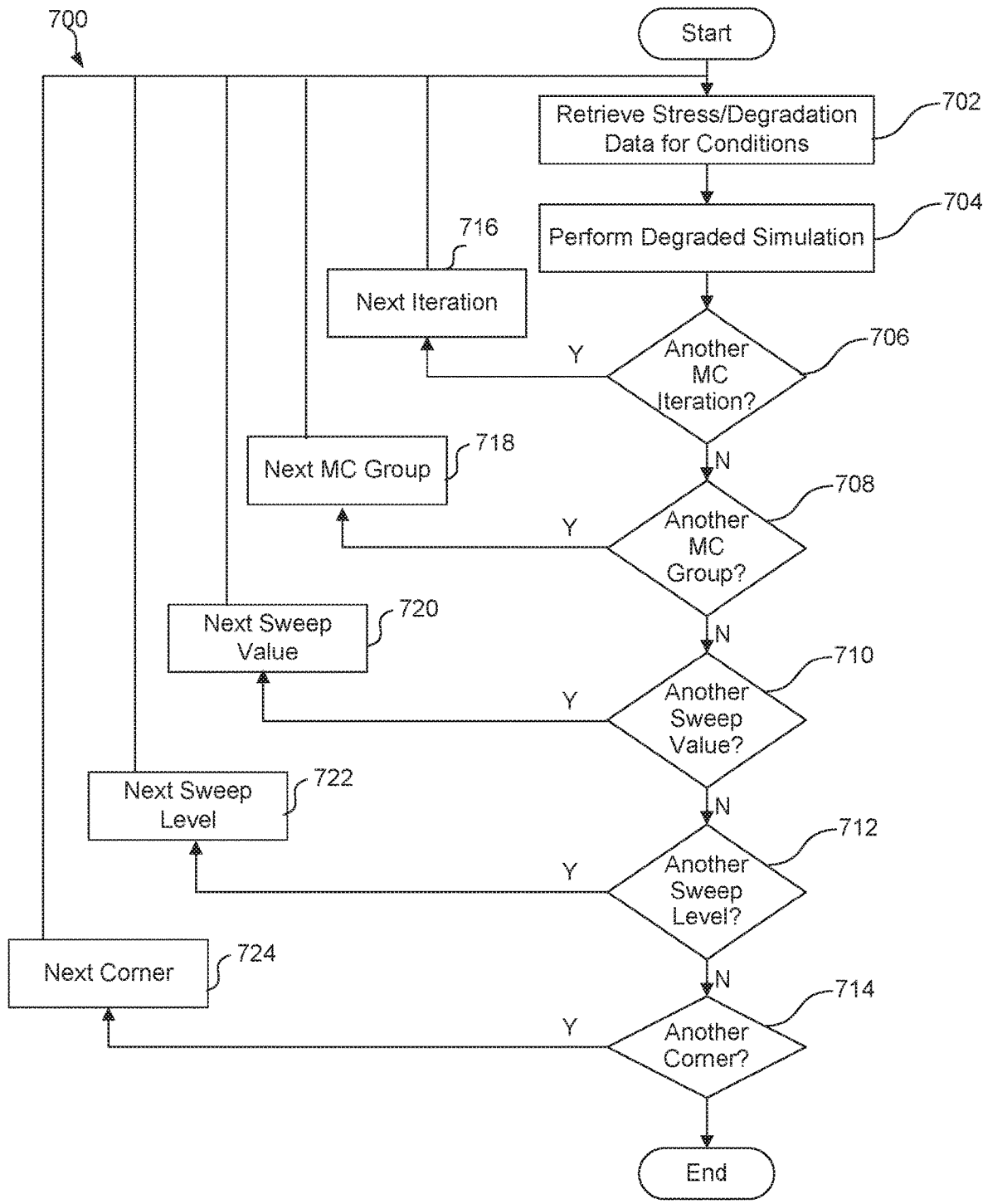
FIG. 7 illustrates a flowchart for second stage simulations in accordance with some aspects of the present disclosure.

In one embodiment, the correct directory path to the appropriate PVT-specific stress/degradation files produced during the first stage simulation is computed prior to running each of the second stage simulations, within the inner loop of the degraded second stage simulation runs of FIG. 7, and the simulator instructed to read the device stresses/degradations from this file.

FIG. 7 illustrates a flowchart 700 for second stage simulations in accordance with some aspects of the present disclosure. For example, process 700 may be performed at step 404 of FIG. 4.

The second-stage simulations are performed by considering the exact same PVT sample points after all first-stage simulations are completed. To ensure the results are fully deterministic when Monte Carlo sampling is involved, the same random number seed is used for the degraded (second stage) simulations of FIG. 7 as was used for the stress (first stage) simulations of FIG. 5. As for the fresh/stress first phase simulations, in the second phase the Monte Carlo simulations may be split up into the same sub groups depending on whether simulation startup/license acquisition/netlist parsing costs dominate the overall simulation process time, or whether the analysis portion dominates the time.

At step 702, the design environment looks up the database record corresponding to the PVT condition, or otherwise identifies the corresponding stress sample file saved from the first simulation and instructs the simulator to read the device-level stresses from this specific file. The stresses are then 'extrapolated out' to the desired circuit age (e.g. 10 years) by the simulator, and their impacts (degradations) on the device level parameters at that circuit age are computed by the aging models. The device level parameter degradations are then applied to the device level parameters. At step 704, the circuit (now considered aged) is simulated. By storing the PVT sample-specific stresses to a separate file for each PVT sample in the first simulation phase and reading these stresses from the same PVT sample-specific file at the beginning of the second simulation phase (in addition to using the same random number generator seed for both first and second stage simulations), the 1:1 correspondence between PVT sample conditions and stresses/aging is fully taken into account.

At step 706, a determination is made to whether another MC iteration is to be performed. The determination may include comparing a number of MC iterations to a MC counter. If it is determined that another MC iteration is to be performed, the process proceeds to step 716. If it is determined that there is no other MC iteration, then the process proceeds to step 708. At step 716, the MC counter is updated. Then, the process goes to step 702.

At step 708, a determination is made to whether another MC group exists. If it is determined that another MC group exists, the process proceeds to step 718. If it is determined that there is no other MC group, then the process proceeds to step 710. At step 718, a MC group counter is updated. Then, the process goes to step 702.

At step 710, a determination is made to whether a simulation for another sweep value is to be performed. If it is determined that another simulation for another sweep value is to be performed, the process proceeds to step 720. If it is determined that there is no other sweep value, then the process proceeds to step 712. At step 720, the sweep value is updated. Then, the process goes to step 702.

At step 712, a determination is made to whether simulation for another sweep level are to be performed. If it is determined that simulations for another sweep level are to be performed, the process proceeds to step 722. If it is determined that there is no other sweep level, then the process proceeds to step 714. At step 722, a sweep level is updated. Then, the process goes to step 702.

At step 714, a determination is made to whether simulations for another corner are to be performed. If it is determined that simulations for another corner are to be performed, the process proceeds to step 724. If it is determined that there is no other simulation for another corner, then the process end.

FIG. 8 illustrates an algorithm 800 for the second stage simulations (corresponding to the process shown in FIG. 7) in accordance with some aspects of the present disclosure. In one aspect, the first phase simulations illustrated in FIG. 5 and FIG. 6 involve a transient analysis. The aged simulations illustrated in FIG. 7 and FIG. 8 may include multiple other types of analyses for a more complete circuit characterization.

Hence, the simulation startup/license acquisition/netlist parsing cost may represent a much smaller portion of the overall simulation time in the second stage simulations when compared with the first stages (typically transient analysis only). In one embodiment, the Monte Carlo grouping setup may be different when performing the second stage simulations than when performing the first stage simulations. The number of Monte Carlo 'groups' may therefore be larger in the second stage simulations than in the first stage simulations, however the total number of Monte Carlo runs remain the same.

In one embodiment, the simulator observes/accumulates the stresses on the devices during the first stage simulations and writes a stress file representing a data structure reflective of these stresses. This is performed for each of the PVT sample conditions in process 500 of FIG. 5. At the beginning of each second stage simulation (e.g., process 700 of FIG. 7), these stresses are extrapolated into device level parameter degradations at the specified circuit age, and the circuit simulated with these degraded parameters (i.e., steps 707-724).

In an alternate embodiment, the extrapolation of the stresses and computation of the device level parameter degradations at the given circuit age is performed at the end of first stage simulation, for each of the PVT sample points (e.g., at step 512 of process 500). Instead of storing the accumulated stresses, the extrapolated device parameter degradations of the accumulated stresses at the desired circuit age are stored to a degradation file at the end of the first simulation phase. A separate degradation file is produced for each of each PVT sample points. In an embodiment, a database record is maintained by the design environment which associates the PVT sample conditions (swept parameter values, corners and/or Monte Carlo iterations) with each of these device parameter degradation files. During the second stage simulations (e.g., process 700 of FIG. 7), the database records written during the first phase are retrieved, the appropriate device level parameter degradation files are identified, and loaded for each of the PVT samples. The degradations are now directly applied to the device parameters, and the circuit (now considered aged) is simulated. Again, circuit waveforms may be stored for the first stage simulations on the 'freshly manufactured' circuits, and waveforms for the second stage simulations on the aged circuits.

Circuit simulation waveform databases may be substantial in size for large circuits. In one embodiment, the simulation directories used to perform the first stage simulations are deleted (wiped) to minimize disk space usage. The simulation directories may be re-used during the second stage simulations. Thus, there is a considerable savings in disk space required to store the circuit waveforms, as the second stage analysis results are stored in a manner that effectively overrides the first stage simulation results. However, the stress/degradation files from the first stage analyses are stored for each PVT sample point prior to wiping the directory clean of waveform database files when the directory is re-used for the second simulation. The stored stress/degradation files are substantially smaller than the waveform files, and don't significantly impact disk space requirements. The stress/degradation files however are therefore persisted after the second stage (degraded) analysis to facilitate debugging.

The effects of device aging on circuit waveforms and circuit measurements over PVT can cause circuits to fail to meet their specifications under certain conditions. To be able to debug and fix the circuits to meet their specifications in the presence of aging at those conditions, designers need a way to inspect not just circuit-level results, but also device-level results. Designers therefore need to be able to inspect the degradations on device-level parameters at any selected PVT condition.

Figure 9A:
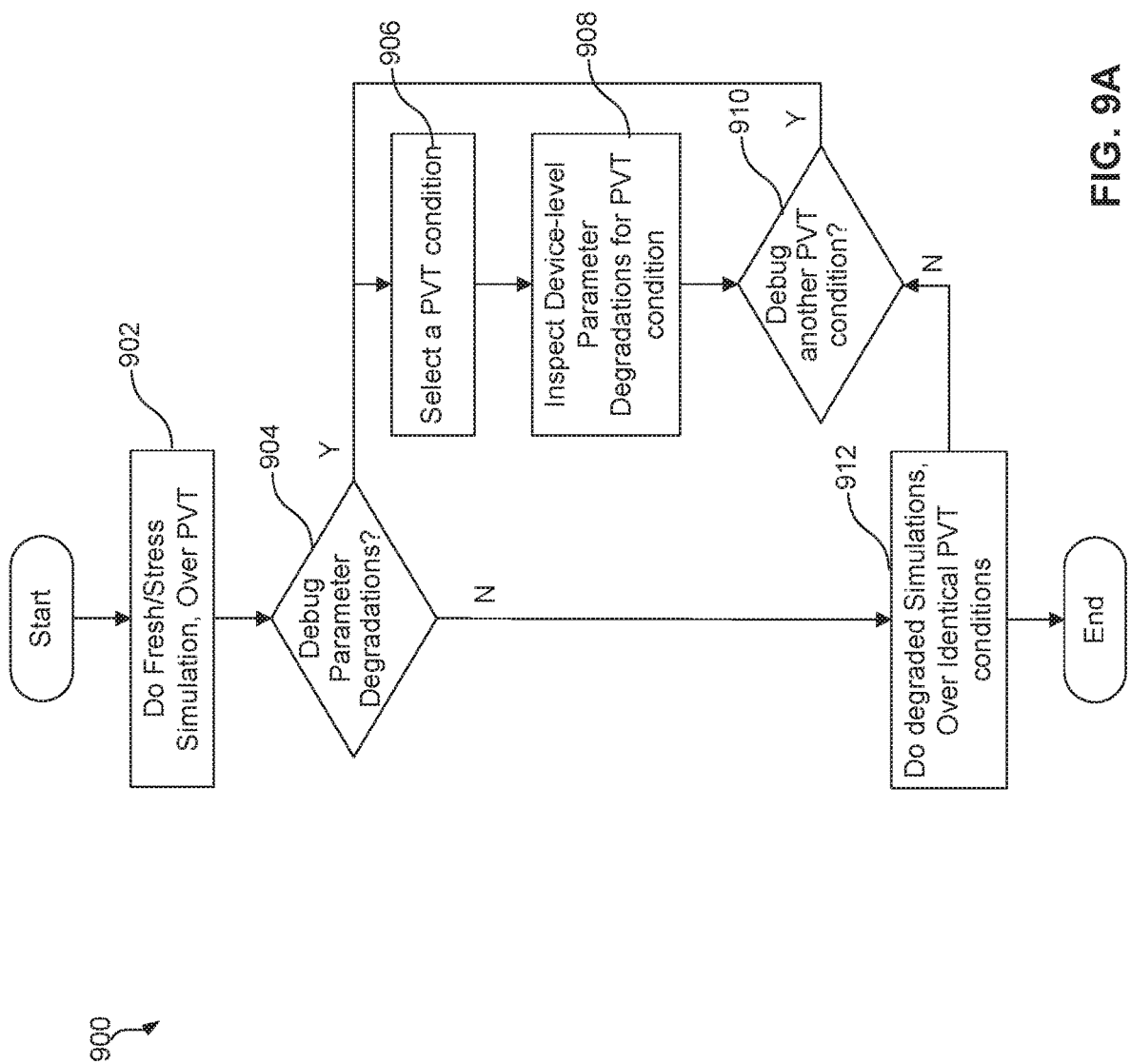
FIGS. 9A and 9B illustrate flowcharts for inspecting device level parameter degradations over PVT before and after second stage simulations, respectively, in accordance with some aspects of the present disclosure.
Figure 9B:
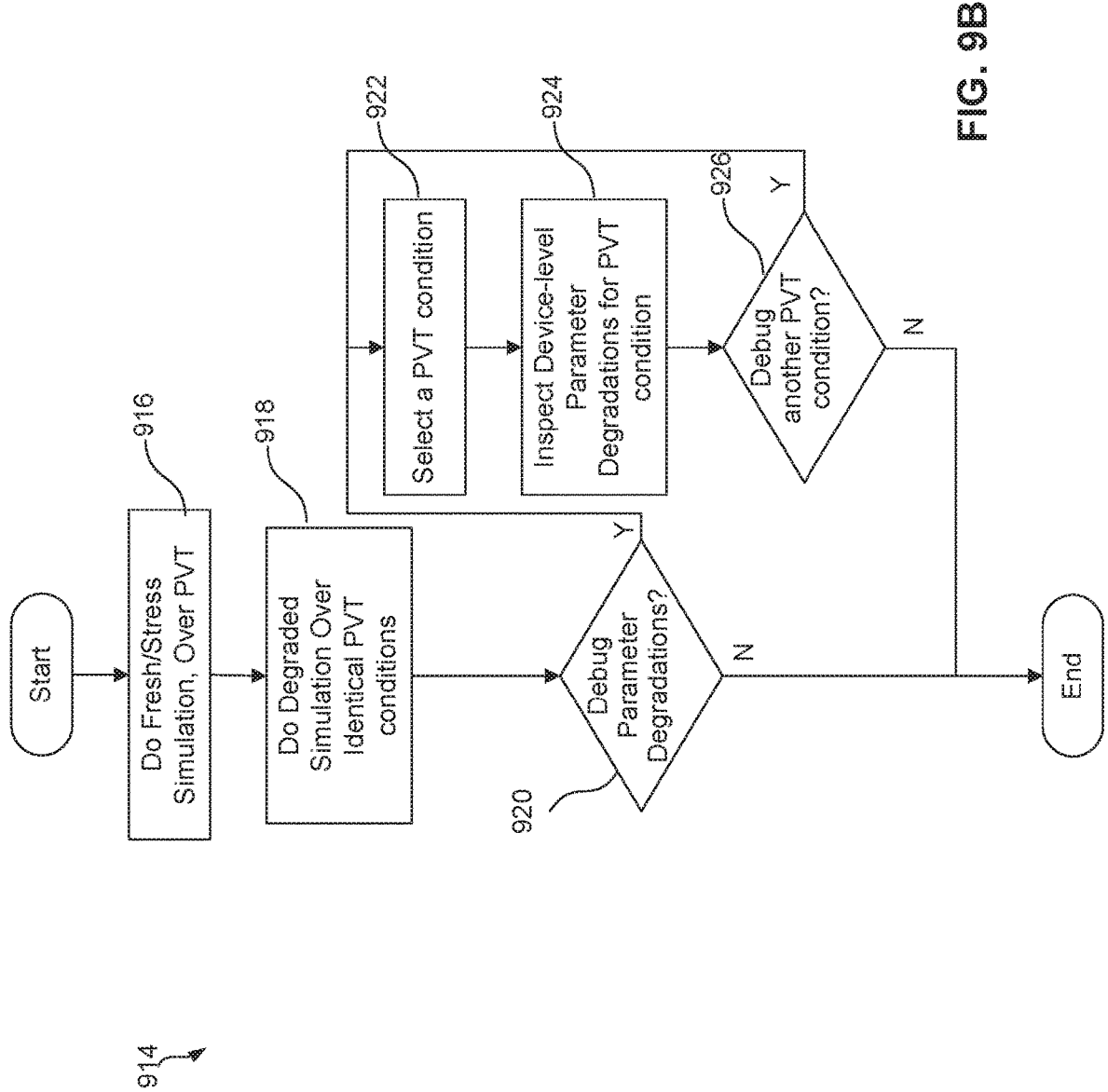

In one embodiment, a browser or graphical user interface is provided that allows the user to select a PVT condition. Responsive to the user's selection, the corresponding degradation file containing aging-induced deltas in or multipliers to device parameters such as threshold voltage, saturation current, or the like with respect to the fresh simulations is located. The device-level degradation parameter deltas and multipliers with respect to fresh simulations are presented in a tabular report. For any given selected PVT condition, the user is presented with the corresponding device level parameter degradations for all devices in the circuit, and can sort these by clicking on any column header, and the like as would be understood by one of ordinary skill in the art. The user can double click on any table row to highlight the corresponding device on the circuit schematic. In an embodiment, the device level parameter degradations are calculated at the end of the first stage simulations, and so the user may choose to inspect/debug the device level parameter degradations for specific PVT conditions as illustrated in FIG. 9A. In one embodiment, the degradations to model parameters at the desired circuit age may not be available until after the second stage simulations have been performed as illustrated in FIG. 9B.

FIG. 9A illustrates a flowchart for a process 900 for inspecting device level parameter degradations over PVT before second stage simulations in accordance with some aspects of the present disclosure.

Process 900 starts at step 902. At step 902, fresh/stress simulation are performed for the plurality of PVT conditions. At step 904, processing circuitry may determine whether a request to debug parameter degradations is received. In response to determining that a request to debug the parameter degradations is received, the process proceeds to step 906. In response to determining that a request to debug parameter degradations is not received, the process proceeds to step 912.

At step 906, a PVT condition is selected. For example, the PVT condition may be selected by a user via a user interface. At step 908, device level parameter degradations are inspected. For example, the device level parameter degradations for the PVT selected at step 906 are presented to the user via the user interface. At step 910, the simulator may determine whether a request to debug another PVT condition is received. In response to determining that there is another PVT condition, the process proceeds to step 906 where a new PVT condition is selected. At step 912, degraded simulations for the plurality of PVT conditions are performed.

FIG. 9B illustrates a flowchart for a process 914 for inspecting device level parameter degradations over PVT after second stage simulations in accordance with some aspects of the present disclosure.

At step 916, fresh/stress simulations are performed for the plurality of PVT conditions. At step 918, degraded simulations for the plurality of PVT conditions are performed.

At step 920, the simulator may determine whether a request to debug parameter degradations is received. In response to determining that a request to debug the parameter degradations is received, the process proceeds to step 922. In response to determining that a request to debug parameter degradations is not received, the process ends.

At step 922, a PVT condition is selected. For example, the PVT condition may be selected by a user via a user interface. At step 924, device level parameter degradation are inspected. For example, the device level parameter degradations for the PVT selected at step 922 are presented to the user via the user interface. At step 926, the processing circuitry may determine whether a request to debug another PVT condition is received. In response to determining that there is another PVT condition, the process proceeds to step 922 where a new PVT condition is selected. In response to determining that there is no other PVT condition, the process ends.

Figure 12:
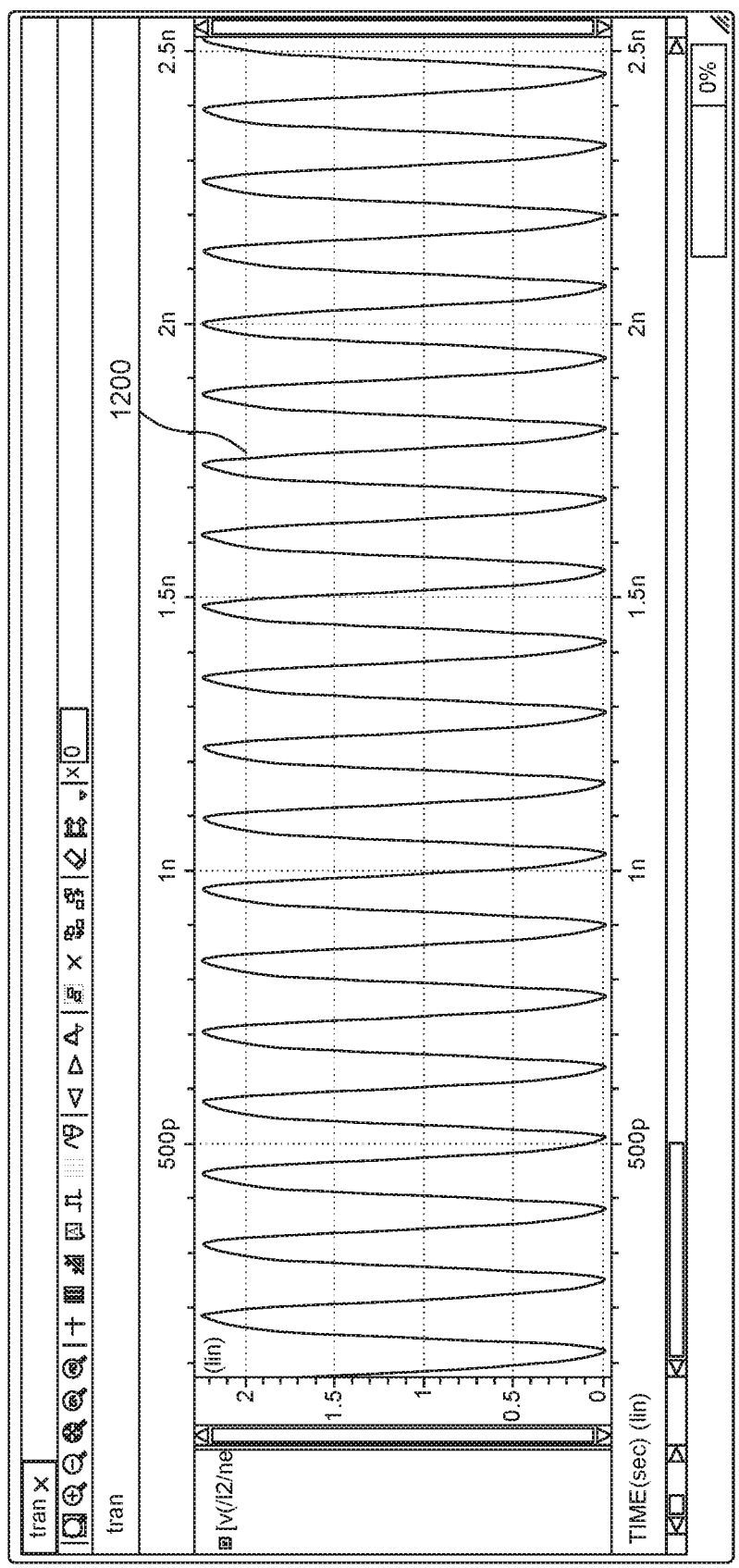
FIG. 12 illustrates a ring oscillator waveform for nominal conditions in a fresh device simulation.

FIG. 10 illustrates a setup 1000 for a nominal analysis for a fresh ring oscillator circuit. A nominal analysis was performed in which a fresh ring oscillator circuit was simulated for 15 ns. The nominal power supply voltage value of 2.2 volts was used, as was a nominal temperature value of 25 degrees. FIG. 11 illustrates nominal condition simulation results (maximum oscillation frequency) for the fresh ring oscillator circuit under the condition shown in FIG. 10. The maximum oscillation frequency for the circuit was measured at 7.72 GHz by field 1102 in FIG. 11. The corresponding ring oscillator waveform 1200 is shown in FIG. 12.

Figures 13, 14:
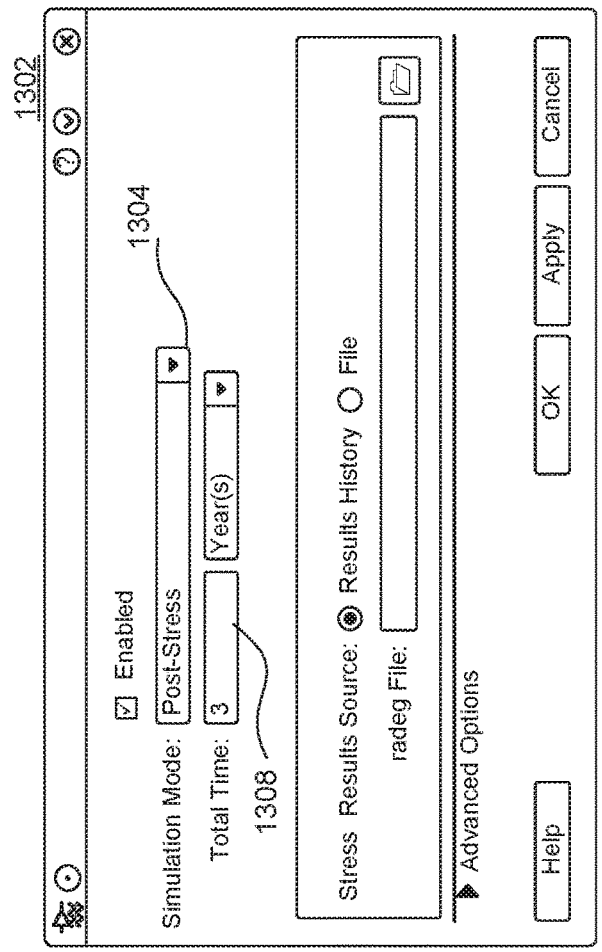
FIG. 13 illustrates the setup for a 3-year old degraded device simulation for nominal conditions.
FIG. 14 illustrates nominal condition simulation result (maximum oscillation frequency) for 3-year old aged devices.

FIG. 13 illustrates the setup for a 3-year old degraded device simulation for the nominal conditions shown in FIG. 10. Setup pane 1302 includes a simulation mode control 1304 and an age time control 1306. The simulation mode control 1304 shows that the device is aged to 3 years. The simulation mode control 1304 shows that the simulation mode is set to post stress.

FIG. 14 illustrates nominal condition simulation result (maximum oscillation frequency) for 3-year old aged devices. The results may be presented in a tabular form. For 3-year old aged/degraded devices, the oscillation frequency has reduced from 7.72 GHz to 7.56 GHz as shown in field 1402.

Figure 15:
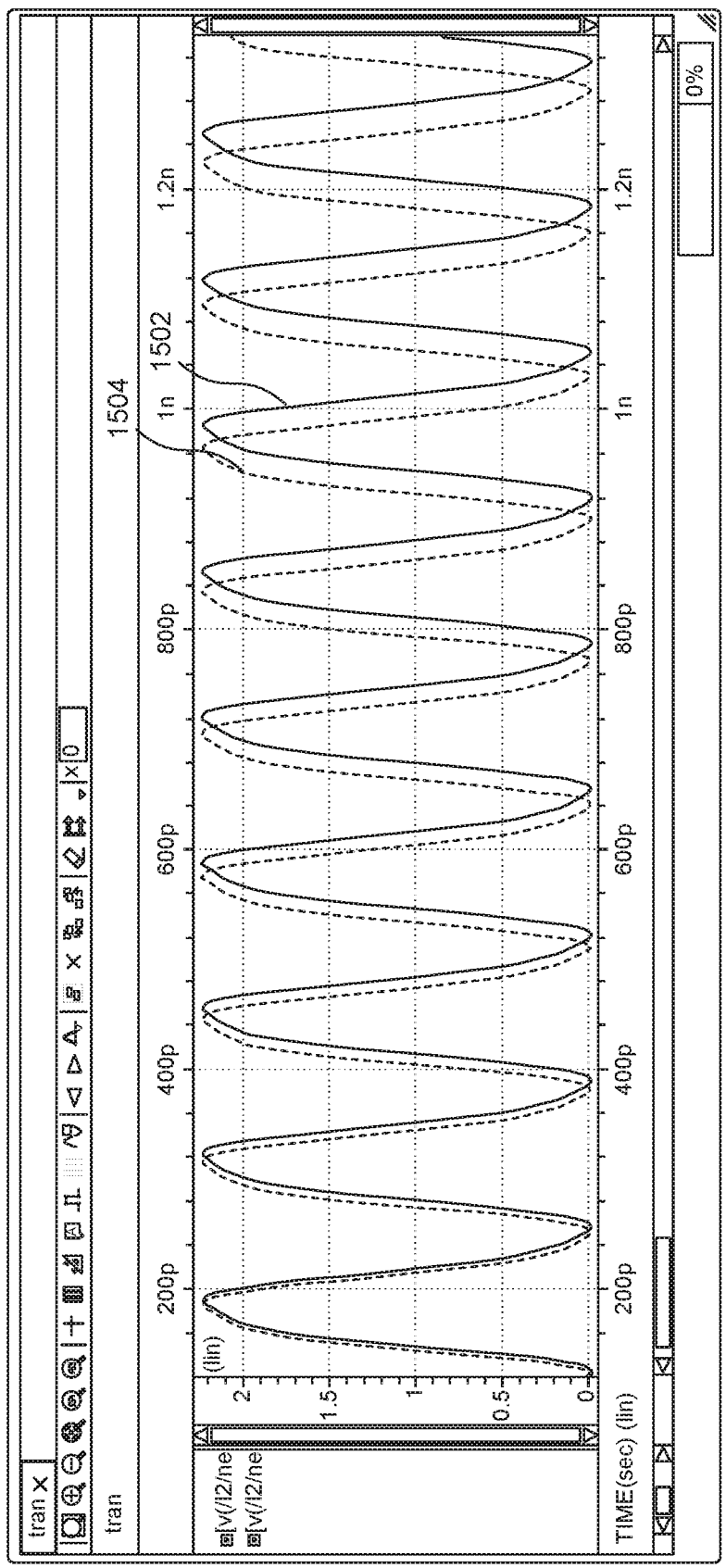
FIG. 15 illustrates ring oscillator waveform for nominal condition, fresh and aged device simulation, in accordance with some aspects of the present disclosure.

FIG. 15 illustrates ring oscillator waveforms for the nominal condition from the fresh and aged device simulation. Trace 1502 corresponds to the aged circuit waveform for the nominal condition shown in FIG. 10. Trace 145404 corresponds to the fresh circuit waveform for the same nominal condition. Trace 1502 (corresponding to the aged devices) clearly indicates a longer circuit oscillation period (which in turn indicates a reduced oscillation frequency), as would be expected for aged devices which have less current drive.

Aging Analysis with Corners Varying Temperature

To investigate the impact of circuit temperature on these results, a corner analysis experiment was setup up involving a set of discrete simulation corners which vary circuit temperature.

Figure 16:
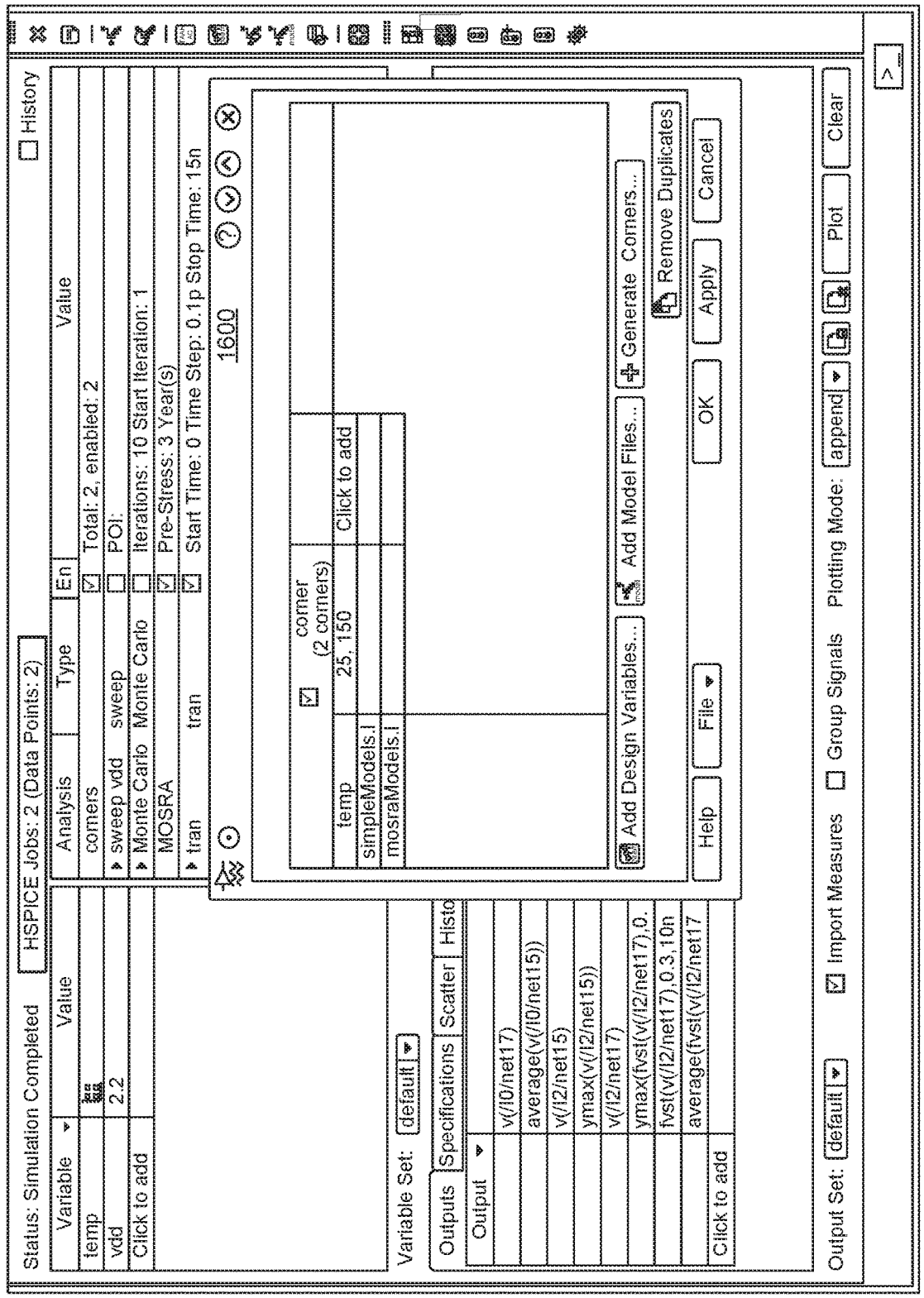
FIG. 16 illustrates simulation setup over multiple temperature values via a "corner analysis" simulation in accordance with some aspects of the present disclosure.

FIG. 16 illustrates a simulation setup over multiple temperature values via a "corner analysis" simulation. The setup for simulating over two discrete temperature values of 25 and 150 degrees, is shown in pane 1600. Fresh device simulations are repeated using the setup shown in FIG. 16.

FIG. 17 illustrates a corner condition simulation result for fresh devices. The corner condition simulation result may be shown in a tabular form, for example, table 1700. Field 1702 shows the oscillation frequency at the first temperature 25 degrees and Field 1704 shows the oscillation frequency at the second temperature value 150 degrees. Temperature had a significant impact on the oscillation frequency of the fresh circuit, where the higher temperature has reduced the oscillation frequency from 7.72 GHz to 5.66 GHz.

Figure 18:
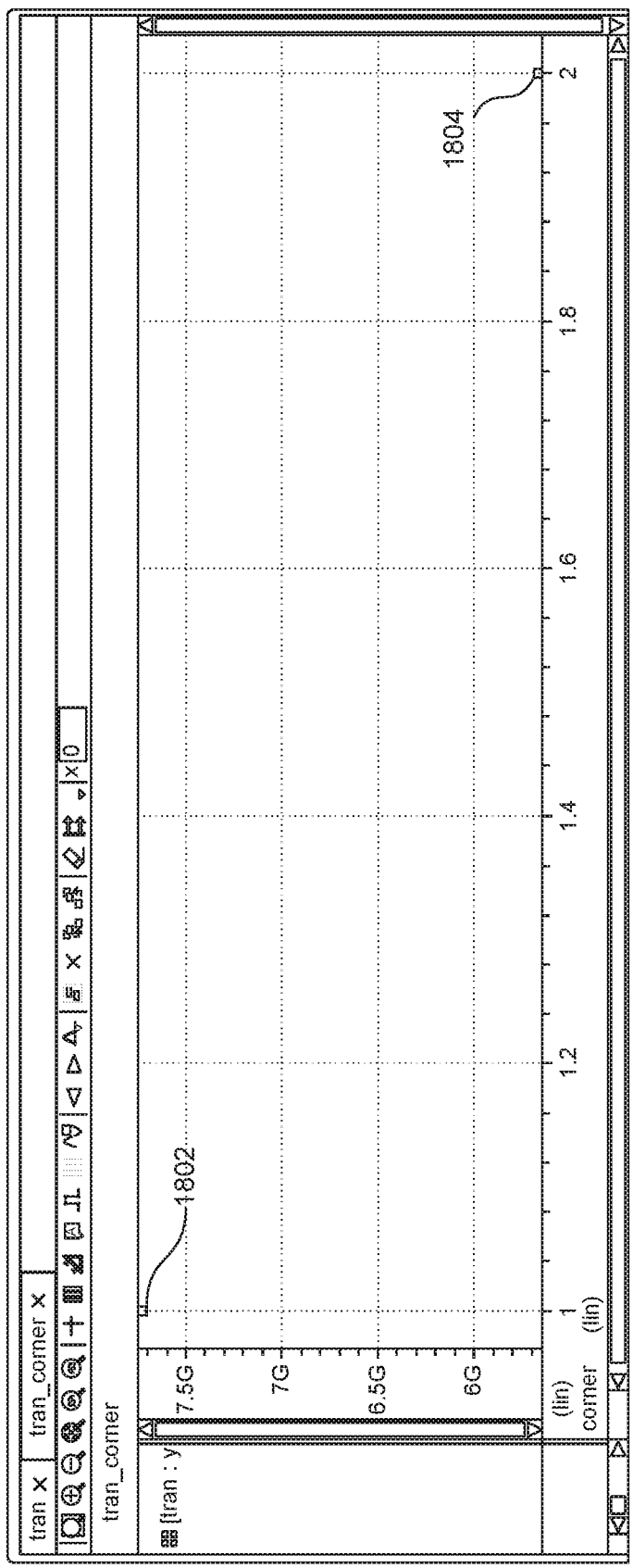
FIG. 18 illustrates the effects of temperature on circuit oscillation frequency in corner analysis in accordance with some aspects of the present disclosure.

FIG. 18 illustrates the effects of temperature on circuit oscillation frequency in corner analysis in a graphical form. Point 1802 represents the oscillation frequency for the first temperature value 25 degrees. Point 1804 represents the oscillation frequency for the second temperature value 150 degrees.

An aging analysis was then performed over these two environmental conditions.

FIG. 19 illustrates a corner condition simulation result (maximum oscillation frequency) for 3-year aged devices. The results are shown in table 1900. Field 1902 shows the oscillation frequency for three year old devices for the first temperature value. Field 1904 shows the oscillation frequency for three year old devices for the second temperature value. The oscillation frequency at the first temperature value has decreased from 7.72 GHz (fresh devices) to 7.56 GHz (aged devices) due to circuit aging. The oscillation frequency at the second temperature value has decreased from 5.66 GHz (fresh devices) to 5.62 GHz (aged devices).

Figure 20:
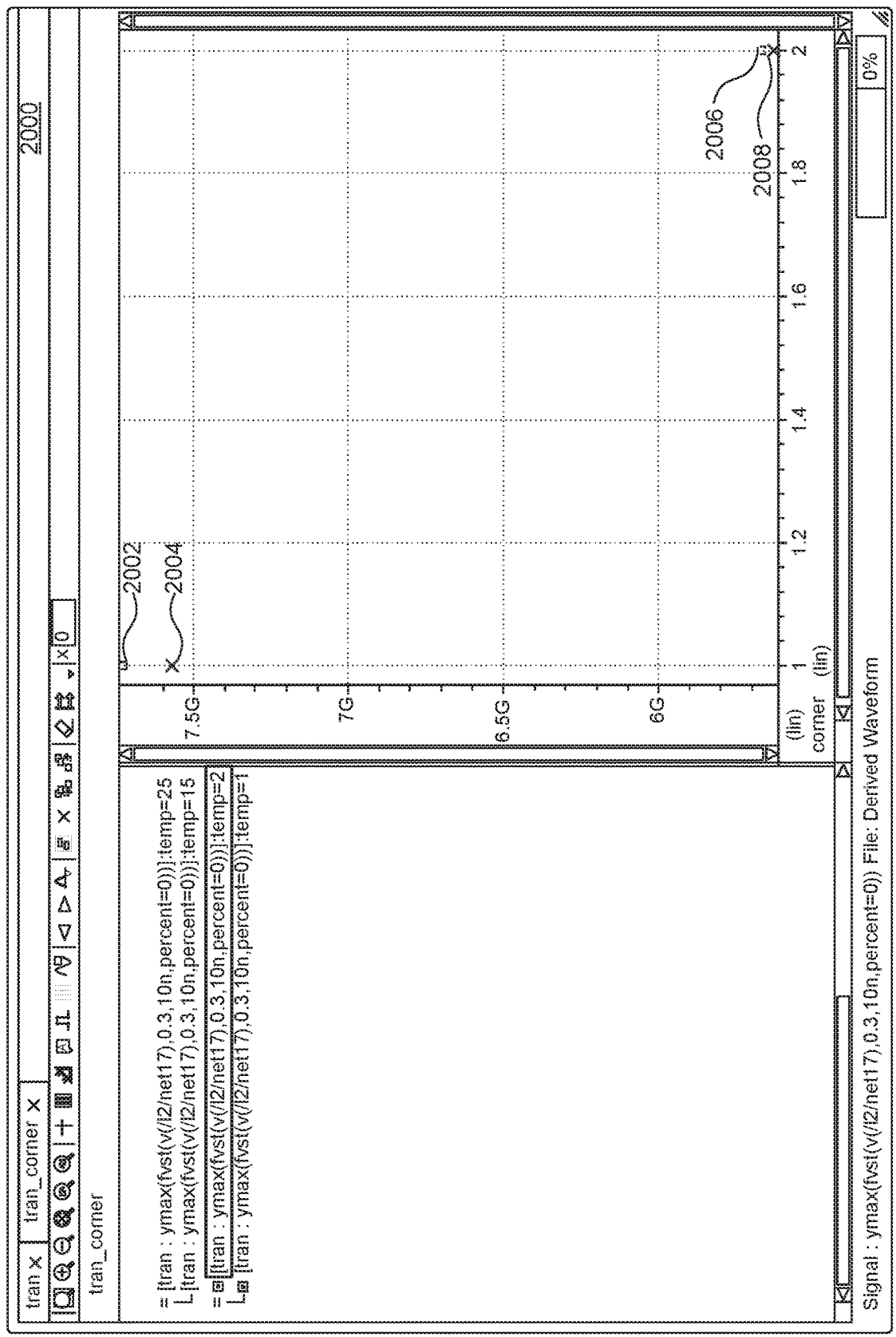
FIG. 20 illustrates a comparison of fresh and aged simulation results (maximum oscillation frequency) at two temperature conditions in accordance with some aspects of the present disclosure.

FIG. 20 illustrates a comparison of Fresh and Aged simulation results (maximum oscillation frequency) at two temperature conditions in a graphical form. Data points 2002 and 2004 correspond to the oscillation frequency at the low temperature (first temperature value) for the fresh and aged device, respectively. Data points 2006 and 2008 correspond to the oscillation frequency at the high temperature (second temperature value) for the fresh and aged device, respectively. Data points 2002, 2004 and point 2006, 2008 indicate an oscillation frequency degradation at low and at high temperature.

Figure 21:
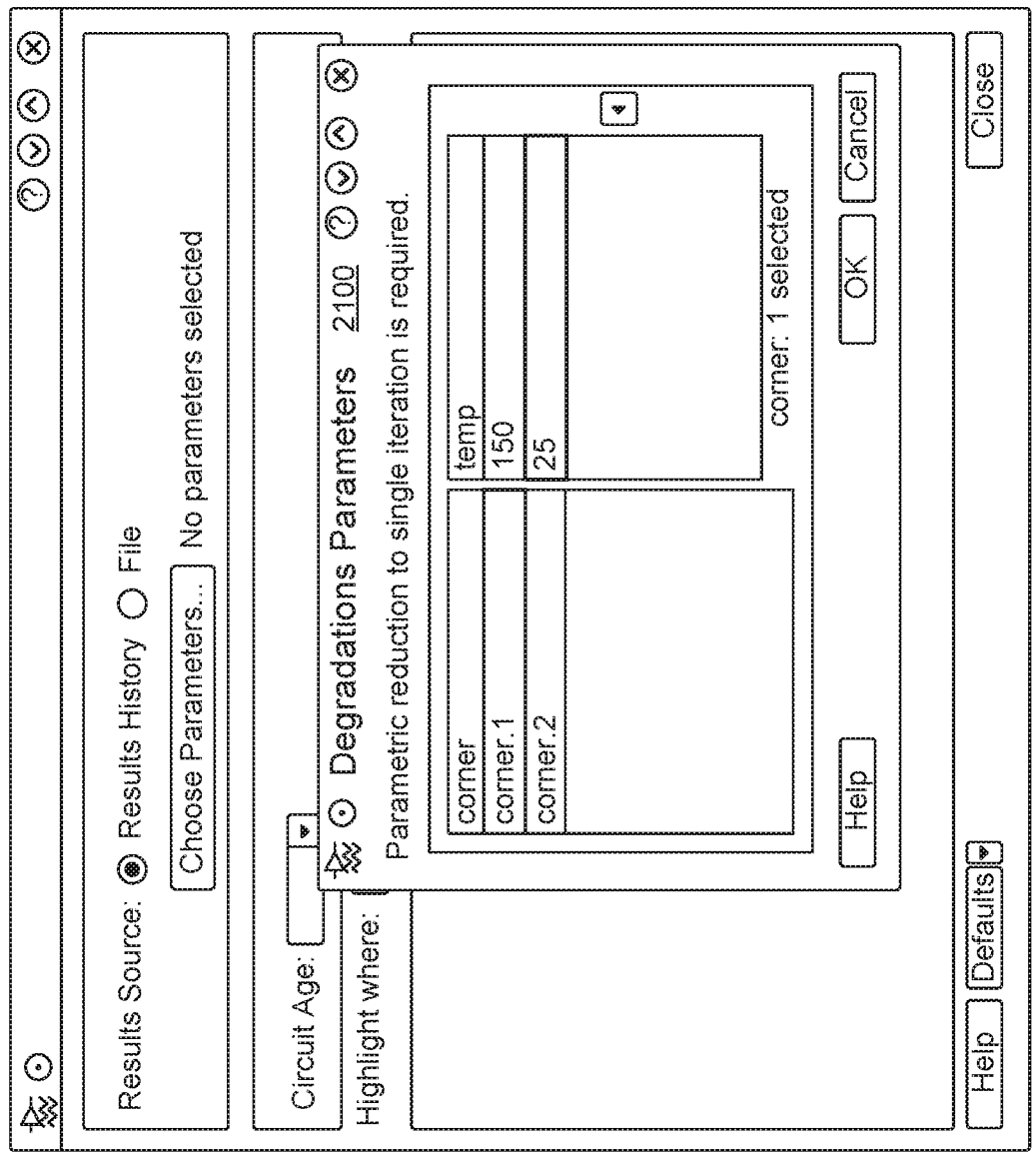
FIG. 21 illustrates a browser to inspect degradation coefficients for corner conditions in accordance with some aspects of the present disclosure.

FIG. 21 illustrates a browser 2100 to inspect degradation coefficients for corner conditions. The degradation browser 2100 is used to investigate the device-level causes to the circuit behavior at these temperature extremes. The degradation browser 2100 was used to view the transistor level degradations at the various corner-determined temperatures by selecting a particular corner combination.

Figure 22:
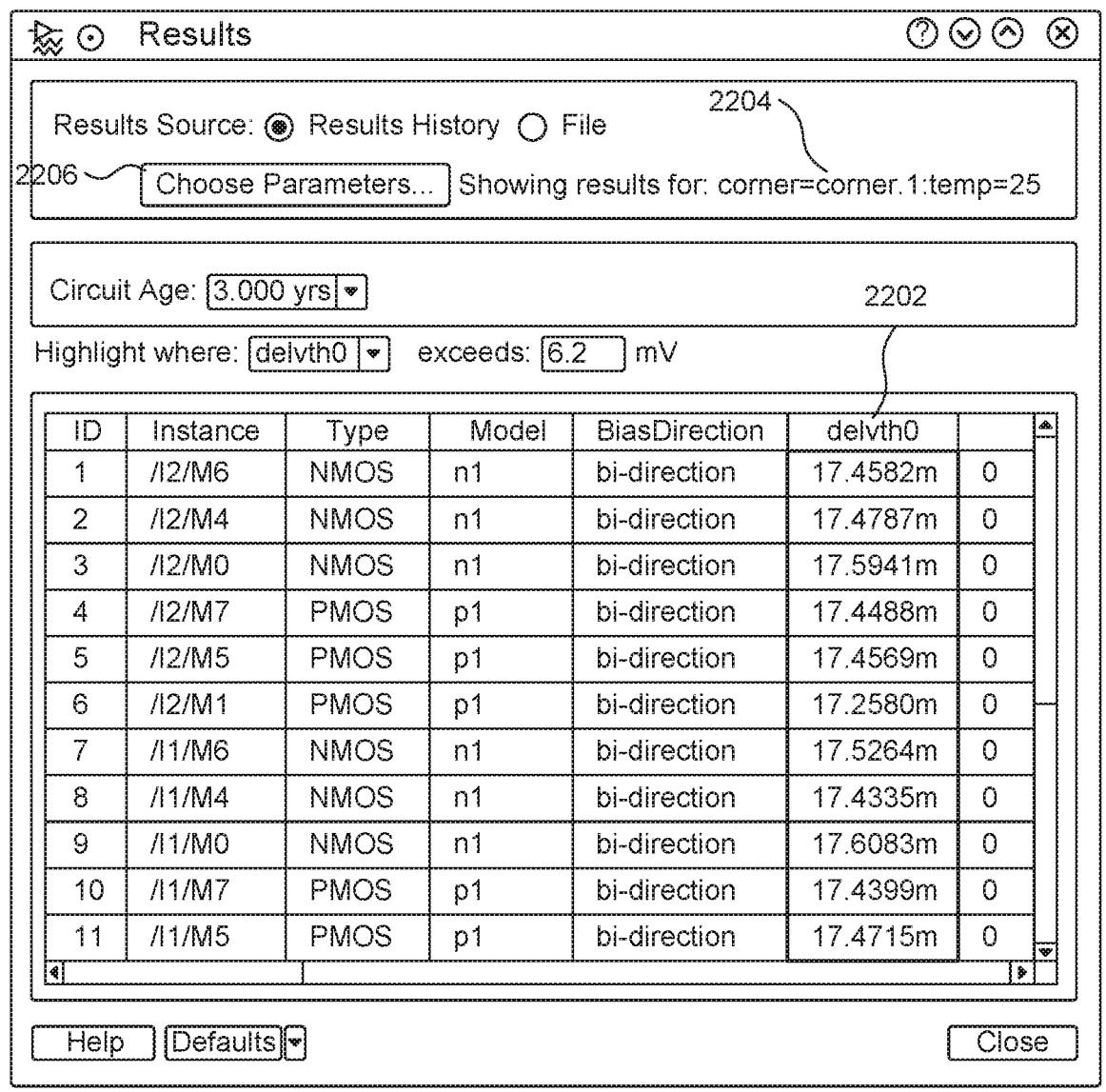
FIG. 22 illustrates device level degradations for first corner at temperature at 25 degrees in accordance with some aspects of the present disclosure.

FIG. 22 illustrates device level degradations for first corner at temperature at 25° C. The aging-related deltas (increases) in threshold voltage for the various devices in the circuit at the first corner, corresponding to a circuit operating temperature of 25 degrees, are in column 2202. Significant degradations to the transistor threshold voltage of approximately 17 milli-volts is seen. The PVT conditions corresponding to this set of device parameter degradations is indicated by a label 2204 near the "Choose Parameters" button 2206.

Figure 23:
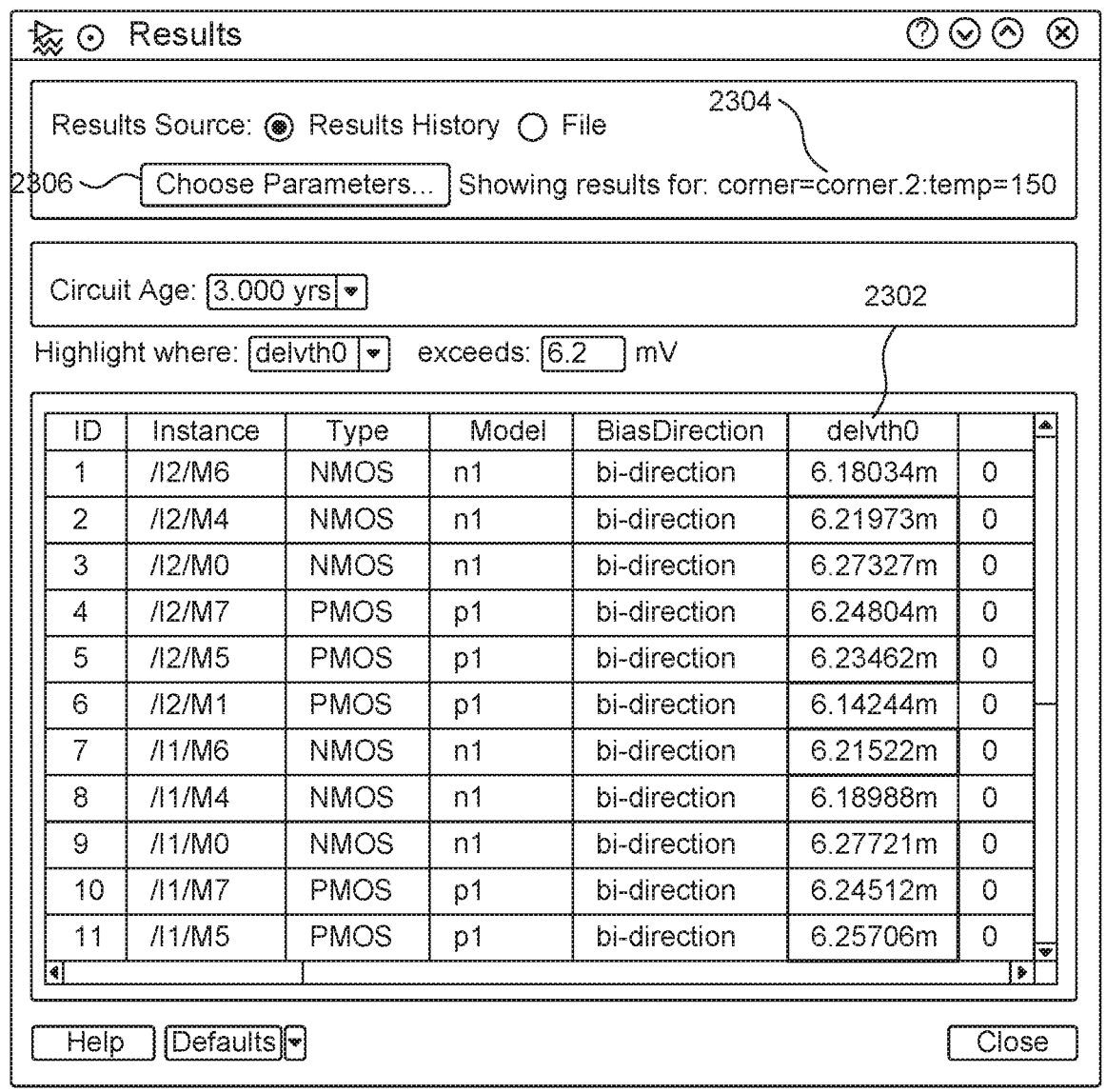
FIG. 23 illustrates device level degradations for first corner at temperature at 150 degrees in accordance with some aspects of the present disclosure.

FIG. 23 illustrates device level degradations for first corner at temperature at 150° C. The reductions in threshold voltage at the high temperature corner however are not as significant and are more in the range of 6 milli-volts as shown in column 2302. Again, the specific PVT sample conditions that correspond to this set of degradations are shown in a label 2304 near the top of the dialog, to the right of the "Choose Parameters" button 2306.

Aging Analysis with Sweeps, Varying Voltage

FIG. 24 illustrates a setup pane 2400 for swept rail voltage analysis. To investigate the impact of power supply rail voltage on these results, a swept analysis experiment was setup up involving a set of discrete rail voltage values over two voltage values of 2.0 and 2.2 volts. The Fresh device simulations were repeated under these conditions. Note that in this simulation setup, the Corners analysis which varies the circuit temperatures has been disabled, so that we are simulating with voltage variations only.

FIG. 25 illustrates the effects of rail voltage on Fresh device oscillation frequency. Decreasing the voltage from 2.2 to 2.0 volts decreases the Fresh device oscillation frequency from 7.72 GHz to 6.79 GHz as shown in table 2500.

Figure 26:
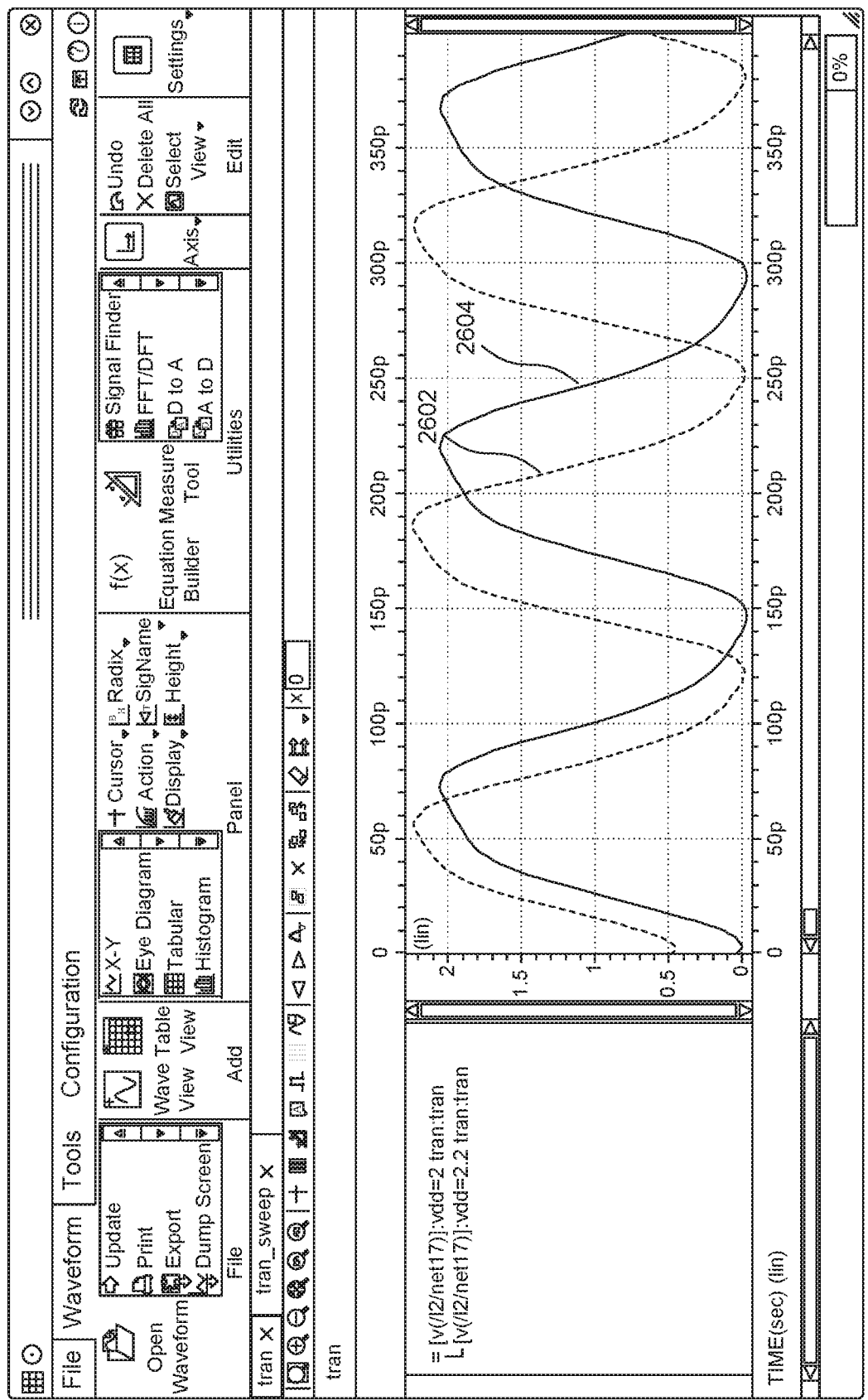
FIG. 26 illustrates a ring oscillator waveform of varying voltage conditions for fresh device simulation in accordance with some aspects of the present disclosure.

FIG. 26 illustrates a ring oscillator waveform of varying voltage conditions for Fresh device simulation setup shown in FIG. 24. Circuit waveform 2602 corresponds to a rail voltage of 2.2 volts. Circuit waveform 2604 corresponds to the lower 2.0 volts.

FIG. 27 illustrates the effects of aging on oscillation frequency at different rail voltages. Table 2700 shows the maximum oscillation frequency for the 3-year aged device simulations over these varying voltages.

Figure 28:
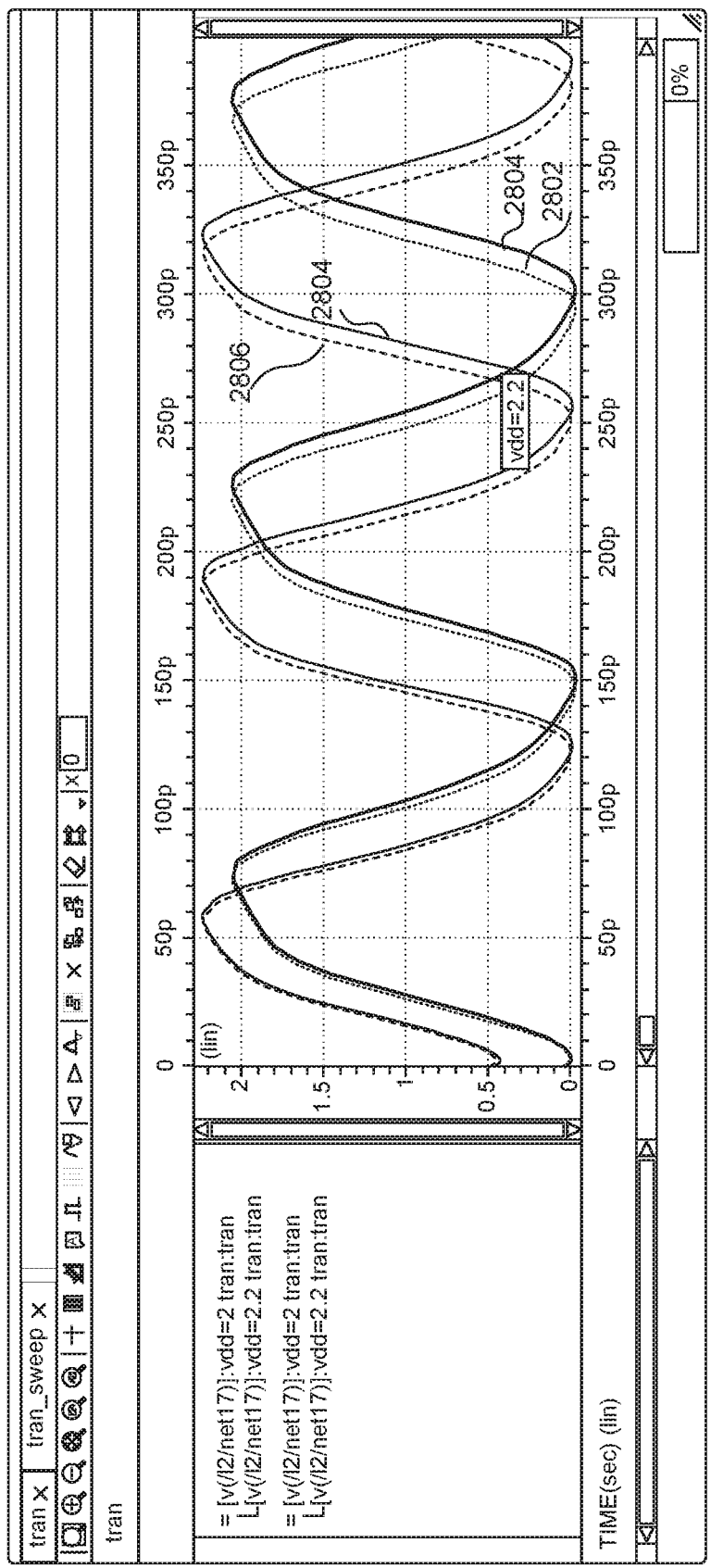
FIG. 28 illustrates a ring oscillator waveform for varying voltage conditions for fresh and aged device simulations in accordance with some aspects of the present disclosure.

FIG. 28 illustrates ring oscillator waveforms for varying voltage conditions for Fresh and Aged device simulation. Circuit waveform 2802 corresponds to the fresh devices for 2 volts. Circuit waveform 2804 corresponds to the aged devices for 2 volts. Circuit waveform 2806 corresponds to the fresh devices for 2.2 volts. Circuit waveform 2808 corresponds to the aged devices for 2.2 volts. In both cases, the effects of circuit aging can be seen to 'stretch out' the waveforms, increasing their period, and therefore decreasing circuit oscillation frequency.

Aging Analysis with Combined Sweep and Corner Analysis, Varying Voltage and Temperature FIG. 29 illustrates setup for combined voltage sweep and temperature corners. Pane 2900 shows the setup for Fresh simulation run over a combination varying temperature and voltage values.

FIG. 30 illustrates oscillation frequencies for fresh devices over voltage and temperature variations for the setup shown in FIG. 29. Column 3002 shows the maximum oscillation frequency.

Figure 31:
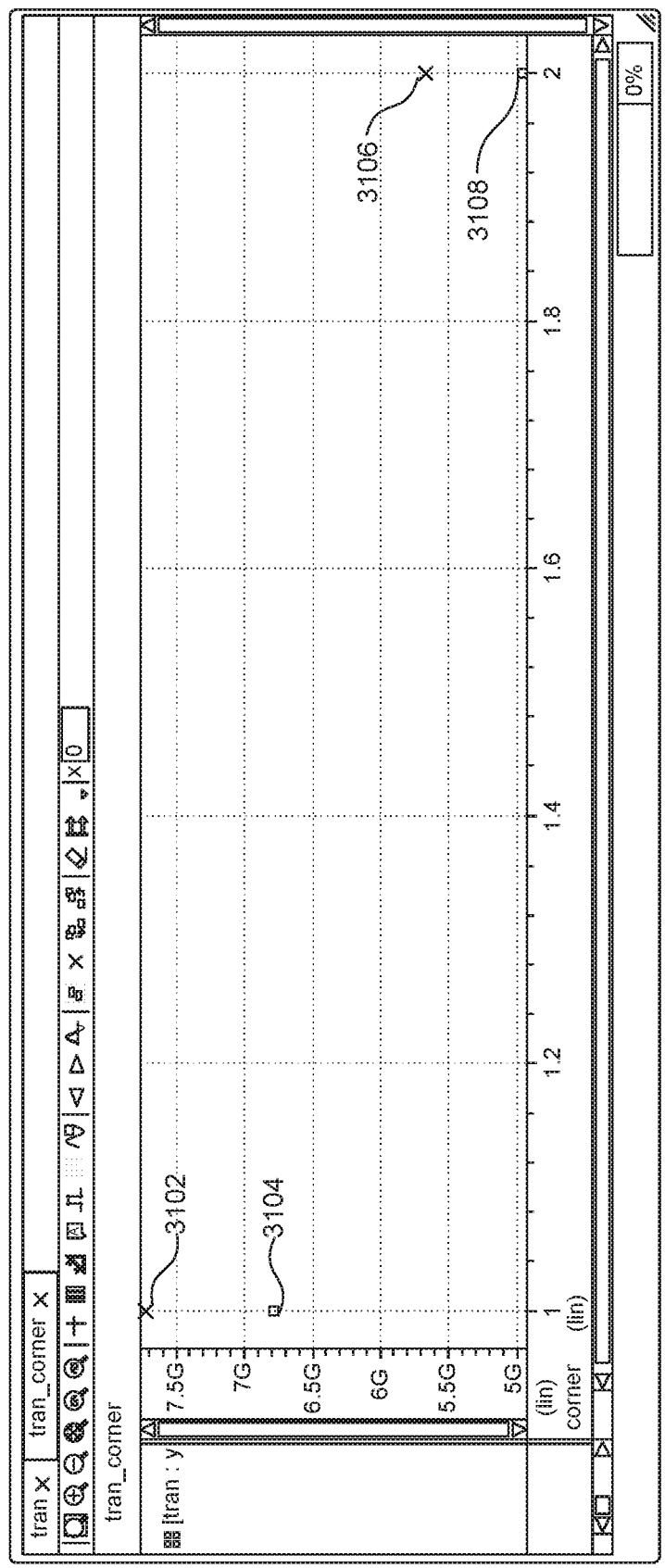
FIG. 31 illustrates oscillation frequencies for fresh devices over voltage and temperature variations in graphical form in accordance with some aspects of the present disclosure.

FIG. 31 illustrates oscillation frequencies for fresh devices over voltage and temperature variations in graphical form. Point 3102 corresponds to a voltage of 2.2 volts and a temperature of 25 degrees. Point 3104 corresponds to a voltage of 2 volts and a temperature of 25 degrees. Point 3106 corresponds to a voltage of 2.2 volts and a temperature of 150 degrees. Point 3108 corresponds to a voltage of 2 volts and a temperature of 150 degrees.

Figure 32:
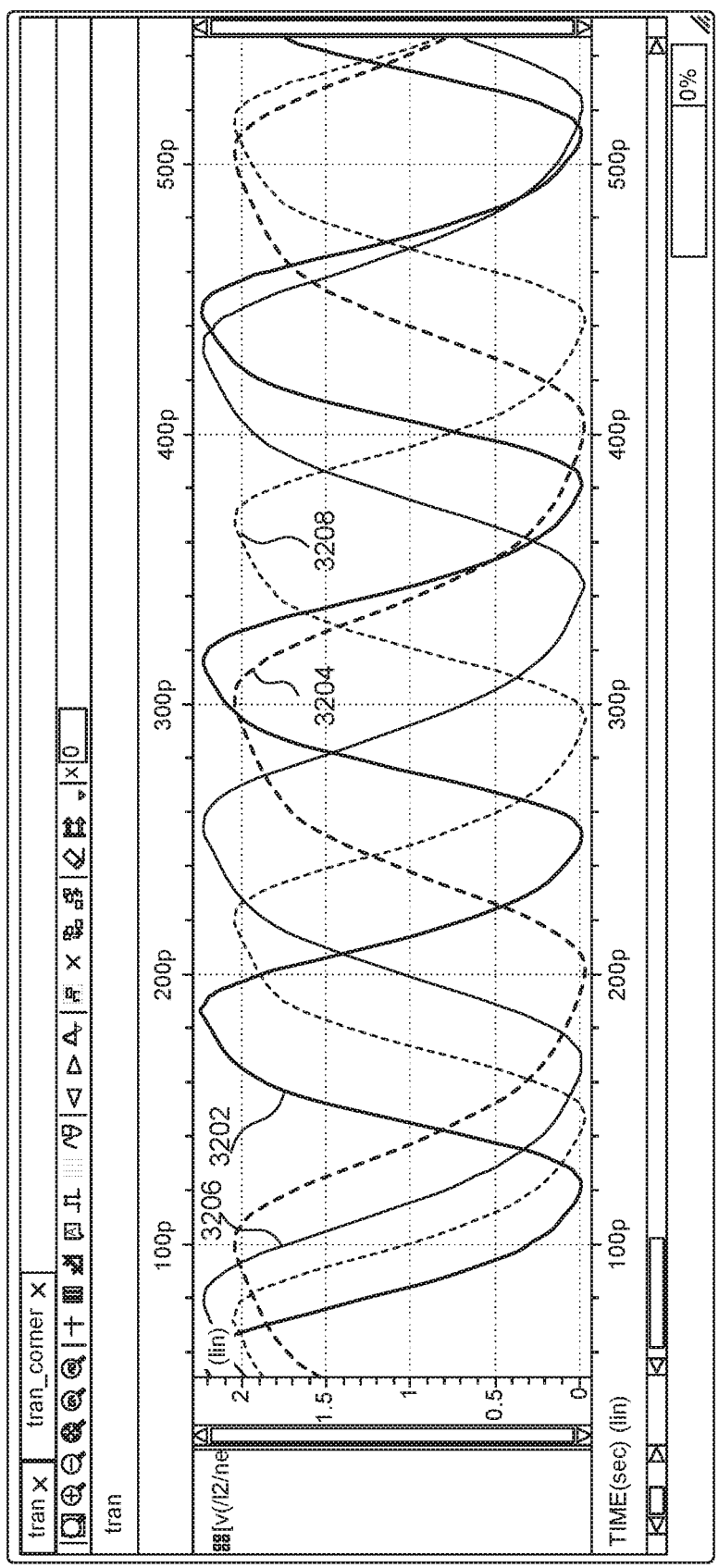
FIG. 32 illustrates oscillation waveforms for fresh devices over voltage and temperature variations in accordance with some aspects of the present disclosure.

FIG. 32 illustrates oscillation waveforms for fresh devices over voltage and temperature variations. Circuit waveform 3202 corresponds to voltage of 2.2 volts and a temperature of 25 degrees. Circuit waveform 3204 corresponds to a voltage of 2 volts and a temperature of 25 degrees. Circuit waveform 3206 corresponds to a voltage of 2.2 volts and a temperature of 150 degrees. Circuit waveform 3208 corresponds to a voltage of 2 volts and a temperature of 150 degrees.

Then, the aged-device simulations are run over the same conditions, the results are shown below in tabular form in FIG. 33, in graphical form in FIG. 34, and as waveforms in FIG. 35, superimposed with the corresponding waveforms for the fresh devices.

FIG. 33 illustrates effects of aging on oscillation frequency over voltage and temperature variations. Column 3302 in table 3300 shows the maximum oscillation frequency.

Figure 34:
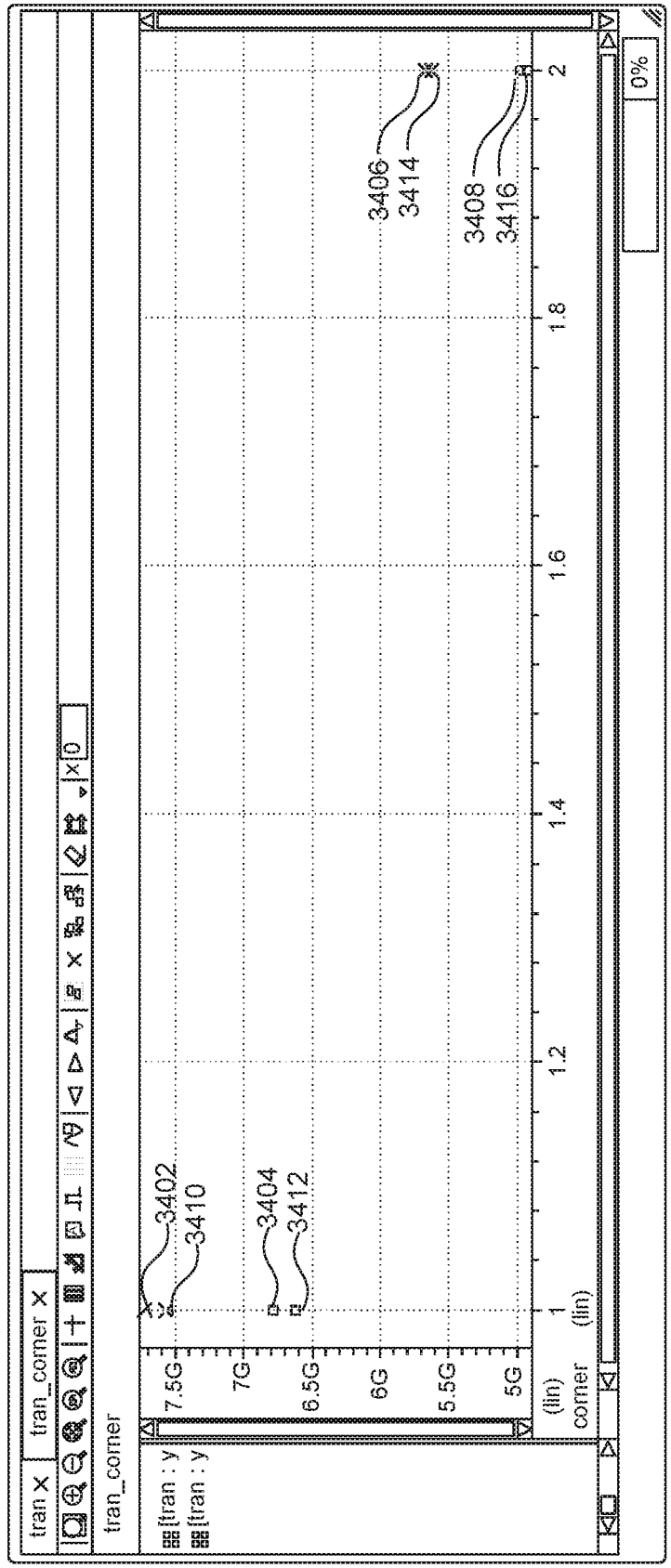
FIG. 34 illustrates oscillation frequencies for aged and fresh devices over voltage and temperature variations in graphical form in accordance with some aspects of the present disclosure.

FIG. 34 illustrates oscillation frequencies for aged and fresh devices over voltage and temperature variations in graphical form. Point 3402 corresponds to a voltage of 2.2 volts and a temperature of 25 degrees for a fresh device. Point 3404 corresponds to a voltage of 2 volts and a temperature of 25 degrees for a fresh device. Point 3406 corresponds to a voltage of 2.2 volts and a temperature of 150 degrees for a fresh device. Point 3408 corresponds to a voltage of 2 volts and a temperature of 150 degrees for a fresh device. Point 3410 corresponds to a voltage of 2.2 volts and a temperature of 25 degrees for the aged device. Point 3412 corresponds to a voltage of 2 volts and a temperature of 25 degrees for the aged device. Point 3414 corresponds to a voltage of 2.2 volts and a temperature of 150 degrees for the aged device. Point 3416 corresponds to a voltage of 2 volts and a temperature of 150 degrees for the aged device.

Figure 35:
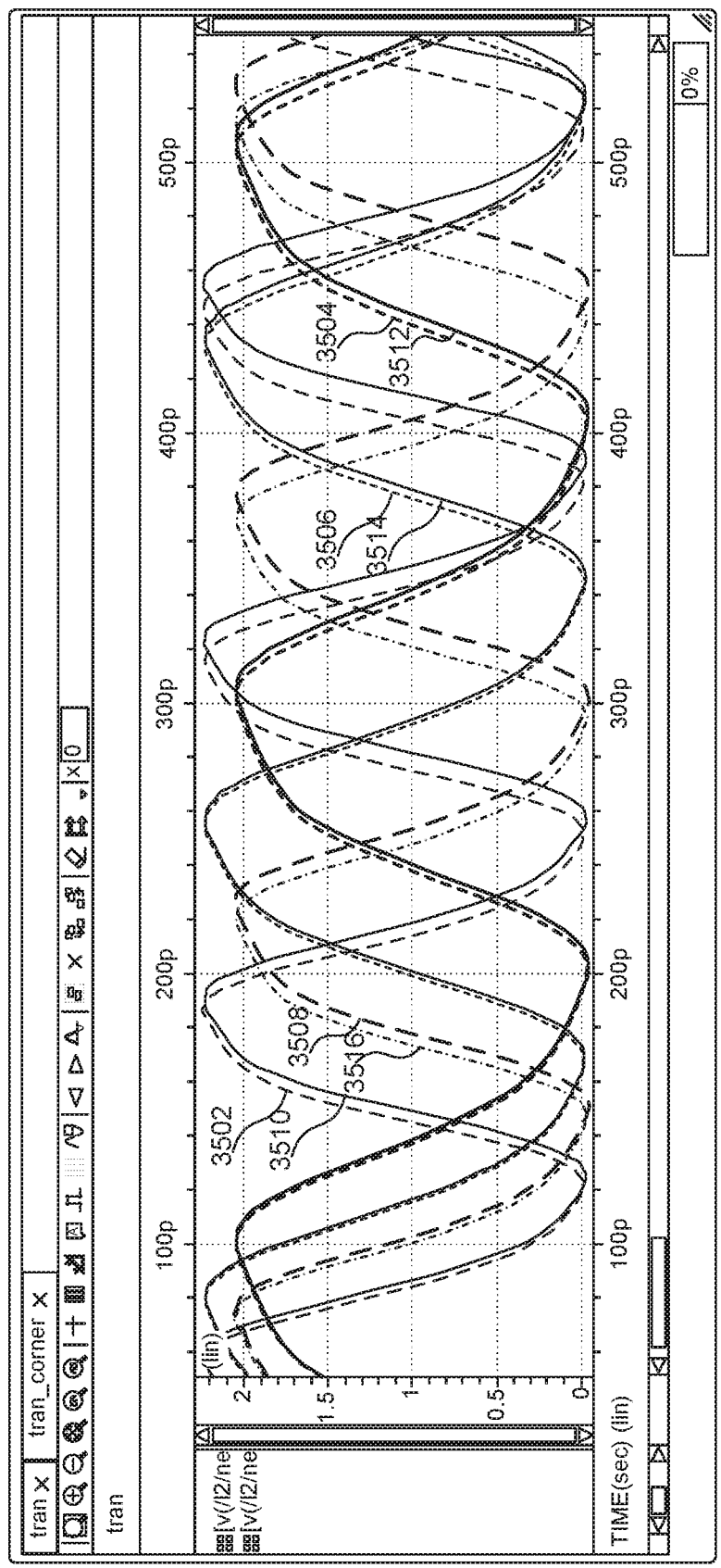
FIG. 35 illustrates oscillation waveforms for fresh and aged devices over both voltage and temperature variations in accordance with some aspects of the present disclosure.

FIG. 35 illustrates oscillation waveforms for fresh and aged devices over both voltage and temperature variations. Circuit waveform 3502 and circuit waveform 3510 correspond to a voltage of 2.2 volts and a temperature of 25 degrees for a fresh device and an aged device, respectively. Circuit waveform 3504 and circuit waveform 3512 correspond to a voltage of 2 volts and a temperature of 25 degrees for a fresh device and an aged device, respectively. Circuit waveform 3506 and circuit waveform 3514 correspond to a voltage of 2.2 volts and a temperature of 150 degrees for a fresh device and an aged device, respectively. Circuit waveform 3508 and circuit waveform 3516 correspond to a voltage of 2 volts and a temperature of 150 degrees for a fresh device and an aged device, respectively. The older devices have longer oscillation periods, and therefore reduced oscillation frequencies.

Aging Analysis with Monte Carlo Varying Process

To determine the effects of process variation alone on the circuit operation, an experiment was setup in which 100 Monte Carlo iterations were performed on a 2.2 volts rail voltage and a temperature of 25 degrees condition set. The setup is as shown in FIG. 36.

FIG. 36 illustrates the setup for Monte Carlo simulation to investigate process variations. Pane 3600 shows that a 100 Monte Carlo iterations are selected.

Figure 37:
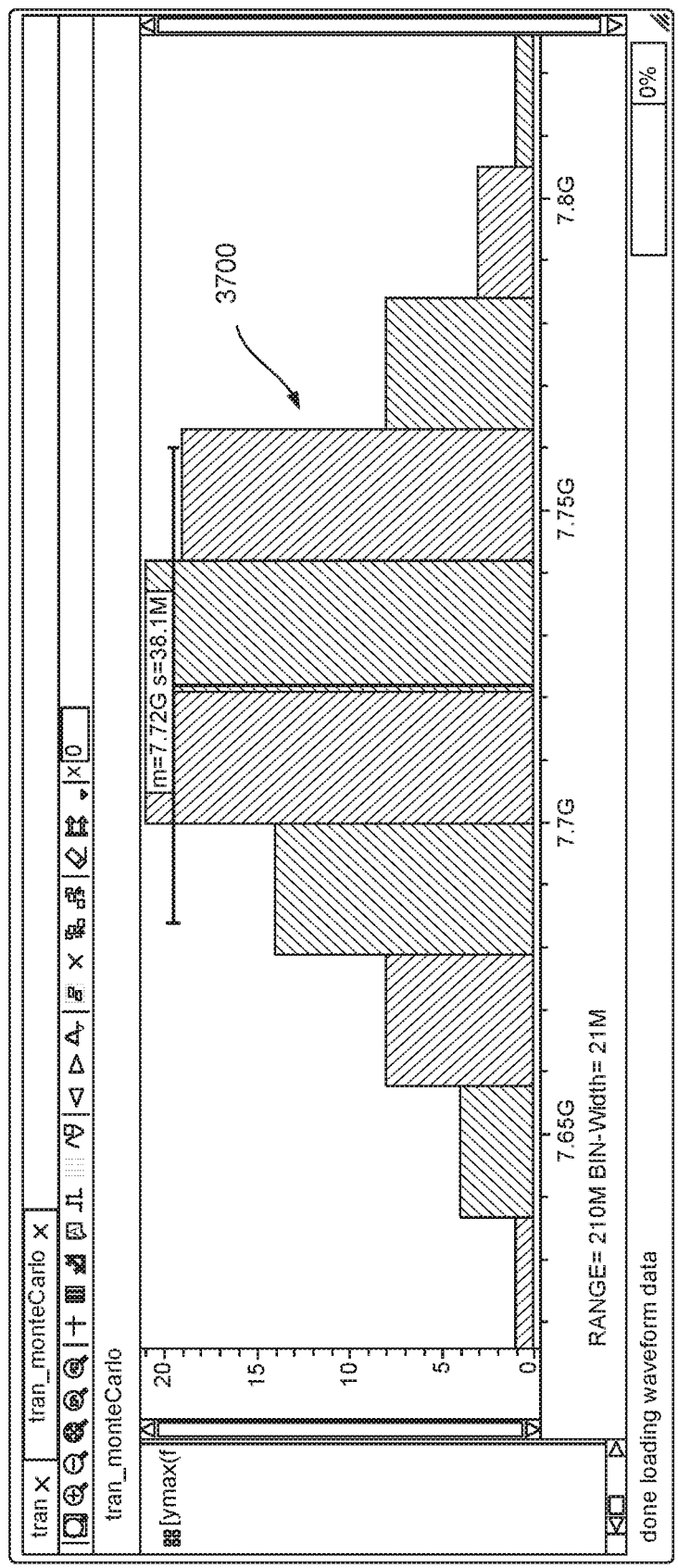
FIG. 37 illustrates a histogram showing maximum oscillation frequency distribution over process variation for fresh devices in accordance with some aspects of the present disclosure.

FIG. 37 illustrates a histogram 3700 showing the maximum oscillation frequency distribution over process variation for fresh devices. The mean oscillation frequency is 7.72 GHz, with a standard deviation of 38.1 MHz.

FIG. 38 illustrates statistics for circuit oscillation frequency over process variation for fresh devices. Table 3800 shows the statistics including the minimum, maximum, mean values and standard deviations for the setup shown in FIG. 36. The mean oscillation frequency is 7.72 GHz, as expected. This corresponds well to the nominal simulation results of FIG. 11.

Figure 39:
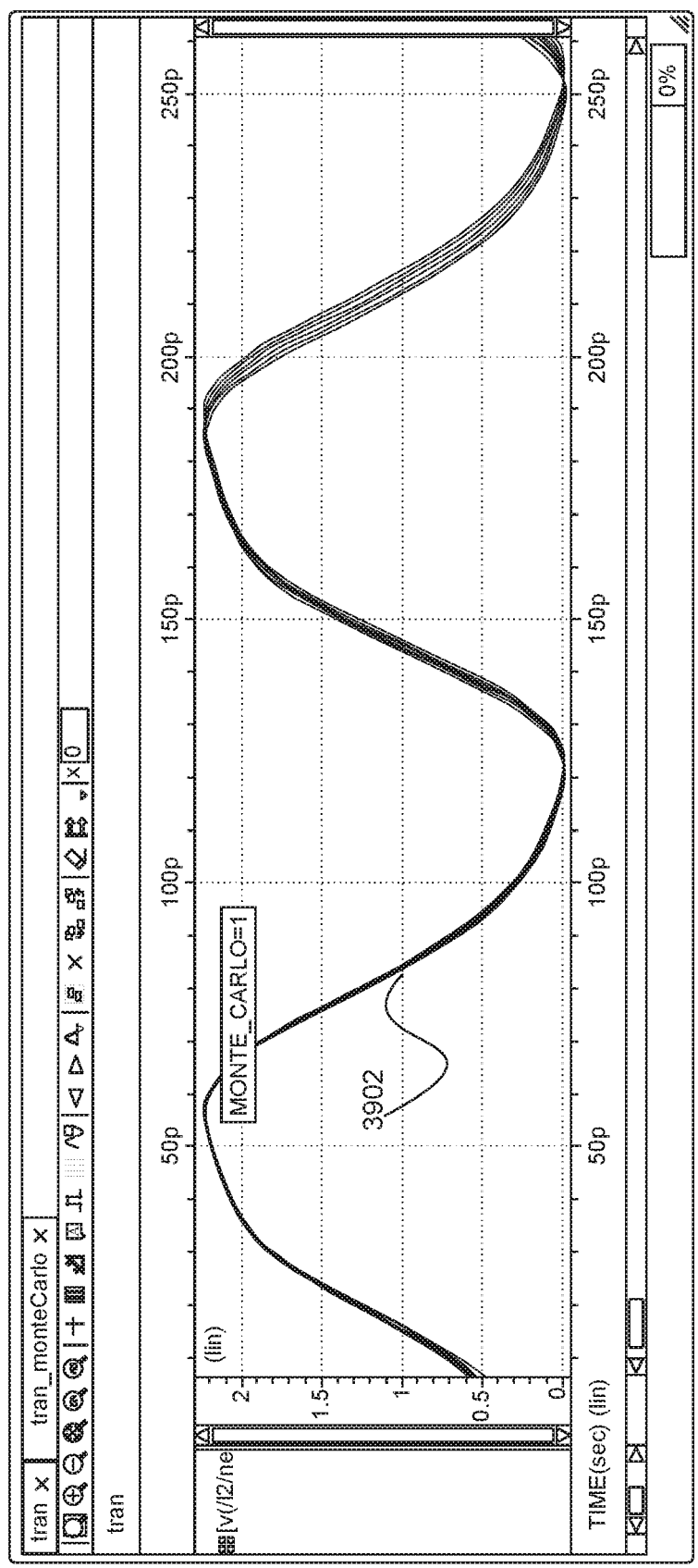
FIG. 39 illustrates waveforms for two oscillation periods of fresh devices with process variations in accordance with some aspects of the present disclosure.

FIG. 39 illustrates circuit waveforms 3902 for two oscillation periods of fresh devices with process variations.

Figure 40:
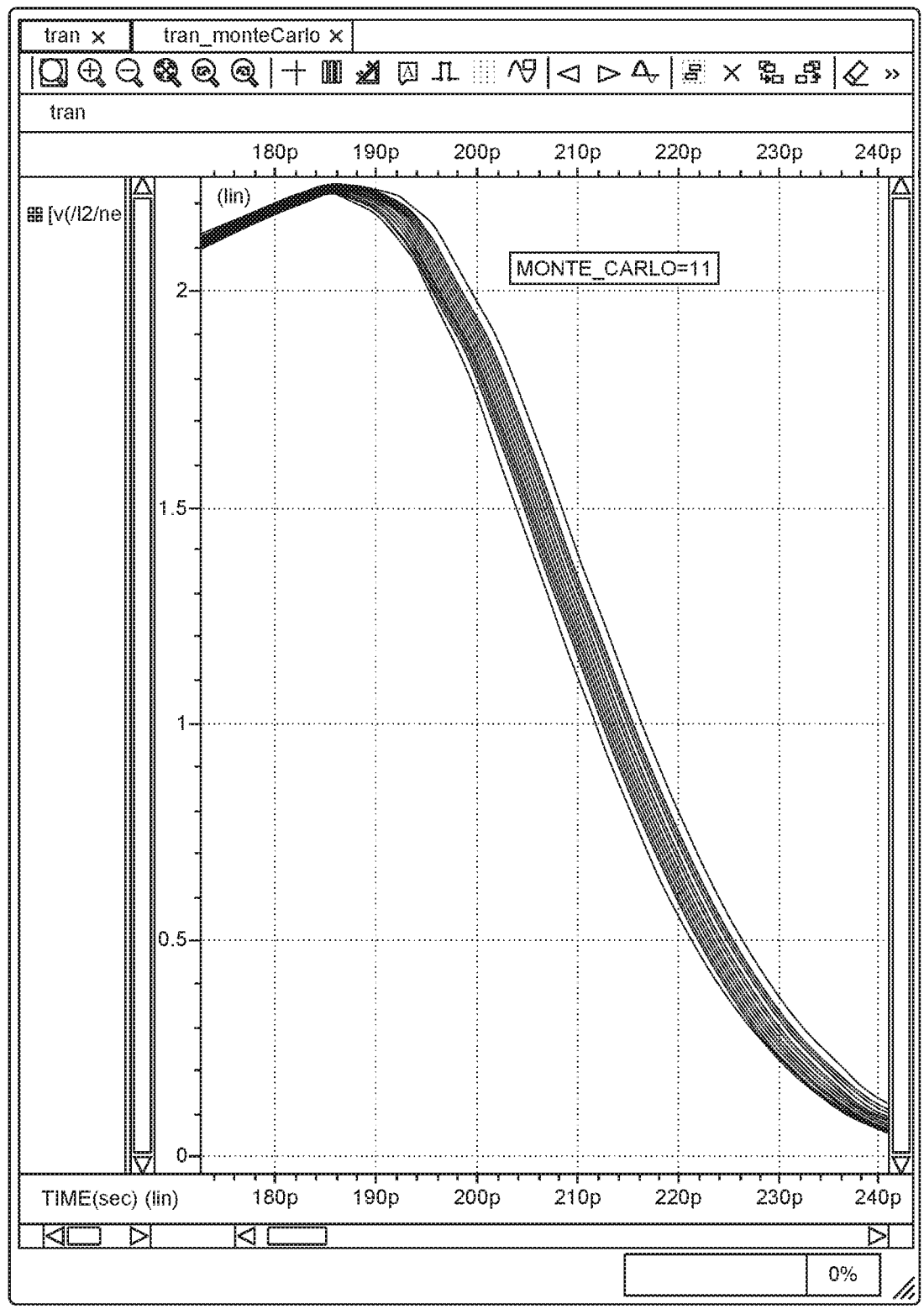
FIG. 40 illustrates a closeup of waveforms of fresh devices with process variations in accordance with some aspects of the present disclosure.

FIG. 40 illustrates a zoomed in view of the circuit waveforms 3902 of fresh devices with process variations. The zoomed in view is around for 210 ps. The experiment is repeated for 3-year aged devices. The histogram and statistics are shown in FIG. 41 and FIG. 42, respectively.

Figure 41:
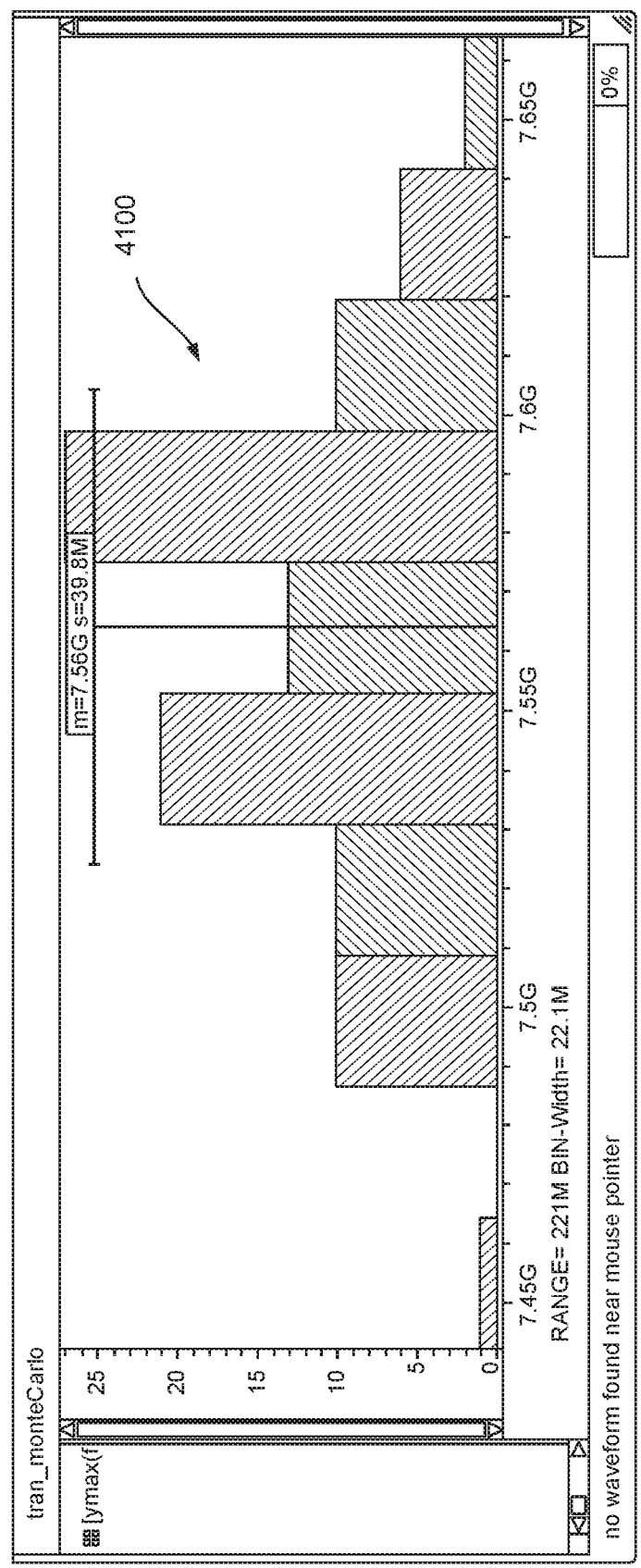
FIG. 41 illustrates a histogram showing maximum oscillation frequency distribution over process variation for 3-year aged devices in accordance with some aspects of the present disclosure.

FIG. 41 illustrates a histogram 4100 showing maximum oscillation frequency distribution over process variation for 3-year aged devices. FIG. 42 illustrates a table 4200 showing statistics for circuit oscillation frequency over process variation for 3-year aged devices.

The mean oscillation frequency is reduced from 7.72 GHz to 7.56 GHz due to aging when process variations are considered. The standard deviation has increased from 38.1 MHz (fresh devices) to 39.8 MHz (3-year aged devices).

Figure 43:
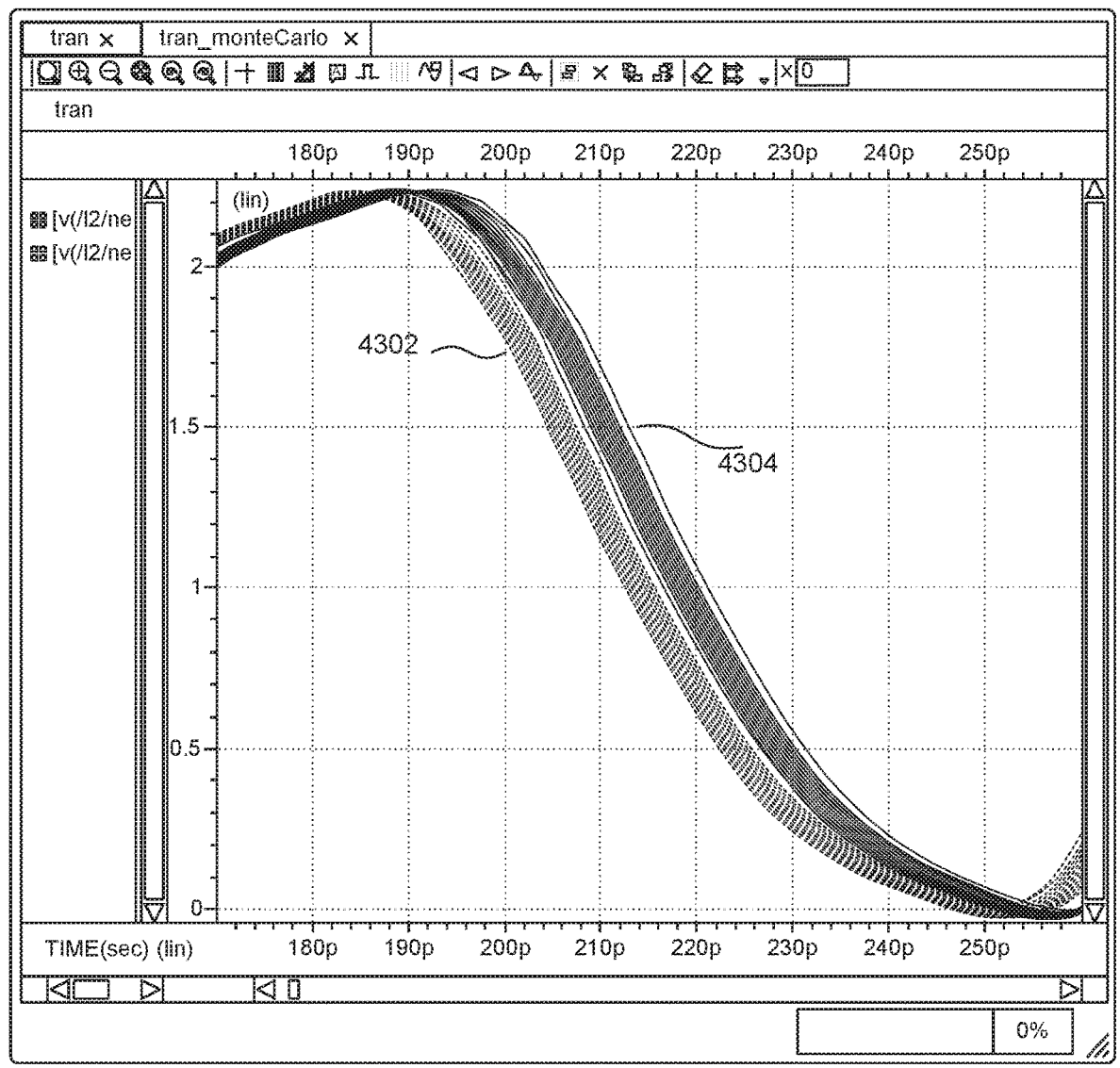
FIG. 43 illustrates closeup of waveforms of both fresh and aged devices with process variations.

FIG. 43 illustrates a zoomed in view of circuit waveforms 4300 of both fresh and aged devices with process variations. Circuit waveforms 4302 shown in dashed lines correspond to the fresh devices. Circuit waveform 4304 shown in solid lines correspond to the aged devices. There is a clear 'shift right' to be seen in the aged devices waveforms corresponding to the lower oscillation frequencies.

Aging Analysis Over Full PVT Variations

All the above variation sources discussed above are combined into a single set of paired simulations.

Figure 45:
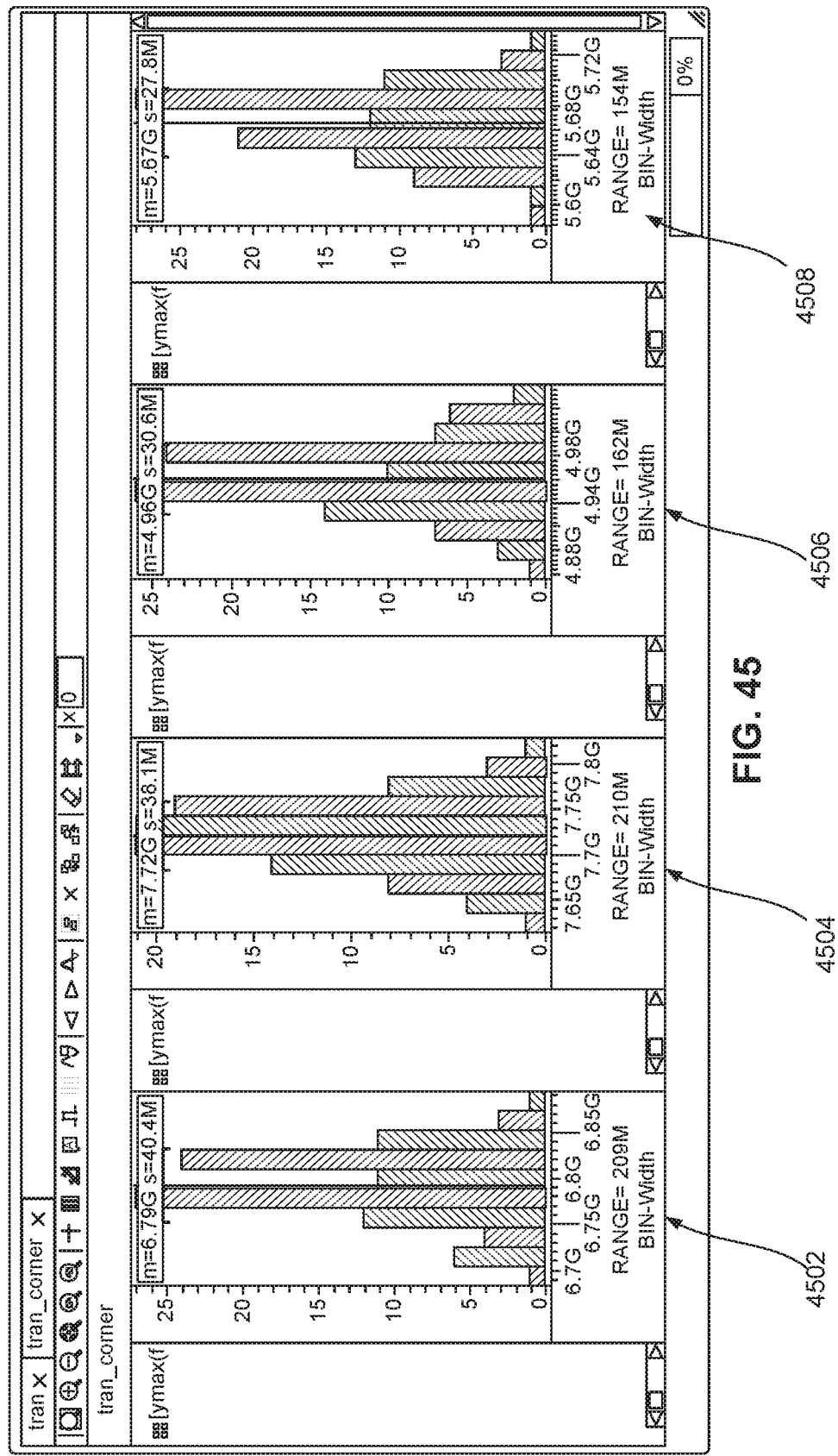
FIG. 45 illustrates histograms of fresh device oscillation frequency over PVT, broken out over temperature and voltage in accordance with some aspects of the present disclosure.

FIG. 44 illustrates a setup 4400 for fresh device simulations over all PVT variations. After running the fresh simulations, histograms of the oscillation frequency measurements broken out by voltage/temperature corner may be viewed as shown in FIG. 45. Histogram 4502 corresponds to a voltage of 2 volts and a temperature of 25 degrees. Histogram 4504 corresponds to a voltage of 2.2 volts and a temperature of 25 degrees. Histogram 4506 corresponds to a voltage of 2 volts and a temperature of 150 degrees. Histogram 4508 corresponds to a voltage of 2.2 volts and a temperature of 150 degrees. Mean and standard deviation values at each corner are as listed in table 4600 of circuit waveforms in FIG. 46.

Figure 47:
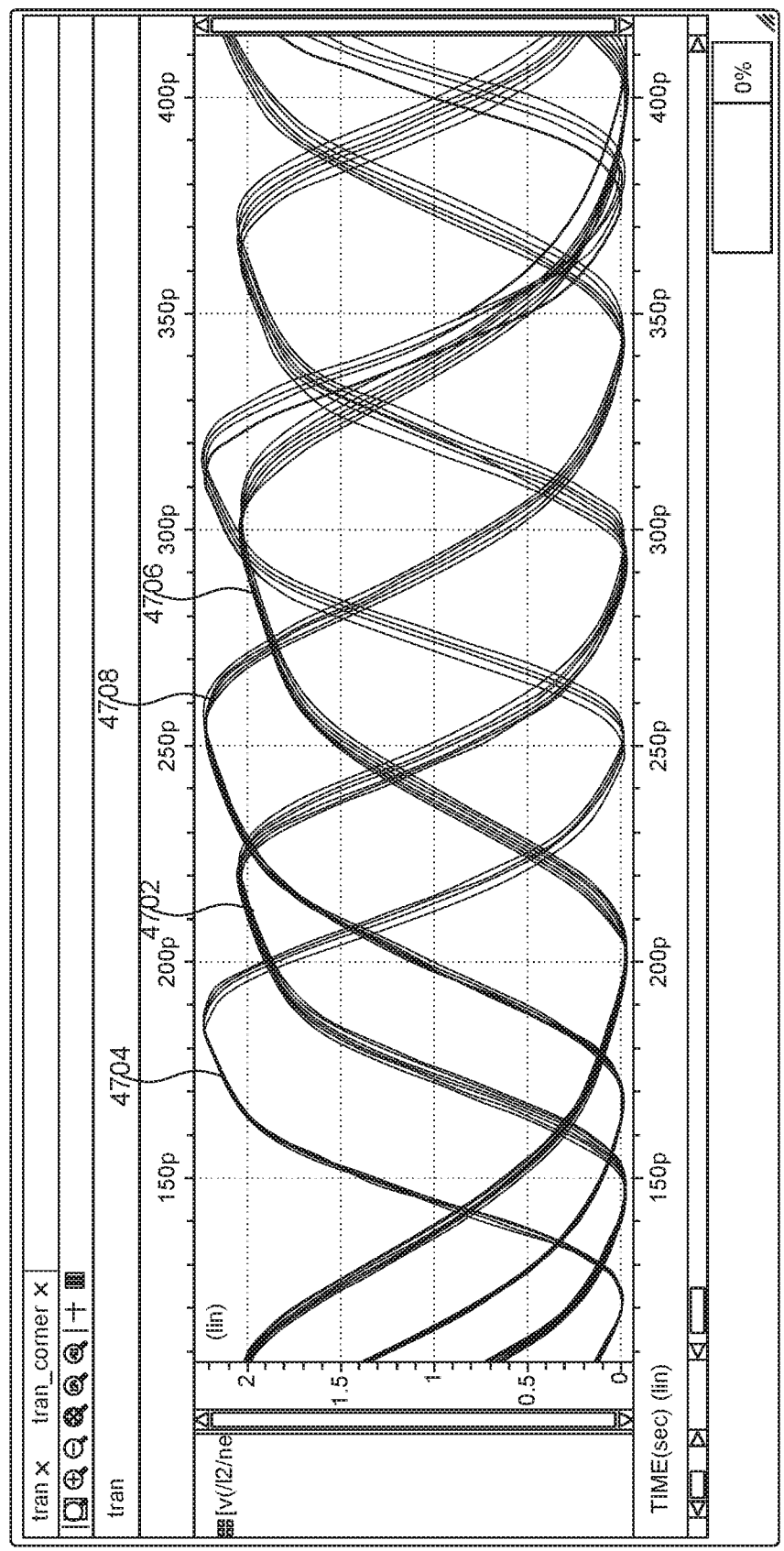
FIG. 47 illustrates simulation waveforms for fresh devices over PVT in accordance with some aspects of the present disclosure.

FIG. 47 illustrates simulation waveforms for fresh devices over PVT. Circuit waveforms 4702 correspond to a voltage of 2 volts and a temperature of 25 degrees. Circuit waveforms 4504 correspond to a voltage of 2.2 volts and a temperature of 25 degrees. Circuit waveforms 4506 correspond to a voltage of 2 volts and a temperature of 150 degrees. Circuit waveforms 4508 correspond to a voltage of 2.2 volts and a temperature of 150 degrees.

Figure 48:
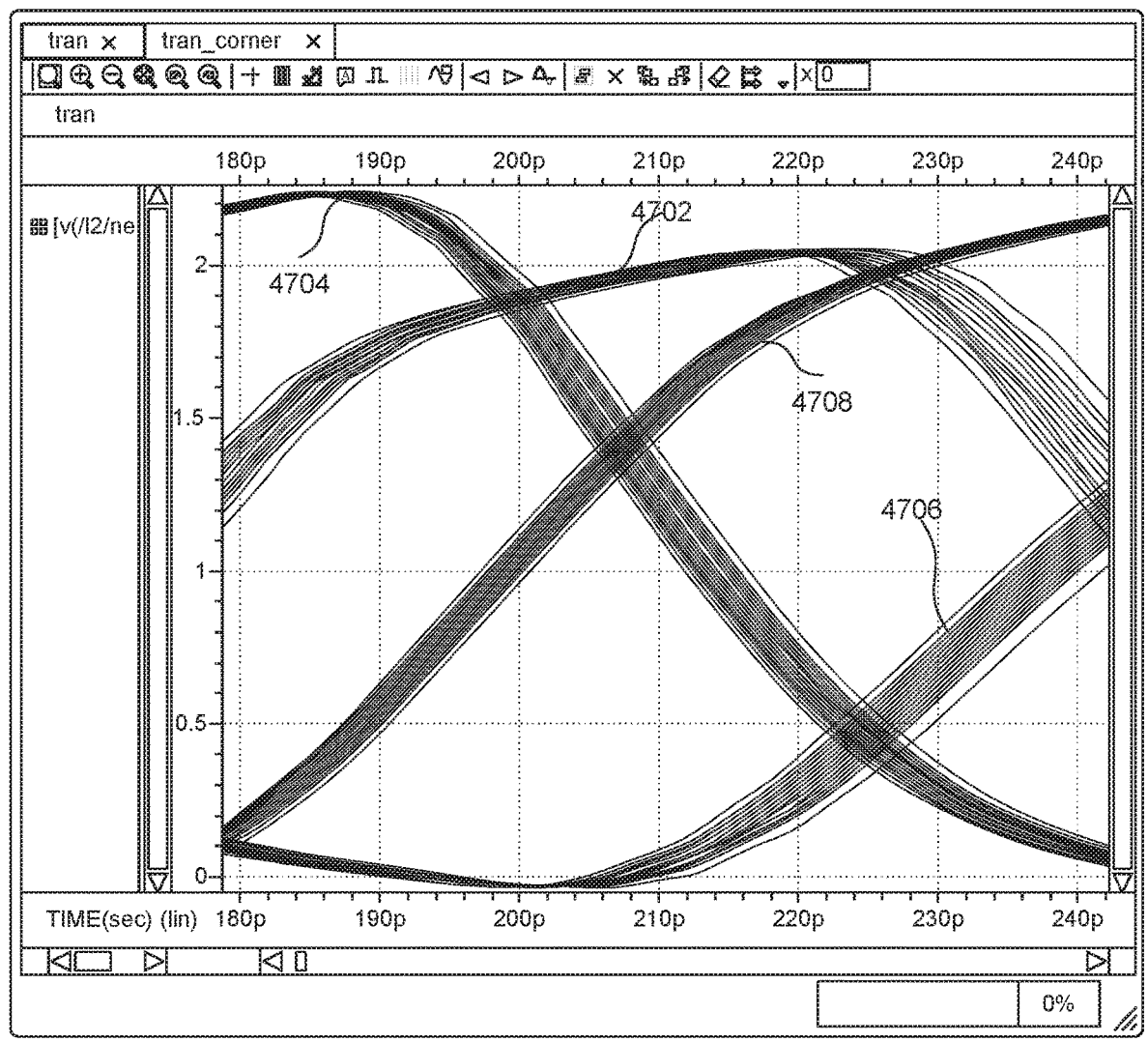
FIG. 48 illustrates a closeup of simulation waveforms for fresh devices over PVT in accordance with some aspects of the present disclosure.

FIG. 48 illustrates a zoomed in view (around 210 ps) of the simulation waveforms for fresh devices over PVT shown in FIG. 47. Here, the simultaneous effects of the various PVT conditions on the circuit oscillation frequency for fresh devices is shown.

Figure 49:
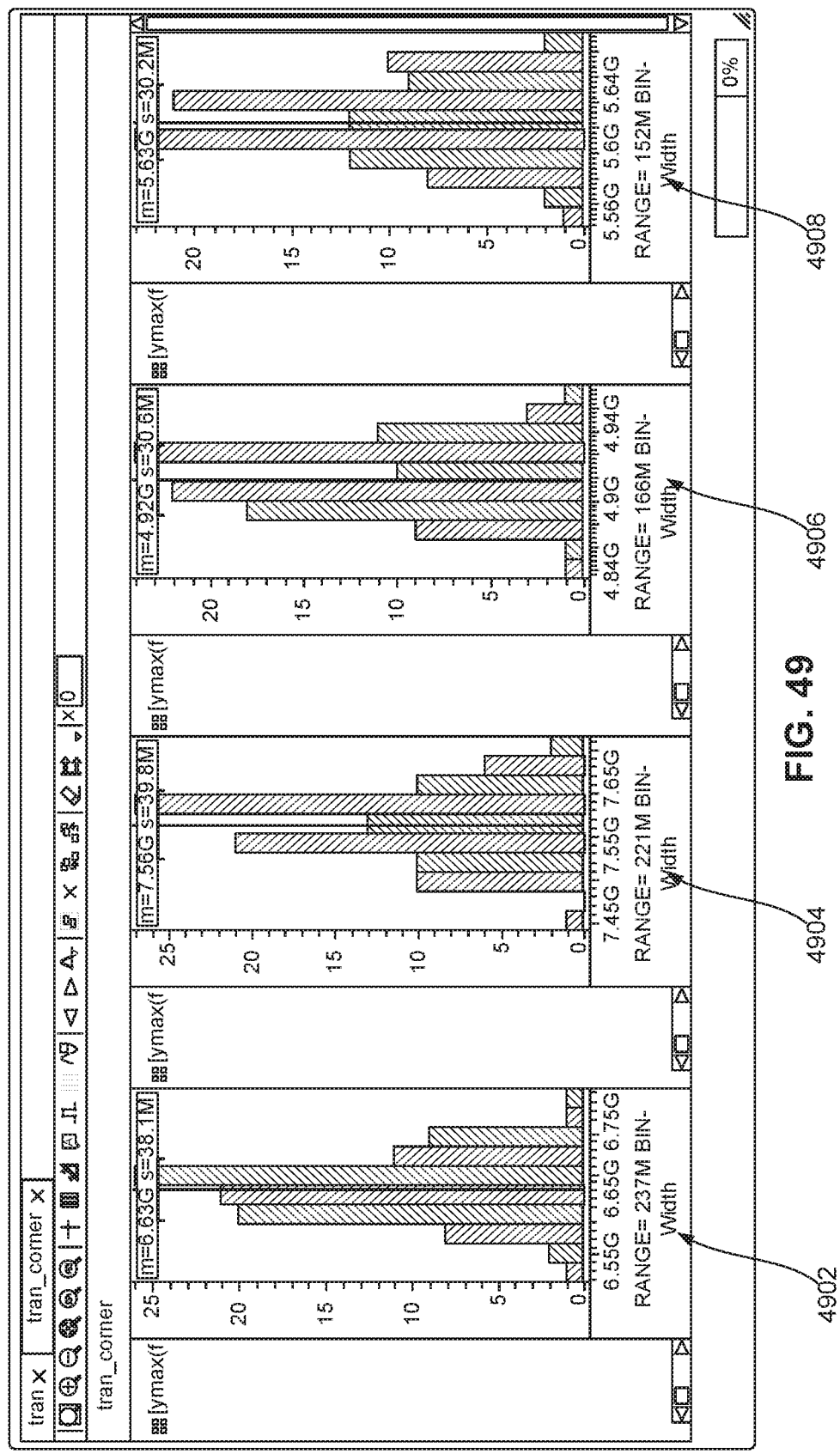
FIG. 49 illustrates histograms of aged device oscillation frequencies over PVT, broken out over temperature and voltage in accordance with some aspects of the present disclosure.

Next, a set of simulations over the exact same PVT conditions for 3-year aged devices are performed. The histograms are shown in FIG. 49 and the statistical summaries are shown in FIG. 50. The mean oscillation frequency has diminished with age for all PVT conditions.

FIG. 49 illustrates histograms of aged device oscillation frequency over PVT, broken out over temperature and voltage. Histogram 4902 corresponds to a voltage of 2 V with a temperature of 25 degrees. Histogram 4904 corresponds to a voltage of 2.2 V with a temperature of 25 degrees. Histogram 4906 corresponds to a voltage of 2 V with a temperature of 150 degrees. Histogram 4908 corresponds to a voltage of 2.2 V with a temperature of 150 degrees.

FIG. 50 illustrates a table 5000 of statistics over PVT for aged devices. The mean oscillation frequency is 6.63 GHz with a standard deviation of 38.1 MHz for a voltage of 2 V and a temperature of 25 degrees. The mean oscillation frequency is 7.56 GHz with a standard deviation of 39.8 MHz for a voltage of 2.2 V and a temperature of 25 degrees. The mean oscillation frequency is 4.92 GHz with a standard deviation of 30.6 MHz for a voltage of 2 V and a temperature of 150 degrees. The mean oscillation frequency is 5.63 GHz with a standard deviation of 30.2 MHz for a voltage of 2.2 V and a temperature of 150 degrees.

Figure 51:
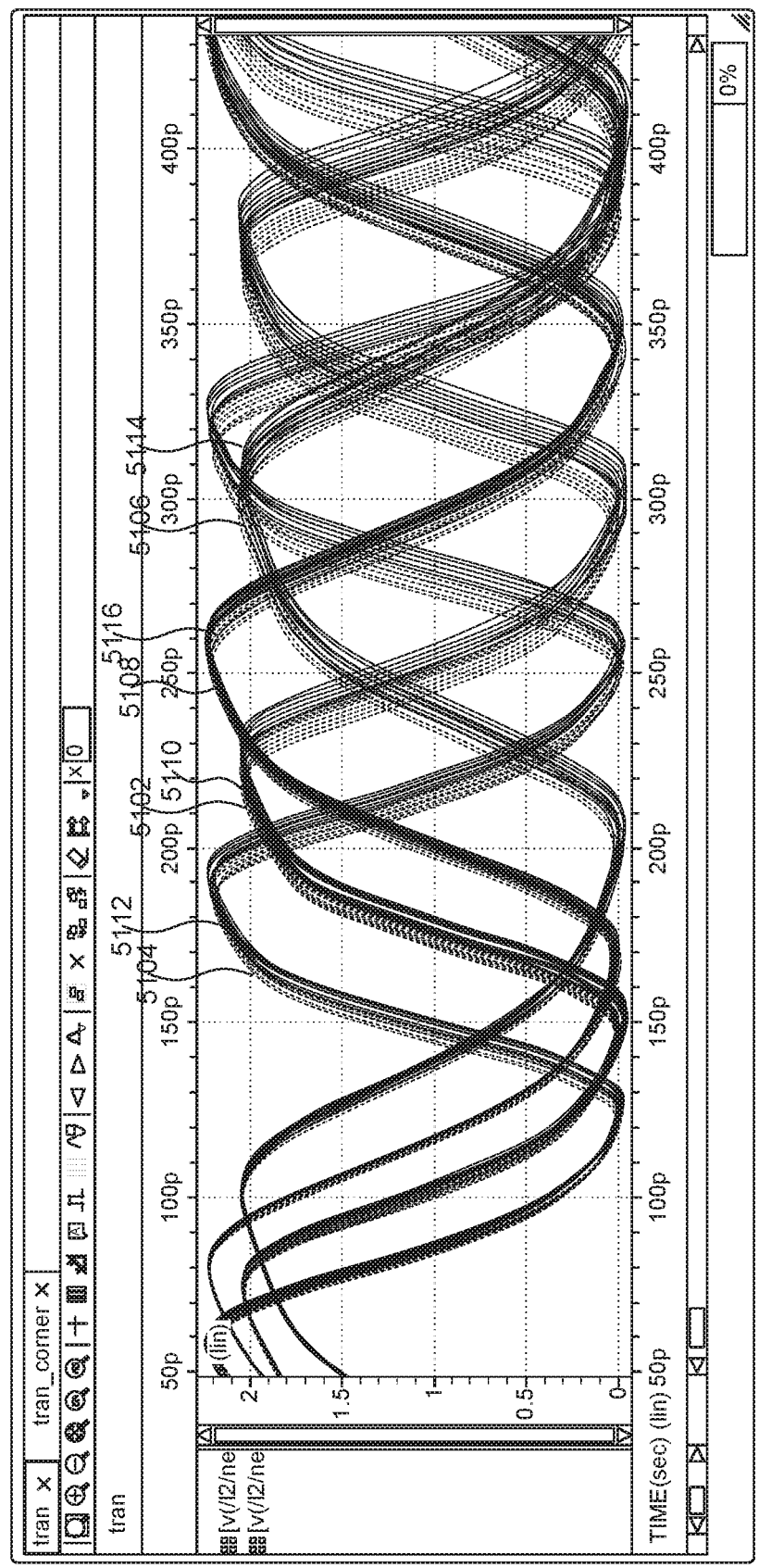
FIG. 51 illustrates simulation waveforms for fresh and aged devices over PVT in accordance with some aspects of the present disclosure.

FIG. 51 illustrates simulation waveforms for fresh and aged devices over PVT. Circuit waveforms 5102 and circuit waveforms 5110 correspond to a voltage of 2 V and a temperature of 25 degrees for a fresh device and an aged device, respectively. Circuit waveforms 5104 and circuit waveforms 5112 correspond to a voltage of 2.2 V and a temperature of 25 degrees for a fresh device and an aged device, respectively. Circuit waveforms 5106 and circuit waveforms 5114 correspond to a voltage of 2 V and a temperature of 150 degrees for a fresh device and an aged device, respectively. Circuit waveforms 5108 and circuit waveforms 5116 correspond to a voltage of 2.2 V and a temperature of 150 degrees for a fresh device and an aged device, respectively.

Figure 52:
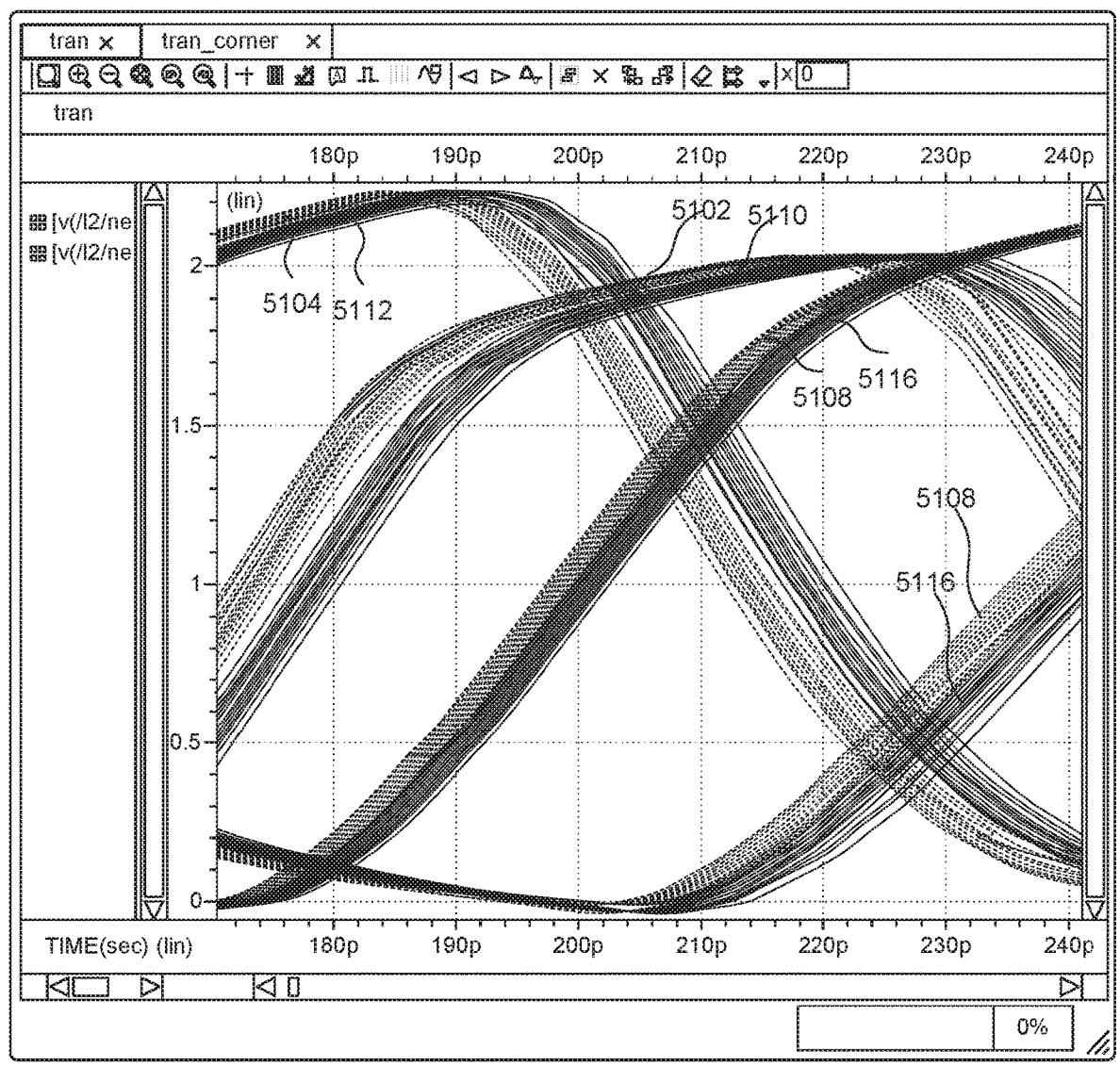
FIG. 52 illustrates a closeup of simulation waveforms for fresh and aged devices over identical PVT conditions.

FIG. 52 illustrates a closeup view of simulation waveforms of FIG. 51 for fresh (dashed line) and aged (solid line) devices over identical PVT conditions. The circuit oscillation period for aged devices are longer than those for the fresh devices corresponding to a lower oscillation frequency.

To further debug these cases, a particular PVT sample condition is investigated.

Figure 53:
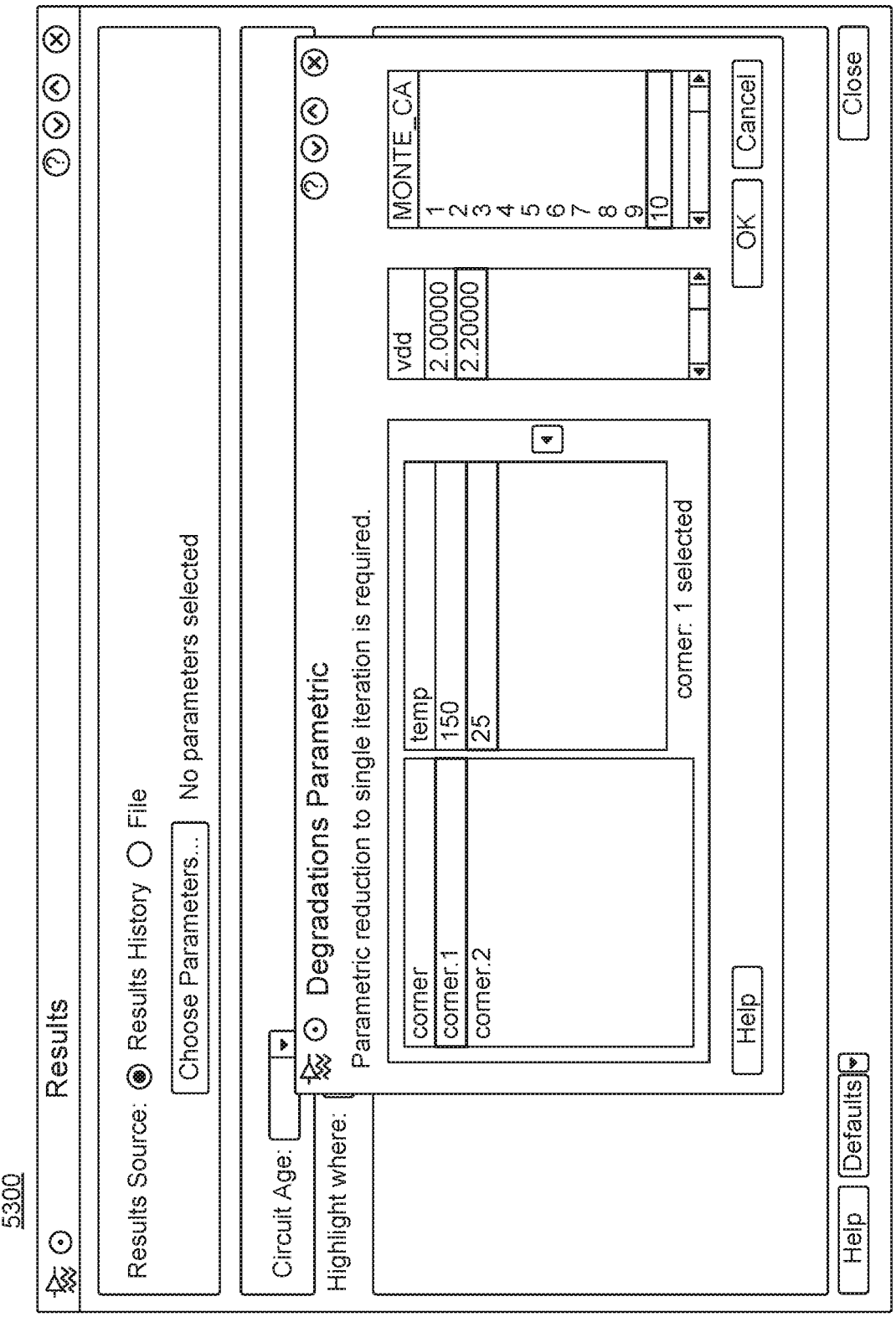
FIG. 53 illustrates selecting a PVT sample condition for debugging in accordance with some aspects of the present disclosure.

FIG. 53 illustrates a pane 5300 for choosing a PVT sample condition for debug. Using pane 5300, a single PVT condition may be selected. For example, corner 1 (temperature=25), vdd=2.2, and Monte Carlo sample index of 10 is selected as shown in FIG. 53.

FIG. 54 illustrates a result pane 5400. Result pane 5400 may include a table 5402. Column 5404 shows the threshold voltage increases for a particular PVT sample. These results indicate that PVT sample conditions must be considered during circuit aging/reliability analysis, as they can have a significant result on the aging simulation results, and also indicate that a full 1:1 correlation between first stage and second stage simulations is essential to ensure the same conditions are replicated in both sets of simulations.

Figure 55:
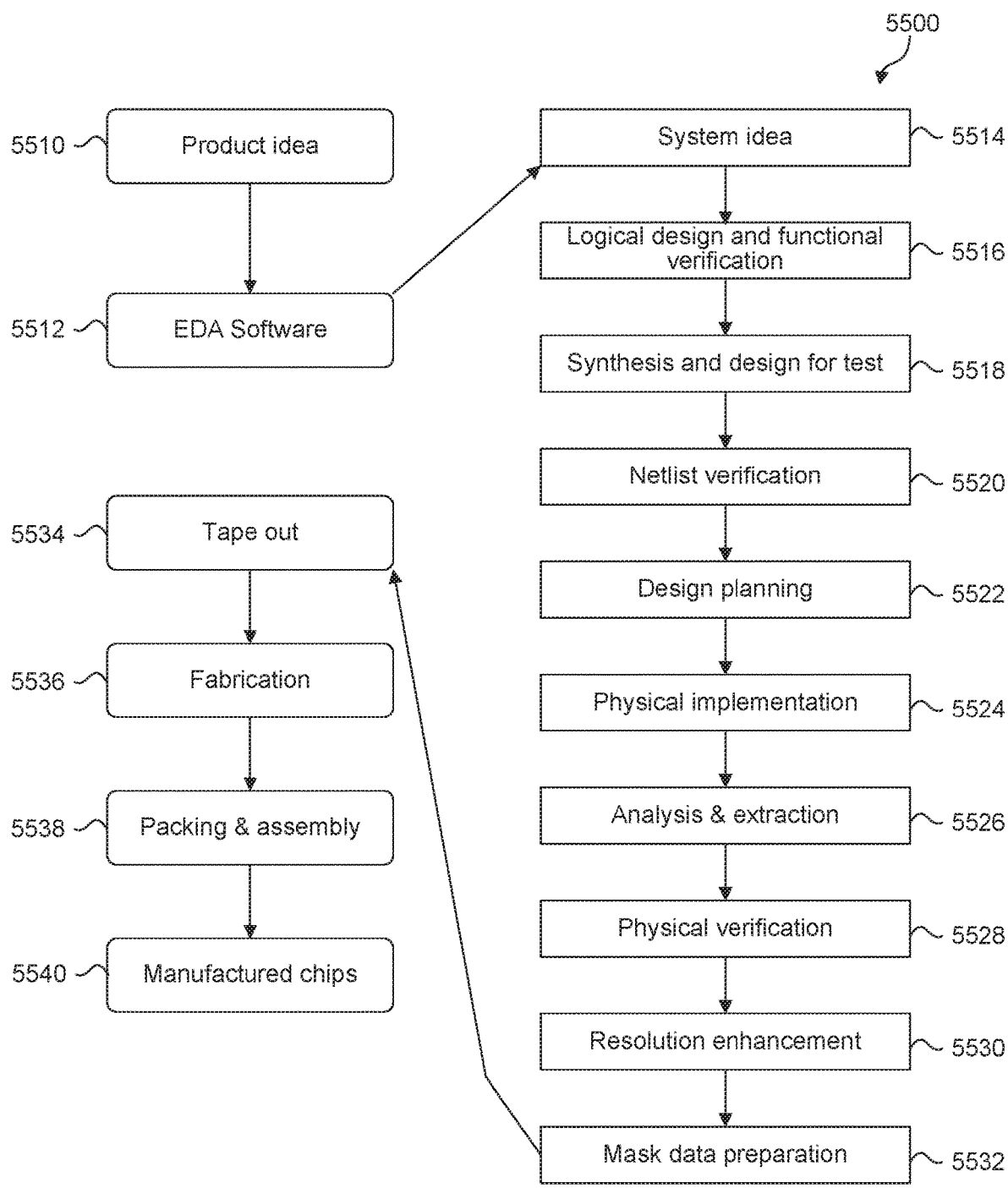
FIG. 55 depicts a flowchart of various operations in the design and fabrication of an integrated circuit in accordance with an embodiment of the present disclosure.

FIG. 55 illustrates an example set of processes 5500 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 5510 with information supplied by a designer, information that is transformed to create an article of manufacture that uses a set of EDA processes 5512. When the design is finalized, the design is taped-out 5534, which is when artwork (e.g., geometric patterns) for the integrated circuit is sent to a fabrication facility to manufacture the mask set, which is then used to manufacture the integrated circuit. After tape-out, a semiconductor die is fabricated 5536, and packaging and assembly processes 5538 are performed to produce the finished integrated circuit 5540.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 55. The processes described by being enabled by EDA products (or tools).

During system design 5514, the functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During the logic design and functional verification 5516, modules or components in the circuit are specified in one or more description languages, and the specification is checked for functional accuracy. For example, the components of the circuit may be verified to generate outputs that match the requirements of the specification of the circuit or system being designed. Functional verification may use simulators and other programs such as test bench generators, static HDL checkers, and formal verifiers. In some embodiments, special systems of components referred to as 'emulators' or 'prototyping systems' are used to speed up the functional verification.

During synthesis and design for test 5518, HDL code is transformed into a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 5520, the netlist is checked for compliance with timing constraints and for correspondence with the HDL code. During design planning 5522, an overall floor plan for the integrated circuit is constructed and analyzed for timing and top-level routing.

During layout or physical implementation 5524, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 5526, the circuit function is verified at the layout level, which permits refinement of the layout design. During physical verification 5528, the layout design is checked to ensure that manufacturing constraints are correct, such as DRC constraints, electrical constraints, lithographic constraints, and that circuitry function matches the HDL design specification. During resolution enhancement 5530, the geometry of the layout is transformed to improve how the circuit design is manufactured.

During tape-out, data is created to be used (after lithographic enhancements are applied if appropriate) for the production of lithography masks. During mask data preparation 5532, the 'tape-out' data is used to produce lithography masks that are used to produce finished integrated circuits.

A storage subsystem of a computer system (such as computer system 5710 of FIG. 57A, or host system 5607 of FIG. 56) may be used to store the programs and data structures that are used by some or all of the EDA products described herein, and products used for the development of cells for the library and for the physical and logical design that use the library.

Figure 56:
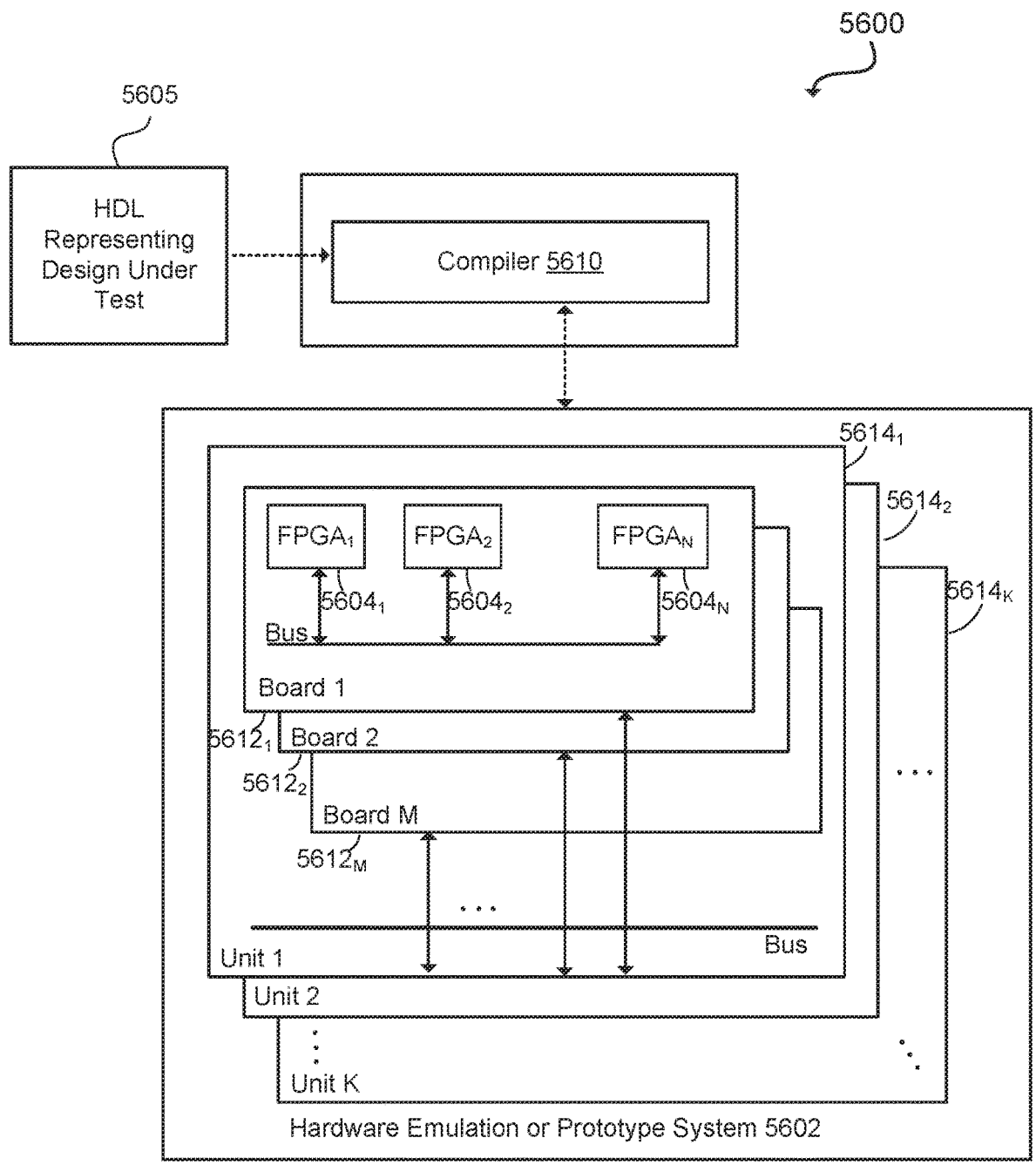
FIG. 56 depicts a block diagram of an emulation system.

FIG. 56 depicts an abstract diagram of an example emulation environment 5600. An emulation environment 5600 may be configured to verify the functionality of the circuit design. The emulation environment 5600 may include a host system 5607 (e.g., a computer that is part of an EDA system) and an emulation system 5602 (e.g., a set of programmable devices such as Field Programmable Gate Arrays (FPGAs) or processors). The host system generates data and information by using a compiler 5610 to structure the emulation system to emulate a circuit design. Circuit design to be emulated is also referred to as a Design Under Test ('DUT') where data and information from the emulation are used to verify the functionality of the DUT.

The host system 5607 may include one or more processors. In the embodiment where the host system includes multiple processors, the functions described herein as being performed by the host system can be distributed among the multiple processors. The host system 5607 may include a compiler 5610 to transform specifications written in a description language that represents a DUT and to produce data (e.g., binary data) and information that is used to structure the emulation system 5602 to emulate the DUT. The compiler 5610 can transform, change, restructure, add new functions to, and/or control the timing of the DUT.

The host system 5607 and emulation system 5602 exchange data and information using signals carried by an emulation connection. The connection can be but is not limited to, one or more electrical cables such as cables with pin structures compatible with the Recommended Standard 232 (RS232) or universal serial bus (USB) protocols. The connection can be a wired communication medium or network such as a local area network or a wide area network such as the Internet. The connection can be a wireless communication medium or a network with one or more points of access using a wireless protocol such as BLUETOOTH or IEEE 802.11. The host system 5607 and emulation system 5602 can exchange data and information through a third device such as a network server.

The emulation system 5602 includes multiple FPGAs (or other modules) such as FPGAs 56041 and 56042, as well as additional FPGAs to 5604N. Each FPGA can include one or more FPGA interfaces through which the FPGA is connected to other FPGAs (and potentially other emulation components) for the FPGAs to exchange signals. An FPGA interface can be referred to as an input/output pin or an FPGA pad. While an emulator may include FPGAs, embodiments of emulators can include other types of logic blocks instead of, or along with, the FPGAs for emulating DUTs. For example, the emulation system 5602 can include custom FPGAs, specialized ASICs for emulation or prototyping, memories, and input/output devices.

A programmable device can include an array of programmable logic blocks and a hierarchy of interconnections that can enable the programmable logic blocks to be interconnected according to the descriptions in the HDL code. Each of the programmable logic blocks can enable complex combinational functions or enable logic gates such as AND, and XOR logic blocks. In some embodiments, the logic blocks also can include memory elements/devices, which can be simple latches, flip-flops, or other blocks of memory. Depending on the length of the interconnections between different logic blocks, signals can arrive at input terminals of the logic blocks at different times and thus may be temporarily stored in the memory elements/devices.

FPGAs 56041-5604N may be placed onto one or more boards 56121 and 56122 as well as additional boards through 56012M. Multiple boards can be placed into an emulation unit 56141. The boards within an emulation unit can be connected using the backplane of the emulation unit or any other types of connections. In addition, multiple emulation units (e.g., 56141 and 56142 through 5614K) can be connected to each other by cables or any other means to form a multi-emulation unit system.

For a DUT that is to be emulated, the host system 5607 transmits one or more bit files to the emulation system 5602. The bit files may specify a description of the DUT and may further specify partitions of the DUT created by the host system 5607 with trace and injection logic, mappings of the partitions to the FPGAs of the emulator, and design constraints. Using the bit files, the emulator structures the FPGAs to perform the functions of the DUT. In some embodiments, one or more FPGAs of the emulators may have the trace and injection logic built into the silicon of the FPGA. In such an embodiment, the FPGAs may not be structured by the host system to emulate trace and injection logic.

The host system 5607 receives a description of a DUT that is to be emulated. In some embodiments, the DUT description is in a description language (e.g., a register transfer language (RTL)). In some embodiments, the DUT description is in netlist level files or a mix of netlist level files and HDL files. If part of the DUT description or the entire DUT description is in an HDL, then the host system can synthesize the DUT description to create a gate-level netlist using the DUT description. A host system can use the netlist of the DUT to partition the DUT into multiple partitions, where one or more of the partitions include trace and injection logic. The trace and injection logic traces interface signals that are exchanged via the interfaces of an FPGA. Additionally, the trace and injection logic can inject traced interface signals into the logic of the FPGA. The host system maps each partition to an FPGA of the emulator. In some embodiments, the trace and injection logic is included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic are included, the bit files also describe the logic that is included. The bit files can include place and route information and design constraints. The host system stores the bit files and information describing which FPGAs are to emulate each component of the DUT (e.g., to which FPGAs each component is mapped).

Upon request, the host system transmits the bit files to the emulator. The host system signals the emulator to start the emulation of the DUT. During emulation of the DUT or at the end of the emulation, the host system receives emulation results from the emulator through the emulation connection. Emulation results are data and information generated by the emulator during the emulation of the DUT, which includes interface signals and states of interface signals that have been traced by the trace and injection logic of each FPGA. The host system can store the emulation results and/or transmits the emulation results to another processing system.

After emulation of the DUT, a circuit designer can request to debug a component of the DUT. If such a request is made, the circuit designer can specify a time period of the emulation to debug. The host system identifies which FPGAs are emulating the component using the stored information. The host system retrieves stored interface signals associated with the time period and traced by the trace and injection logic of each identified FPGA. The host system signals the emulator to re-emulate the identified FPGAs. The host system transmits the retrieved interface signals to the emulator to re-emulate the component for the specified time period. The trace and injection logic of each identified FPGA injects its respective interface signals received from the host system into the logic of the DUT mapped to the FPGA. In the case of multiple re-emulations of an FPGA, merging the results produces a full debug view.

The host system receives, from the emulation system, signals traced by the logic of the identified FPGAs during the re-emulation of the component. The host system stores the signals received from the emulator. The signals traced during the re-emulation can have a higher sampling rate than the sampling rate during the initial emulation. For example, in the initial emulation, a traced signal can include a saved state of the component every X milliseconds. However, in the re-emulation, the traced signal can include a saved state every Y milliseconds where Y is less than X. If the circuit designer requests to view a waveform of a signal traced during the re-emulation, the host system can retrieve the stored signal and display a plot of the signal. For example, the host system can generate a waveform of the signal. Afterward, the circuit designer can request to re-emulate the same component for a different time period or to re-emulate another component.

A host system 5607 and/or the compiler 5610 may include subsystems such as, but not limited to, a design synthesizer sub-system, a mapping sub-system, a run time sub-system, a results sub-system, a debug sub-system, a waveform sub-system, and a storage sub-system. The sub-systems can be structured and enabled as an individual or multiple modules, or two or more may be structured as a module. Together these sub-systems structure the emulator and monitor the emulation results.

The design synthesizer sub-system transforms the HDL that is representing a DUT 5605 into gate-level logic. For a DUT that is to be emulated, the design synthesizer sub-system receives a description of the DUT. If the description of the DUT is fully or partially in HDL (e.g., RTL or another level of abstraction), the design synthesizer sub-system synthesizes the HDL of the DUT to create a gate-level netlist with a description of the DUT in terms of gate-level logic.

The mapping sub-system partitions DUTs and maps the partitions into emulator FPGAs. The mapping sub-system partitions a DUT at the gate level into a number of partitions using the netlist of the DUT. For each partition, the mapping sub-system retrieves a gate-level description of the trace and injection logic and adds the logic to the partition. As described above, the trace and injection logic included in a partition is used to trace signals exchanged via the interfaces of an FPGA to which the partition is mapped (trace interface signals). The trace and injection logic can be added to the DUT prior to the partitioning. For example, the trace and injection logic can be added by the design synthesizer sub-system prior to or after the synthesizing the HDL of the DUT.

In addition to including the trace and injection logic, the mapping sub-system can include additional tracing logic in a partition to trace the states of certain DUT components that are not traced by the trace and injection. The mapping sub-system can include the additional tracing logic in the DUT prior to the partitioning or in partitions after the partitioning. The design synthesizer sub-system can include the additional tracing logic in an HDL description of the DUT prior to synthesizing the HDL description.

The mapping sub-system maps each partition of the DUT to an FPGA of the emulator. For partitioning and mapping, the mapping sub-system uses design rules, design constraints (e.g., timing or logic constraints), and information about the emulator. For components of the DUT, the mapping sub-system stores information in the storage sub-system describing which FPGAs are to emulate each component.

Using the partitioning and the mapping, the mapping sub-system generates one or more bit files that describe the created partitions and the mapping of logic to each FPGA of the emulator. The bit files can include additional information such as constraints of the DUT and routing information of connections between FPGAs and connections within each FPGA. The mapping sub-system can generate a bit file for each partition of the DUT and can store the bit file in the storage sub-system. Upon request from a circuit designer, the mapping sub-system transmits the bit files to the emulator, and the emulator can use the bit files to structure the FPGAs to emulate the DUT.

If the emulator includes specialized ASICs that include the trace and injection logic, the mapping sub-system can generate a specific structure that connects the specialized ASICs to the DUT. In some embodiments, the mapping sub-system can save the information of the traced/injected signal and where the information is stored on the specialized ASIC.

The run time sub-system controls emulations performed by the emulator. The run time sub-system can cause the emulator to start or stop executing an emulation. Additionally, the run time sub-system can provide input signals and data to the emulator. The input signals can be provided directly to the emulator through the connection or indirectly through other input signal devices. For example, the host system can control an input signal device to provide the input signals to the emulator. The input signal device can be, for example, a test board (directly or through cables), a signal generator, another emulator, or another host system.

The results sub-system processes emulation results generated by the emulator. During emulation and/or after completing the emulation, the results sub-system receives emulation results from the emulator generated during the emulation. The emulation results include signals traced during the emulation. Specifically, the emulation results include interface signals traced by the trace and injection logic emulated by each FPGA and can include signals traced by additional logic included in the DUT. Each traced signal can span multiple cycles of the emulation. A traced signal includes multiple states, and each state is associated with a time of the emulation. The results sub-system stores the traced signals in the storage sub-system. For each stored signal, the results sub-system can store information indicating which FPGA generated the traced signal.

The debug sub-system allows circuit designers to debug DUT components. After the emulator has emulated a DUT and the results sub-system has received the interface signals traced by the trace and injection logic during the emulation, a circuit designer can request to debug a component of the DUT by re-emulating the component for a specific time period. In a request to debug a component, the circuit designer identifies the component and indicates a time period of the emulation to debug. The circuit designer's request can include a sampling rate that indicates how often states of debugged components should be saved by logic that traces signals.

The debug sub-system identifies one or more FPGAs of the emulator that are emulating the component using the information stored by the mapping sub-system in the storage sub-system. For each identified FPGA, the debug sub-system retrieves, from the storage sub-system, interface signals traced by the trace and injection logic of the FPGA during the time period indicated by the circuit designer. For example, the debug sub-system retrieves states traced by the trace and injection logic that is associated with the time period.

The debug sub-system transmits the retrieved interface signals to the emulator. The debug sub-system instructs the debug sub-system to use the identified FPGAs and for the trace and injection logic of each identified FPGA to inject its respective traced signals into the logic of the FPGA to re-emulate the component for the requested time period. The debug sub-system can further transmit the sampling rate provided by the circuit designer to the emulator so that the tracing logic traces states at the proper intervals.

To debug the component, the emulator can use the FPGAs to which the component has been mapped. Additionally, the re-emulation of the component can be performed at any point specified by the circuit designer.

For an identified FPGA, the debug sub-system can transmit instructions to the emulator to load multiple emulator FPGAs with the same configuration of the identified FPGA. The debug sub-system additionally signals the emulator to use the multiple FPGAs in parallel. Each FPGA from the multiple FPGAs is used with a different time window of the interface signals to generate a larger time window in a shorter amount of time. For example, the identified FPGA can require an hour or more to use a certain amount of cycles. However, if multiple FPGAs have the same data and structure of the identified FPGA and each of these FPGAs runs a subset of the cycles, the emulator can require a few minutes for the FPGAs to use all the cycles collectively.

A circuit designer can identify a hierarchy or a list of DUT signals to re-emulate. To enable this, the debug sub-system determines the FPGA needed to emulate the hierarchy or list of signals, retrieves the necessary interface signals, and transmits the retrieved interface signals to the emulator for re-emulation. Thus, a circuit designer can identify any element (e.g., component, device, or signal) of the DUT to debug/re-emulate.

The waveform sub-system generates waveforms using the traced signals. If a circuit designer requests to view a waveform of a signal traced during an emulation run, the host system retrieves the signal from the storage sub-system. The waveform sub-system displays a plot of the signal. For one or more signals, when the signals are received from the emulator, the waveform sub-system can automatically generate the plots of the signals.

Figure 57A:
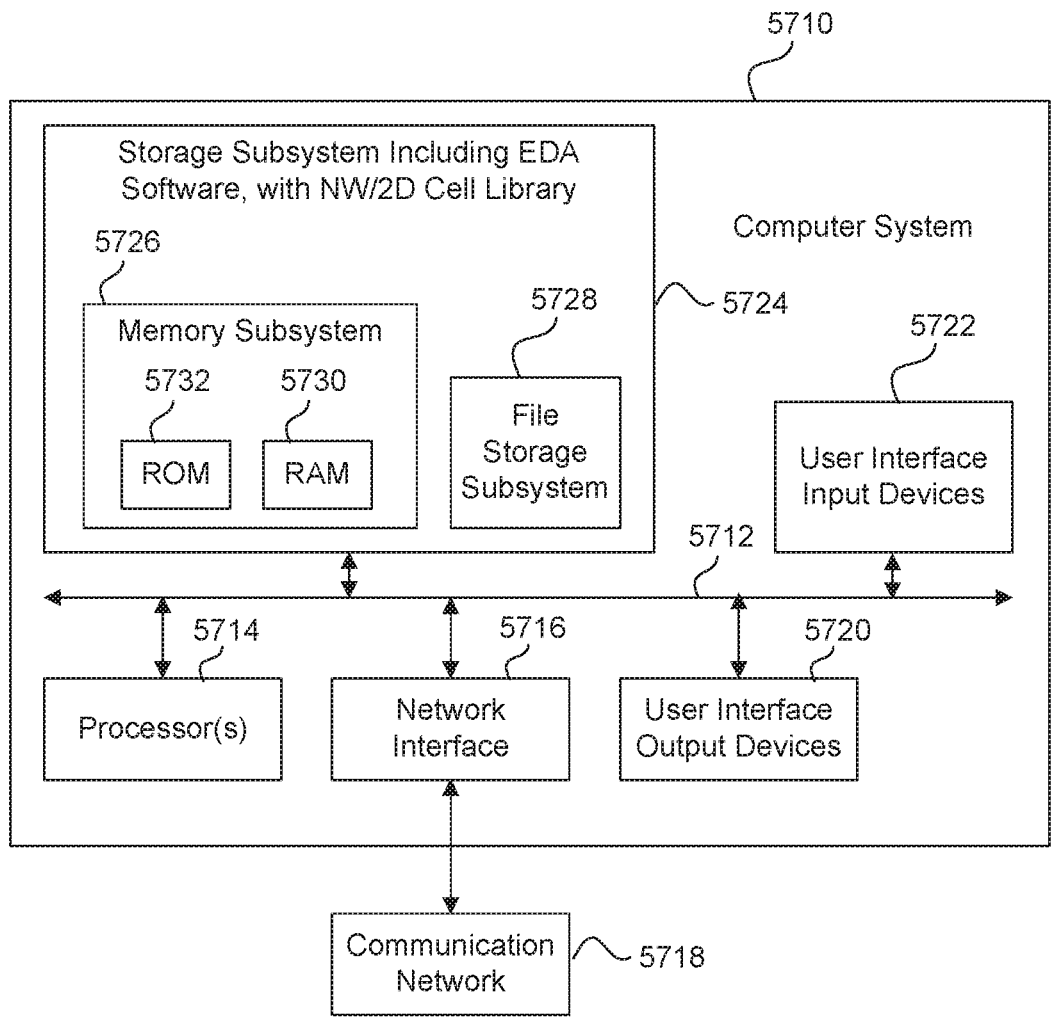
FIGS. 57A, 57B and 57C depict simplified block diagrams of a computer system suitable for use with embodiments of the technology, as well as circuit design and circuit embodiments of the technology.
Figures 57B, 57C:
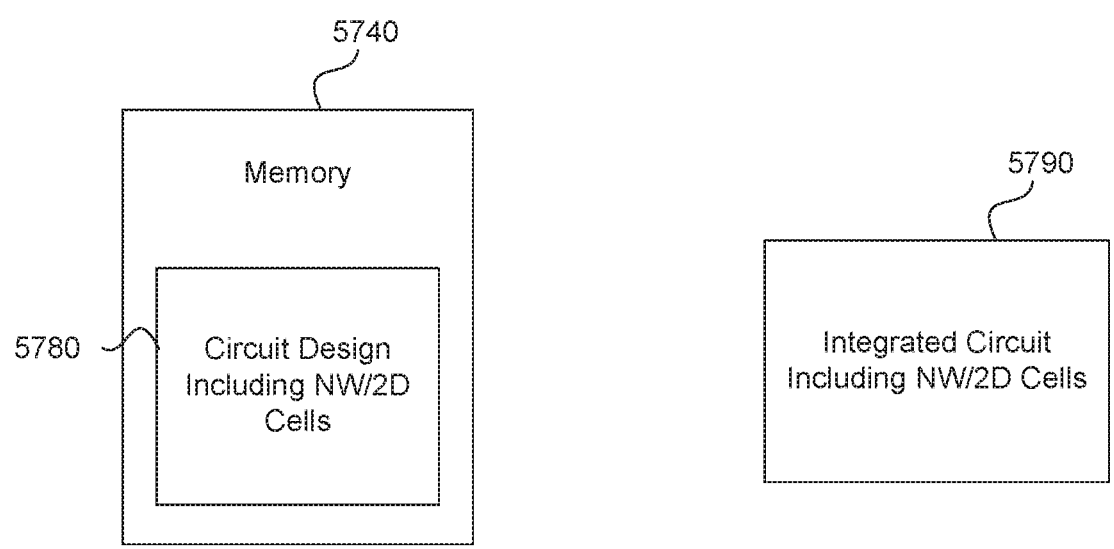

FIGS. 57A, 57B and 57C are simplified block diagrams of a computer system suitable for use with embodiments of the technology, as well as circuit design and circuit embodiments of the technology.

In FIG. 57A, computer system 5710 typically includes at least one computer or processor 5714 which communicates with a number of peripheral devices via bus subsystem 5712. Typically, the computer can include, or the processor can be, any of a microprocessor, graphics processing unit, or digital signal processor, and their electronic processing equivalents, such as an Application Specific Integrated Circuit ('ASIC') or Field Programmable Gate Array ('FPGA'). The terms 'processor' and 'computer' are further defined below. These peripheral devices may include a storage subsystem 5724, comprising a memory subsystem 5726 and a file storage subsystem 5728, user interface input devices 5722, user interface output devices 5720, and a network interface subsystem 5716. The input and output devices allow user interaction with computer system 5710.

The computer system may be a server computer, a client computer, a workstation, a mainframe, a personal computer (PC), a tablet PC, a set-top box (STB), a personal digital assistant (PDA), a cellular telephone, a smartphone, a web appliance, a rack-mounted 'blade', a kiosk, a television, a game station, a network router, switch or bridge, or any data processing machine capable of executing instructions (sequential or otherwise) that specify actions to be taken by that machine.

The computer system typically includes an operating system, such as Microsoft's Windows, Sun Microsystems's Solaris, Apple Computer's MacOs, Linux or Unix. The computer system also typically can include a Basic Input/Output System (BIOS) and processor firmware. The operating system, BIOS and firmware are used by the processor to control subsystems and interfaces connected to the processor. Typical processors compatible with these operating systems include the Pentium and Itanium from Intel, the Opteron and Athlon from Advanced Micro Devices, and the ARM processor from ARM Holdings.

Innovations, embodiments and/or examples of the claimed inventions are neither limited to conventional computer applications nor the programmable apparatus that run them. For example, the innovations, embodiments and/or examples of what is claimed can include an optical computer, quantum computer, analog computer, or the like. The computer system may be a multi-processor or multi-core system and may use or be implemented in a distributed or remote system. The term 'processor' here is used in the broadest sense to include a singular processor and multi-core or multi-processor arrays, including graphic processing units, digital signal processors, digital processors and combinations of these devices. Further, while only a single computer system or a single machine may be illustrated, the use of a singular form of such terms shall also signify any collection of computer systems or machines that individually or jointly execute instructions to perform any one or more of the sets of instructions discussed herein. Due to the ever-changing nature of computers and networks, the description of computer system 5710 depicted in FIG. 57A is intended only as one example for purposes of illustrating the preferred embodiments. Many other configurations of computer system 5710 are possible having more or less components than the computer system depicted in FIG. 57A.

Network interface subsystem 5716 provides an interface to outside networks, including an interface to communication network 5718, and is coupled via communication network 5718 to corresponding interface devices in other computer systems or machines. Communication network 5718 may comprise many interconnected computer systems, machines and communication links. These communication links may be wireline links, optical links, wireless links, or any other devices for communication of information. Communication network 5718 can be any suitable computer network, for example a wide area network such as the Internet, and/or a local area network such as Ethernet. The communication network can be wired and/or wireless, and the communication network can use encryption and decryption methods, such as is available with a virtual private network. The communication network uses one or more communications interfaces, which can receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. One or more communications protocols can be used, such as HTTP, TCP/IP, RTP/RTSP, IPX and/or UDP.

User interface input devices 5722 may include an alphanumeric keyboard, a keypad, pointing devices such as a mouse, trackball, touchpad, stylus, or graphics tablet, a scanner, a touchscreen incorporated into the display, audio input devices such as voice recognition systems or microphones, eye-gaze recognition, brainwave pattern recognition, and other types of input devices. Such devices can be connected by wire or wirelessly to a computer system. In general, use of the term 'input device' is intended to include all possible types of devices and ways to input information into computer system 5710 or onto communication network 5718. User interface input devices typically allow a user to select objects, icons, text and the like that appear on some types of user interface output devices, for example, a display subsystem.

User interface output devices 5720 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide non-visual display such as via audio output or tactile output (e.g., vibrations) devices. In general, use of the term 'output device' is intended to include all possible types of devices and ways to output information from computer system 5710 to the user or to another machine or computer system.

Memory subsystem 5726 typically includes a number of memories including a main random-access memory ('RAM') 5730 (or other volatile storage device) for storage of instructions and data during program execution and a read only memory (ROM') 5732 in which fixed instructions are stored. File storage subsystem 5728 provides persistent storage for program and data files, and may include a hard disk drive, a floppy disk drive along with associated removable media, a CD-ROM drive, an optical drive, a flash memory, or removable media cartridges. The databases and modules implementing the functionality of certain embodiments may be stored by file storage subsystem 5728.

Bus subsystem 5712 provides a device for letting the various components and subsystems of computer system 5710 communicate with each other as intended. Although bus subsystem 5712 is shown schematically as a single bus, alternative embodiments of the bus subsystem may use multiple busses. For example, RAM-based main memory can communicate directly with file storage systems using Direct Memory Access (DMA') systems.

FIG. 57B depicts a memory 5740 such as a non-transitory, computer readable data and information storage medium associated with file storage subsystem 5728, and/or with network interface subsystem 5716, and can include a data structure specifying a circuit design. The memory 5740 can be a hard disk, a floppy disk, a CD-ROM, an optical medium, removable media cartridge, or other medium that stores computer readable data in a volatile or non-volatile form. Software read into a computer from such a memory can be converted at a selected instance in time from a tangible form to a transmission signal that is propagated through a medium (such as a network, connector, wire, or trace as an electrical pulse or a medium such as space or an atmosphere as electromagnetic radiation with wavelengths in the electromagnetic spectrum longer than infrared light).

FIG. 57C signifies an integrated circuit 5790 created with the described technology that includes one or more cells selected, for example, from a cell library.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
    obtaining, by a processing device, device-level parameter degradation data for at least one process, voltage, temperature (PVT) condition associated with a multi-dimensional PVT space by extrapolating device-level stress data of a circuit comprising one or more devices to a target circuit age for the circuit;
    obtaining, by the processing device, an aged circuit comprising the one or more devices by applying the device-level parameter degradation data to a set of device-level parameters; and
    initiating, by the processing device, a process to perform a plurality of degradation simulations with respect to the aged circuit for a process corner associated with the at least one PVT condition, wherein each degradation simulation of the plurality of degradation simulations is performed for a respective set of sweep parameters of a plurality of sets of sweep parameters, and wherein each set of sweep parameters of the plurality of sets of sweep parameters corresponds to a respective dimension of the multi-dimensional PVT space.

2. The method of claim 1, further comprising generating, by the processing device, the device-level stress data by performing a fresh simulation for the at least one PVT condition.

3. The method of claim 1, further comprising:
    performing, by the processing device, a degradation simulation for a sweep parameter of a first set of sweep parameters of the plurality of sets of sweep parameters, wherein the dimension corresponding to the first set of sweep parameters is associated with a degradation simulation group of a set of degradation simulation groups forming the multi-dimensional PVT space;
    determining, by the processing device, whether the degradation simulation group is a final degradation simulation group of the set of degradation simulation groups;
    in response to determining that the degradation simulation group is the final degradation simulation group, determining, by the processing device, whether the sweep parameter of the first set of sweep parameters is a final sweep parameter of the first set of sweep parameters;
    in response to determining that the sweep parameter of the first set of sweep parameters is the final sweep parameter of the first set of sweep parameters, determining, by the processing device, whether the first set of sweep parameters is a final set of sweep parameters of the process corner;
    in response to determining that the first set of sweep parameters is the final set of sweep parameters of the process corner, determining, by the processing device, whether the process corner is a final process corner; and
    in response to determining that the process corner is a final process corner, terminating, by the processing device, the degradation simulation for the process corner.

4. The method of claim 3, further comprising:
    in response to determining that the degradation simulation group is not the final degradation simulation group, initiating, by the processing device, a second degradation simulation to be performed for a second degradation simulation group of the set of degradation simulation groups.

5. The method of claim 3, further comprising:
    in response to determining that the sweep parameter of the first set of sweep parameters is not the final sweep parameter of the of the first set of sweep parameters, initiating, by the processing device, a second degradation simulation to be performed for a second sweep parameter of the first set of sweep parameters.

6. The method of claim 3, further comprising:
    in response to determining that the first set of sweep parameters is not the final set of sweep parameters of the process corner, initiating, by the processing device, a second degradation simulation to be performed for a second sweep parameter of a second set of sweep parameters.

7. The method of claim 3, further comprising:
    in response to determining that the process corner is not the final process corner, initiating, by the processing device, a second degradation simulation to be performed for a second process corner.

8. A system comprising:
a memory storing instructions; and
a processor, coupled with the memory and to execute the instructions, the instructions when executed cause the processor to:
   obtain device-level parameter degradation data for at least one process, voltage, temperature (PVT) condition associated with a multi-dimensional PVT space by extrapolating device-level stress data of a circuit comprising one or more devices to a target circuit age for the circuit;
   obtain an aged circuit comprising the one or more devices by applying the device-level parameter degradation data to a set of device-level parameters; and
   initiate a process to perform a plurality of degradation simulations with respect to the aged circuit for a process corner associated with the at least one PVT condition, wherein each degradation simulation of the plurality of degradation simulations is performed for a respective set of sweep parameters of a plurality of sets of sweep parameters, and wherein each set of sweep parameters of the plurality of sets of sweep parameters corresponds to a respective dimension of the multi-dimensional PVT space.

9. The system of claim 8, wherein the instructions when executed by the processor further cause the processor to generate the device-level stress data by performing a fresh simulation for the at least one PVT condition.

10. The system of claim 8, wherein the instructions when executed by the processor further cause the processor to:
   perform a degradation simulation for a sweep parameter of a first set of sweep parameters of the plurality of sets of sweep parameters, wherein the dimension corresponding to the first set of sweep parameters is associated with a degradation simulation group of a set of degradation simulation groups forming the multi-dimensional PVT space;
   determine whether the degradation simulation group is a final degradation simulation group of the set of degradation simulation groups;
   in response to determining that the degradation simulation group is the final degradation simulation group, determine whether the sweep parameter of the first set of sweep parameters is a final sweep parameter of the first set of sweep parameters;
   in response to determining that the sweep parameter of the first set of sweep parameters is the final sweep parameter of the first set of sweep parameters, determine whether the first set of sweep parameters is a final set of sweep parameters of the process corner;
   in response to determining that the first set of sweep parameters is the final set of sweep parameters of the process corner, determine whether the process corner is a final process corner; and
   in response to determining that the process corner is a final process corner, terminate the degradation simulation for the process corner.

11. The system of claim 10, wherein the instructions when executed by the processor further cause the processor to:
   in response to determining that the degradation simulation group is not the final degradation simulation group, initiate a second degradation simulation to be performed for a second degradation simulation group of the set of degradation simulation groups.

12. The system of claim 10, wherein the instructions when executed by the processor further cause the processor to:
   in response to determining that the sweep parameter of the first set of sweep parameters is not the final sweep parameter of the of the first set of sweep parameters, initiate a second degradation simulation to be performed for a second sweep parameter of the first set of sweep parameters.

13. The system of claim 10, wherein the instructions when executed by the processor further cause the processor to:
   in response to determining that the first set of sweep parameters is not the final set of sweep parameters of the process corner, initiate a second degradation simulation to be performed for a second sweep parameter of a second set of sweep parameters.

14. The system of claim 10, wherein the instructions when executed by the processor further cause the processor to:
   in response to determining that the process corner is not the final process corner, initiate a second degradation simulation to be performed for a second process corner.

15. A non-transitory computer readable medium comprising stored instructions, which when executed by a processor, cause the processor to perform operations comprising:
   obtaining device-level parameter degradation data for at least one process, voltage, temperature (PVT) condition associated with a multi-dimensional PVT space by extrapolating device-level stress data of a circuit comprising one or more devices to a target circuit age for the circuit;
   obtaining an aged circuit comprising the one or more devices by applying the device-level parameter degradation data to a set of device-level parameters; and
   initiate a process to perform a plurality of degradation simulations with respect to the aged circuit for a process corner associated with the at least one PVT condition, wherein each degradation simulation of the plurality of degradation simulations is performed for a respective set of sweep parameters of a plurality of sets of sweep parameters, and wherein each set of sweep parameters of the plurality of sets of sweep parameters corresponds to a respective dimension of the multi-dimensional PVT space.

16. The non-transitory computer readable medium of claim 15, wherein the operations further comprise:
   performing a degradation simulation for a sweep parameter of a first set of sweep parameters of the plurality of sets of sweep parameters, wherein the dimension corresponding to the first set of sweep parameters is associated with a degradation simulation group of a set of degradation simulation groups forming the multi-dimensional PVT space;
   determining whether the degradation simulation group is a final degradation simulation group of the set of degradation simulation groups;
   in response to determining that the degradation simulation group is the final degradation simulation group, determining whether the sweep parameter of the first set of sweep parameters is a final sweep parameter of the first set of sweep parameters;
   in response to determining that the sweep parameter of the first set of sweep parameters is the final sweep parameter of the first set of sweep parameters, determining whether the first set of sweep parameters is a final set of sweep parameters of the process corner;
   in response to determining that the first set of sweep parameters is the final set of sweep parameters of the process corner, determining whether the process corner is a final process corner; and in response to determining that the process corner is a final process corner, terminating the degradation simulation for the process corner.

17. The non-transitory computer readable medium of claim 15, wherein the operations further comprise:
in response to determining that the degradation simulation group is not the final degradation simulation group, initiating a second degradation simulation to be performed for a second degradation simulation group of the set of degradation simulation groups.

18. The non-transitory computer readable medium of claim 15, wherein the operations further comprise:
in response to determining that the sweep parameter of the first set of sweep parameters is not the final sweep parameter of the of the first set of sweep parameters, initiating a second degradation simulation to be performed for a second sweep parameter of the first set of sweep parameters.

19. The non-transitory computer readable medium of claim 15, wherein the operations further comprise:
in response to determining that the first set of sweep parameters is not the final set of sweep parameters of the process corner, initiating a second degradation simulation to be performed for a second sweep parameter of a second set of sweep parameters.

20. The non-transitory computer readable medium of claim 15, wherein the operations further comprise:
in response to determining that the process corner is not the final process corner, initiating a second degradation simulation to be performed for a second process corner.

* * * * *